United States Patent
Yonetani et al.

(10) Patent No.: US 12,444,176 B2
(45) Date of Patent: Oct. 14, 2025

(54) MODEL GENERATION APPARATUS, ESTIMATION APPARATUS, MODEL GENERATION METHOD, AND COMPUTER-READABLE STORAGE MEDIUM STORING A MODEL GENERATION PROGRAM INCLUDING TRAINING A MODEL BY CONVERTING TRAINING DATA TO DELIBERATELY REDUCE ESTIMATION PERFORMANCE FOR IMPROVED DEFECT DETECTION AND FEATURE IDENTIFICATION

(71) Applicant: OMRON Corporation, Kyoto (JP)

(72) Inventors: Ryo Yonetani, Tokyo (JP); Atsushi Hashimoto, Tokyo (JP); Yamato Okamoto, Tokyo (JP)

(73) Assignee: OMRON Corporation, Kyoto (JP)

( * ) Notice: Subject to any disclaimer, the term of this patent is extended or adjusted under 35 U.S.C. 154(b) by 444 days.

(21) Appl. No.: 17/772,161

(22) PCT Filed: Nov. 6, 2020

(86) PCT No.: PCT/JP2020/041451
§ 371 (c)(1),
(2) Date: Apr. 27, 2022

(87) PCT Pub. No.: WO2021/100482
PCT Pub. Date: May 27, 2021

(65) Prior Publication Data
US 2022/0406042 A1 Dec. 22, 2022

(30) Foreign Application Priority Data
Nov. 21, 2019 (JP) ................................. 2019-210873

(51) Int. Cl.
*G06K 9/00* (2022.01)
*G06V 10/40* (2022.01)
(Continued)

(52) U.S. Cl.
CPC .......... *G06V 10/7747* (2022.01); *G06V 10/40* (2022.01); *G06V 10/776* (2022.01); *G06V 10/82* (2022.01)

(58) Field of Classification Search
CPC . G06N 3/08; G06T 2207/20081; G06T 7/194; G06T 7/0004
See application file for complete search history.

(56) References Cited

U.S. PATENT DOCUMENTS

| | | | |
|---|---|---|---|
| 7,162,073 B1* | 1/2007 | Akgul | G06T 7/0004 356/73.1 |
| 2012/0320055 A1* | 12/2012 | Pekar | G06T 7/143 345/424 |

(Continued)

FOREIGN PATENT DOCUMENTS

| | | |
|---|---|---|
| CN | 106650653 A | 5/2017 |
| CN | 109074519 A | 12/2018 |

(Continued)

OTHER PUBLICATIONS

English translation of the International Search Report ("ISR") of PCT/JP2020/041451 mailed on Jan. 26, 2021.

(Continued)

*Primary Examiner* — Gregory A Morse
*Assistant Examiner* — Owais Iqbal Memon
(74) *Attorney, Agent, or Firm* — METROLEX IP LAW GROUP, PLLC; Robert L. Scott, Esq.

(57) ABSTRACT

A model generation apparatus according to one or more embodiments executes operations, with respect to each of learning data sets. The operations includes training a second (Continued)

estimator so that an estimation result obtained from a second estimator conforms to second correct answer data; training a coder so that an estimation result obtained from the second estimator does not conform to the second correct answer data; and training the coder and the first estimator so that an estimation result obtained from a first estimator conforms to first correct answer data. The model generation apparatus executes operation of the training the second estimator and the training the coder alternately and repeatedly.

20 Claims, 23 Drawing Sheets

(51) Int. Cl.
*G06V 10/774* (2022.01)
*G06V 10/776* (2022.01)
*G06V 10/82* (2022.01)

(56) References Cited

U.S. PATENT DOCUMENTS

| | | | |
|---|---|---|---|
| 2017/0177965 A1 | 6/2017 | Gordo Soldevila et al. | |
| 2017/0300762 A1 | 10/2017 | Ishii et al. | |
| 2018/0300865 A1* | 10/2018 | Weiss | G05B 19/41875 |
| 2018/0300878 A1 | 10/2018 | Ihara | |
| 2019/0114781 A1* | 4/2019 | Gao | G06T 7/194 |
| 2019/0173902 A1 | 6/2019 | Takahashi et al. | |
| 2019/0220977 A1* | 7/2019 | Zhou | G06N 3/084 |

FOREIGN PATENT DOCUMENTS

| | | | |
|---|---|---|---|
| CN | 109559329 A | 4/2019 | |
| JP | 2012-026982 A | 2/2012 | |
| JP | 2013-521844 A | 6/2013 | |
| JP | 2014-049118 A | 3/2014 | |
| JP | 2017-111806 A | 6/2017 | |
| JP | 2017-194948 A | 10/2017 | |
| JP | 6264492 B1 | 1/2018 | |
| JP | 2018-175343 A | 11/2018 | |
| JP | 2018-189522 A | 11/2018 | |
| JP | 2019021218 A | 2/2019 | |
| JP | 2019-071050 A | 5/2019 | |
| JP | 2019-083746 A | 6/2019 | |
| JP | 2019-87181 A | 6/2019 | |

OTHER PUBLICATIONS

Written Opinion("WO") of PCT/JP2020/041451 mailed on Jan. 26, 2021.
Extended European search report issued on Dec. 7, 2023 in a counterpart European patent application.
Alireza Makhzani et al., "Adversarial Autoencoders", May 25, 2016, Retrieved from the Internet: URL:https://arxiv.org/pdf/1511.05644.pdf [retrieved on Dec. 11, 2018], Relevance is indicated in the extended European search report issued on Dec. 7, 2023 in a counterpart European patent application.
Eusebio Jose et al., "Semi-supervised Adversarial Image-to-Image Translation", Dec. 8, 2018, Advances in Databases and Information Systems; Lecture Notes in Computer Science [retrieved on Dec. 8, 2018], Springer International Publishing, Relevance is indicated in the extended European search report issued on Dec. 7, 2023 in a counterpart European patent application.
Office Action (CNOA) issued on Sep. 30, 2024 in a counterpart Chinese patent application No. 202080071408.1, with English translation.

* cited by examiner

MODEL GENERATION APPARATUS, ESTIMATION APPARATUS, MODEL GENERATION METHOD, AND COMPUTER-READABLE STORAGE MEDIUM STORING A MODEL GENERATION PROGRAM INCLUDING TRAINING A MODEL BY CONVERTING TRAINING DATA TO DELIBERATELY REDUCE ESTIMATION PERFORMANCE FOR IMPROVED DEFECT DETECTION AND FEATURE IDENTIFICATION

TECHNICAL FIELD

The disclosure relates to a model generation apparatus, an estimation apparatus, a model generation method, and a computer-readable medium storing a model generation program.

RELATED ART

Conventionally, in a scenario such as production lines for producing products, a technique is used in which products to be produced are shot (photographed) by a shooting (photographing) apparatus, and the quality of the products is inspected based on the obtained image data. For example, Patent Document 1 proposes an inspection apparatus that determines whether an object to be inspected in an image is normal or anomalous based on a trained first neural network, and if it is determined that the object to be inspected is anomalous, classifies the type of the anomaly based on a trained second neural network.

RELATED ART DOCUMENTS

Patent Documents

Patent Document 1: JP 2012-026982A
Patent Document 2: JP 2017-111806A
Patent Document 3: JP 2014-049118A
Patent Document 4: JP 2019-071050A
Patent Document 5: Japanese Patent No. 6264492
Patent Document 6: JP 2017-194948A
Patent Document 7: JP 2018-175343A
Patent Document 8: JP 2019-083746A
Patent Document 9: JP 2018-189522A

Summary

According to an estimator configured by a trained machine learning model constructed by machine learning, it is possible to execute a task of estimation (including prediction) such as regression or classification on unknown data of the same type as that of given training data. Thus, according to a method that uses a machine learning model such as a neural network as described in Patent Document 1, it is possible to execute visual inspection of products based on an output of a trained estimator. However, the inventors of the present application have found that conventional methods as described above have a following problem.

That is to say, conventional methods collect in advance images of products including defects as learning data, in order to execute machine learning for training a machine learning model to acquire the capability of detecting a defect appearing in a given image. Detecting a defect may also include identifying the type of the defect. Basically, the accuracy of visual inspection can be improved the wider the range of learning data that is collected is, that is to say, the more the diversity of defect situations appearing in learning data is.

However, the larger the number of defect types and the number of background types (this includes the outer appearance of products) are, the larger the number of combinations of defect type and background type will be, resulting in an increase in the number (and types) of samples that should be collected as learning data. Also, the background may change when a trained estimator is operated. In order to generate a trained estimator that can execute accurate visual inspection, it is desirable to collect samples of all combinations of defect type and background type, but collecting samples of all combinations is costly. Therefore, it is conceivable to execute machine learning of a machine learning model, for example, at a stage at which samples of all combinations have not been obtained but a certain amount of learning data has been collected, such as when samples of all defect types of an object to be detected have been obtained.

However, if the learning data includes combinations for which no sample has been obtained, the following problem may occur. That is, a machine learning model is trained by machine learning to execute a desired estimation task using suitable information included in training data (samples). Therefore, if training data including defects and backgrounds is used to execute machine learning of an estimator, the generated trained estimator may have the capability of executing an estimation task relating to detection of defects, using not only defect-related information included in the data but also background-related information. In such a case, any combination of defect type and background type for which no sample has been obtained cannot be reflected on the machine learning, and thus the accuracy of estimation relating to detection of defects by the trained estimator may be reduced with respect to this combination.

In addition, if some combinations of defect type and background type are overrepresented in samples, specifically, if samples include all defect types and background types with the same distribution, the overrepresentation of some samples may adversely affect the learning capability of a machine learning model through machine learning. Specifically, due to machine learning using samples including overrepresented combinations, the estimator may acquire the capability of identifying the background type, instead of the capability of detecting a defect according to the type.

As an example, it is assumed that two types of defects, namely, a first defect and a second defect, occur in two types of products, namely, first products and second products. Also, in this example, it is assumed that the first defect is likely to occur in the first product, and the second defect is likely to occur in the second product. Furthermore, it is assumed that obtained samples are lean to being images of the first products including the first defect, and images of the second products including the second defect. That is to say, it is assumed that images of the first products including the second defect, and images of the second products including the first defect have not been obtained as samples for machine learning. It is supposed that using samples obtained under the above-described assumptions, machine learning of a machine learning model is executed, aiming to train the machine learning model to acquire the capability of detecting a defect according to the type. In this case, due to the overrepresentation in the obtained samples, the machine learning model may learn, through the machine learning, the capability of identifying the type of background, instead of the capability of detecting and identifying a defect according to the type. That is, the overrepresentation of some samples may cause the machine learning model to learn a capability other than the intended capability. If the machine learning model has learned the capability of identifying the type of background, the trained estimator will erroneously detect that the first product has the first defect when an image of the first product including the second defect is given.

Accordingly, in conventional methods, a trained estimator may be constructed by machine learning to execute an estimation task relating to defect detection, taking into consideration background-related information included in image data. Therefore, there is a problem that, due to the difference between backgrounds in operation and backgrounds in learning, the accuracy of the estimation relating to defect detection by a trained estimator may be reduced. In other words, there is the problem that it is difficult to generate a trained estimator that is robust against differences in backgrounds.

Note that such a problem is not specific to scenarios of generating a trained estimator that can be used for visual inspection of products. This problem may occur in various scenarios of constructing a trained estimator that can be used to execute an estimation task relating to a feature of an object on a predetermined type of data. The predetermined type of data may be image data, audio data, numerical data, text data, measurement data obtained by a sensor, or the like, for example. "Scenario of executing an estimation task relating to a feature of an object on a predetermined type of data" refers to, for example, a scenario of performing estimation relating to a foreground of image data, or the like. The estimation relating to a foreground may include, for example, estimating an attribute of an object appearing in image data. In this case, a feature relating to a background may be a feature other than the attribute of an object. The object may be, for example, a product, a package of a product, a number plate, a moving object (such as, e.g., an automobile or a person) capable of moving within a shooting range, a driver who drives an automobile, or the like. In addition, the scenario of executing an estimation task relating to a feature of an object on a predetermined type of data refers to, for example, a scenario of estimating an attribute of an object based on sensing data obtained by a sensor, or the like. The scenario of estimating an attribute of an object based on sensing data obtained by a sensor may refer to, for example, a scenario of estimating the state of an automobile based on sensing data obtained by an on-board sensor, a scenario of estimating the health condition of an object person based on sensing data obtained by a vital sensor or a medical testing apparatus, a scenario of estimating the status of cultivation of plants based on sensing data obtained by an environmental sensor, a scenario of estimating the state of a machine based on sensing data obtained by a sensor for observing the state of the machine, or the like.

As a specific example, Patent Document 2 proposes that a trained neural network is used to recognize number plates. Patent Document 3 proposes that a trained convolution neural network is used to identify letters. Patent Document 4 proposes that a trained neural network is used to estimate a density distribution and a distribution of movement vectors of people in a shot image. Patent Document 5 proposes that a trained model is used to estimate the degree of concentration of a driver on driving from a shot image and observation information. Patent Document 6 proposes that a trained neural network is used to recognize the state of the surroundings of an automobile based on data obtained by an on-board sensor. Patent Document 7 proposes that a trained neural network is used to detect a pathological abnormality region based on a medical image. Patent Document 8 proposes that a trained neural network is used to identify the growing stage of plants. Patent Document 9 proposes that a trained neural network is used to perform a diagnostic on a trouble of a facility based on at least one type of audio measurement data and oscillation measurement data.

Also in such scenarios, in conventional methods, when a trained estimator for executing an estimation task relating to a feature of an object is constructed by machine learning, the trained estimator may be constructed to execute the estimation task, taking into consideration information relating to a feature other than a feature of an object included in data. Therefore, there is the problem that it is difficult to generate a trained estimator that is robust against differences in other features.

One or more embodiments may provide a technique for generating a trained estimator that may execute an estimation task relating to a feature of an object appearing in image data, and that is robust against differences in features other than features of an object.

One or more embodiments may adopt the following configuration.

A model generation apparatus according to according to one or more embodiments may include: a data acquisition unit configured to acquire a plurality of learning data sets each constituted by a combination of training data, first correct answer data that indicates a first feature included in the training data, and second correct answer data that indicates a second feature included in the training data and is different from the first feature; and a learning processing unit configured to execute machine learning of a learning model that includes a coder, a first estimator, and a second estimator, wherein the coder is configured to convert received input data into a feature amount, the first estimator is configured to accept input of an output value of the coder, and estimate a first feature included in the input data from the feature amount, and the second estimator is configured to accept input of the output value of the coder, and estimate a second feature included in the input data from the feature amount, wherein executing the machine learning includes: a first training step of training the second estimator so that, with respect to each of the learning data sets, an estimation result obtained from the second estimator by giving the training data to the coder conforms to the second correct answer data; a second training step of training the coder so that, with respect to each of the learning data sets, an estimation result obtained from the second estimator by giving the training data to the coder does not conform to the second correct answer data; and a third training step of training the coder and the first estimator so that, with respect to each of the learning data sets, an estimation result obtained from the first estimator by giving the training data to the coder conforms to the first correct answer data, and wherein the learning processing unit executes the first training step and the second training step alternately and repeatedly.

In the model generation apparatus according to this configuration, by three training steps, the machine learning of the learning model that includes the coder, the first estimator, and the second estimator is executed. According to the first training step, the second estimator acquires the capability of executing an estimation task relating to the second feature based on information included in the feature amount obtained by the coder, that is, a component that corresponds to the second feature. On the other hand, according to the second training step, the coder acquires the capability of converting the input data into a feature amount such that the estimation task relating to the second feature by the second estimator fails, depending on the capability of the second estimator.

In the model generation apparatus according to this configuration, the first training step and the second training step are executed alternately and repeatedly. With this, adversarial learning of the coder and the second estimator is executed. As a result, it may be possible to make the feature amount obtained by the coder unlikely to include a component corresponding to the second feature, such that the estimation task by this second estimator fails depending on a case where the estimation performance of the second estimator is improved, that is, the coder may acquire the capability of projecting the input data to a feature space that is less (or not) relevant to the second feature. In addition, according to the third training step, the first estimator may acquire the capability of executing an estimation task relating to the first feature from the feature amount obtained by the coder, and the coder may acquire the capability of converting the input data into a feature amount that includes a component corresponding to the first feature, so that the first estimator may appropriately execute the estimation task.

Therefore, the machine learning according to this configuration may make the feature amount obtained by the trained coder likely to include a component corresponding to the first feature, and unlikely to include a component corresponding to the second feature. With this, information relating to the second feature may be unlikely to be taken into consideration in executing an estimation task relating to the first feature by the first estimator. Thus, with the model generation apparatus according to this configuration, it may be possible to generate a trained estimator that can execute an estimation task relating to a feature of an object and that is robust against differences in features other than the feature of the object. That is, it may be possible to generate a trained coder and a trained first estimator that can execute an estimation task relating to the first feature in a way that is robust against differences in second feature.

Note that the coder, the first estimator, and the second estimator each include computation parameters to be used in computation, and to be adjusted by machine learning. The types of the coder, the first estimator, and the second estimator are not particularly limited, and may be selected as appropriate depending on the embodiment, as long as they are a model that can be machine learned (machine learning model or a learner). For example, a neural network, a support vector machine, a regression model, or the like may be used as the coder, the first estimator, and/or the second estimator. If a neural network is used as the coder, the first estimator, and/or the second estimator, the weights of connections of neurons, or threshold values of neurons are examples of the computation parameters. The machine learning method may be selected as appropriate according to the types of the models of the coder, the first estimator, and the second estimator. The training steps may by executed in an appropriate processing order.

In the model generation apparatus according to one or more embodiments, the third training step may be repeatedly executed together with the first training step and the second training step. According to this configuration, in response to values of the computation parameters of the coder being adjusted in the second training step in the course of adversarial learning, values of the computation parameters of the coder and the first estimator may be adjusted in the third training step so that the coder and the first estimator acquire the capability of estimating the first feature from the feature amount obtained by the coder. With this, it may be possible to obtain a trained coder and a trained first estimator that can accurately execute an estimation task relating to a first feature.

In the model generation apparatus according to one or more embodiments, in the second training step, with respect to each of the learning data sets, dummy data that corresponds to the second correct answer data and is constituted by values different from values of the corresponding second correct answer data may be acquired. Training the coder so that the estimation result does not conform to the second correct answer data may be constituted by training the coder so that the estimation result obtained from the second estimator by giving the training data to the coder conforms to the dummy data. With this configuration, it may be possible to simplify the training processing of the coder in the second training step, thus making it possible to reduce the cost.

In the model generation apparatus according to one or more embodiments, the dummy data may be constituted by the second correct answer data of a learning data set that is different from the corresponding learning data set. With this configuration, it may be possible to suppress the amount of calculation for generating dummy data, thus may make it possible to reduce the processing cost of the second training step.

In the model generation apparatus according to one or more embodiments, the first feature may relate to a first component to be subjected to a predetermined estimation. The second feature may relate to a second component that is different from the first component, and affects the predetermined estimation regarding the first component. With this configuration, it may be possible to make a feature amount obtained by the coder unlikely to include information corresponding to the second component that affects predetermined estimation relating to the first component. Thus, it may be expected to generate a trained coder and a trained first estimator that are robust against differences in second feature, and may execute an estimation task relating to the first feature relatively accurately.

The model generation apparatus according to the above-described configurations may be applied to any scenario of generating a trained model that can be used to execute an estimation task relating to a feature of an object on a predetermined type of data. The model generation apparatus according to the above-described configurations may be applied to, for example, a scenario of generating a trained model for estimating a feature included in a foreground of image data. Estimating a feature included in a foreground may be, for example, estimating the attribute of an object appearing in the image data. In this case, a feature relating to a background may be a feature other than the attribute of the object. Also, the model generation apparatus according to the above-described configurations may be applied to, for example, a scenario of generating a trained model for estimating an attribute of an object from sensing data obtained by a sensor. Estimating an attribute of an object may be, for example, estimating a status of an automobile, estimating a health condition of an object person, estimating a status of cultivation of a plant, estimating a state of a machine, or the like. The sensor may be selected as appropriate according to the scenario.

In the model generation apparatus according to one or more embodiments, the training data may be image data including a foreground and a background. The first feature may relate to the foreground, and the second feature may relate to the background. With this configuration, it may be possible to generate a trained coder and a trained first estimator that can execute an estimation task relating to a foreground in a way that is robust against differences in backgrounds. Note that the foreground and the background may be determined as appropriate depending on the embodiment.

In the model generation apparatus according to one or more embodiments, the training data may be image data in which an object appears. The first feature may be an attribute of the object, and the second feature may be a feature other than the attribute of the object. With this configuration, it may be possible to generate a trained coder and a trained first estimator that can execute an estimation task relating to the attribute of an object in a way that is robust against differences in backgrounds. Note that the object may be appropriately selected. The object may be, for example, a product, a package of a product, a number plate, a moving object (such as, e.g., an automobile or a person) capable of moving within a shooting range, a driver who drives an automobile, or the like.

In the model generation apparatus according to one or more embodiments, the object may be a product. The attribute of the object may relate to a defect of the product. According to this configuration, in a scenario of executing visual inspection, it may be possible to generate a trained coder and a trained first estimator that can execute an estimation task relating to defect detection in a way that is robust against difference in features (for example, a background including the outer package of a product, the sheet of a conveyor, and the like) other than the defect.

Also, one or more embodiments is not limited to a model generation apparatus. One or more embodiments may be an apparatus that uses a trained model generated by the model generation apparatus. For example, one or more embodiments may be an estimation apparatus configured to execute an estimation task relating to a feature of an object on a predetermined type of data, using the trained coder and first estimator generated by the model generation apparatus. This estimation apparatus may be replaced by an inspection apparatus, an identification apparatus, a monitoring apparatus, a diagnosis apparatus, a prediction apparatus, or the like, depending on the type of an estimation task in the applied scenario.

For example, an estimation apparatus according to one or more embodiments includes: a data acquisition unit configured to acquire object data; an estimation unit configured to estimate a first feature included in the acquired object data, using the trained coder and the trained first estimator that are generated by the model generation apparatus according to any one of the above-described configurations; and an output unit configured to output information relating to a result of the estimation of the first feature. With this configuration, it is possible to execute an estimation task relating to the first feature in a way that is robust against differences in second feature. Note that the object data may also be referred to as "object samples" or simply as "samples", for example.

As aspects other than the model generation apparatus and the estimation apparatus according to the modes described above, one or more embodiments may also be an information processing method for realizing all or some of the configurations described above, a program, or a storage medium that stores such a program and may be read by an apparatus or a machine such as a computer. Here, the storage medium that may be read by a computer or the like is a medium that stores information such as programs via an electrical, magnetic, optical, mechanical, or chemical effect.

Also, one or more embodiments aspect of the invention may be an estimation system constituted by the model generation apparatus and the estimation apparatus according to any one of the modes described above.

For example, a model generation method according to one or more embodiments is an information processing method in which a computer executes the steps of: acquiring a plurality of learning data sets each constituted by a combination of training data, first correct answer data that indicates a first feature included in the training data, and second correct answer data that indicates a second feature included in the training data and is different from the first feature; and executing machine learning of a learning model that includes a coder, a first estimator, and a second estimator, wherein the coder is configured to convert received input data into a feature amount, the first estimator is configured to accept input of an output value of the coder, and estimate a first feature included in the input data from the feature amount, and the second estimator is configured to accept input of the output value of the coder, and estimate a second feature included in the input data from the feature amount, wherein executing the machine learning includes: a first training step of training the second estimator so that, with respect to each of the learning data sets, an estimation result obtained from the second estimator by giving the training data to the coder conforms to the second correct answer data; a second training step of training the coder so that, with respect to each of the learning data sets, an estimation result obtained from the second estimator by giving the training data to the coder does not conform to the second correct answer data; and a third training step of training the coder and the first estimator so that, with respect to each of the learning data sets, an estimation result obtained from the first estimator by giving the training data to the coder conforms to the first correct answer data, and wherein the learning processing unit executes alternately and repeatedly the first training step and the second training step.

Also, for example, a model generation program according to one or more embodiments is a program for causing a computer to execute the steps of: acquiring a plurality of learning data sets each constituted by a combination of training data, first correct answer data that indicates a first feature included in the training data, and second correct answer data that indicates a second feature included in the training data and is different from the first feature; and executing machine learning of a learning model that includes a coder, a first estimator, and a second estimator, wherein the coder is configured to convert received input data into a feature amount, the first estimator is configured to accept input of an output value of the coder, and estimate a first feature included in the input data from the feature amount, and the second estimator is configured to accept input of the output value of the coder, and estimate a second feature included in the input data from the feature amount, wherein executing the machine learning includes: a first training step of training the second estimator so that, with respect to each of the learning data sets, an estimation result obtained from the second estimator by giving the training data to the coder conforms to the second correct answer data; a second training step of training the coder so that, with respect to each of the learning data sets, an estimation result obtained from the second estimator by giving the training data to the coder does not conform to the second correct answer data; and a third training step of training the coder and the first estimator so that, with respect to each of the learning data sets, an estimation result obtained from the first estimator by giving the training data to the coder conforms to the first correct answer data, and wherein the learning processing unit executes alternately and repeatedly the first training step and the second training step.

According to one or more embodiments, it may be possible to generate a trained estimator that can execute an estimation task relating to a feature of an object included in data, and is robust against differences in features other than features of the object.

DETAILED DESCRIPTION

Hereinafter, an embodiment according to one aspect of the present invention (hereinafter, referred to also as "the present embodiment") will be described based on the drawings. However, the present embodiment described below is merely an example of the present invention in every respect. Needless to say, various improvements or modifications may be made without departing from the scope of the present invention. That is to say, to implement the present invention, a specific configuration corresponding to that implementation may also be employed as appropriate. Note that, although data that is used in the embodiment is described using natural language, more specifically, the data is defined by pseudo language that can be recognized by a computer, such as commands, parameters, and machine language.

1. Application Example

Figure 1:
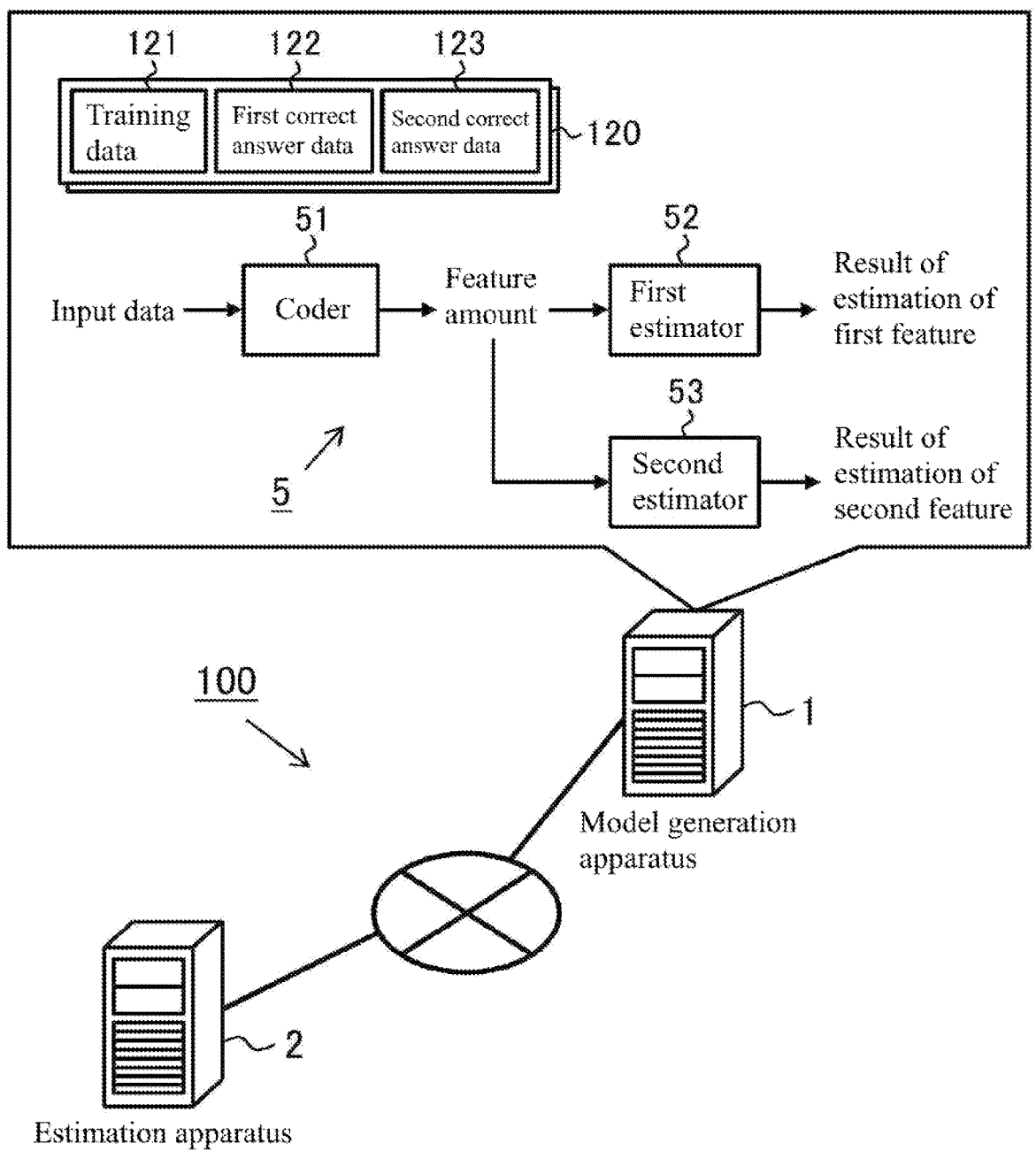
FIG. 1 is a schematic diagram illustrating an example of a scenario to which one or more embodiments is applied.

First, an example to which the present invention is applied will be described with reference to FIG. 1. FIG. 1 schematically illustrates an example of a scenario to which the present invention is applied. As shown in FIG. 1, an estimation system 100 according to the present embodiment includes a model generation apparatus 1 and an estimation apparatus 2.

The model generation apparatus 1 according to the present embodiment is a computer configured to execute machine learning of a learning model 5. Specifically, the model generation apparatus 1 according to the present embodiment acquires a plurality of learning data sets 120. Each of the learning data sets 120 is constituted by a combination of training data 121, first correct answer data 122 indicating a first feature included in the training data 121, and second correct answer data 123 indicating a second feature that is included in the training data 121 and is different from the first feature.

The training data 121 is samples of a predetermined type of data. With respect to the predetermined type of data, the type of data is not particularly limited and may be selected as appropriate depending on the embodiment, as long as it is data in which some feature can appear, for example. The predetermined type of data may be, for example, image data, audio data, numerical data, text data, measurement data obtained by a sensor, or the like. The predetermined type of data may be, for example, sensing data obtained by observing some sort of object using a sensor. The sensor may be, for example, an image sensor (camera), an infrared sensor, an audio sensor (microphone), an ultrasonic sensor, an optical sensor, a pressure sensor, a barometric sensor, a temperature sensor, or the like. Also, the sensor may be, for example, an environmental sensor, a vital sensor, a medical testing apparatus, an on-board sensor, a home security sensor, or the like. The environmental sensor may be, for example, a barometer, a thermometer, a hygrometer, a sound pressure meter, an audio sensor, an ultraviolet sensor, an illuminometer, an ombrometer, a gas sensor, or the like. The vital sensor may be, for example, a blood-pressure gauge, a pulsimeter, a pulse rate meter, cardiography equipment, an electromyograph, a thermometer, an electric skin resistance meter, a microwave sensor, an electroencephalograph, a magnetoencephalography, an active mass meter, a blood sugar meter, an electro-oculogram sensor, an ocular motion meter, or the like. The medical testing apparatus may be, for example, a CT (Computed Tomography) apparatus, an MRI (Magnetic Resonance Imaging) apparatus, or the like. The on-board sensor may be, for example, an image sensor, a Lidar (light detection and ranging) sensor, a millimeter-wave radar, an ultrasonic sensor, an acceleration sensor, or the like. The home security sensor may be, for example, an image sensor, an infrared sensor, an activation level (audio) sensor, a gas (such as $CO_2$) sensor, a current sensor, a smart meter (sensor for measuring energy consumption of home electrical appliance, illumination, or the like), or the like.

The first feature and the second feature may be selected as appropriate depending on the embodiment. For example, the first feature and the second feature may relate to a feature relating to a component (element) that can directly or indirectly appear in data. "Directly appearing" means that a feature appears in data itself such as when it appears in image data. "Indirectly appearing" means that a feature is derived from data such as when it is estimated from image data. The first feature may be selected according to an estimation task that trains a machine learning model to perform learning. On the other hand, the second feature may be selected from features that were not selected as an object to be subjected to an estimation task, from among features that can directly or indirectly appear in data. The first feature may be, for example, a feature relating to a first component of a predetermined type of data that is to be subjected to a predetermined estimation, such as a foreground (e.g., a defective part) of image data. In contrast, the second feature may relate to, for example, a second component that is different from the first component, and can affect predetermined estimation relating to the first component, such as a background of the image data, for example.

Note that "affecting predetermined estimation" means that when a trained model generated by the conventional method is given, the accuracy of the predetermined estimation on the first component using the trained model may deteriorate, with respect to object data including an unknown combination of first component and second component, compared to object data including a known combination of first component and second component appearing in training data used for machine learning. As a specific example, a scenario is assumed in which, by selecting image data as object data, selecting a component relating to a defect of a product as a first component, and selecting a component relating to a background as a second component, a defect of a product appearing in image data is detected. In this scenario, a trained model is generated by machine learning using training data in which defects of products and backgrounds appear. It is assumed that, in the training data used in the machine learning, a combination of first defect and first background, and a combination of second defect and second background appear, but a combination of first defect and second background, and a combination of second defect and first background do not appear. In this case, an example of affecting a predetermined estimation is that the accuracy of detection of a defect using a trained model may deteriorate with respect to image data including a combination of defect and background (of first defect and second background) or (of second defect and first background) that does not appear in the training data although the defects and the backgrounds appear individually in the training data, compared to image data including a combination of defect and background (of first defect and first background) or (of second defect and second background) that appears in the training data used in the machine learning.

The first correct answer data 122 indicates the correct answer of an estimation task relating to the first feature. The second correct answer data 123 indicates the correct answer of an estimation task relating to the second feature. Each piece of correct answer data (122 and 123) may be replaced by "teacher signal", "label", or the like. "Estimation" may be replaced by "inference". Estimating each feature may be either deriving a discrete value (e.g., a class corresponding to a specific feature) by grouping (classification, identification) or deriving a continuous value (e.g., probability that a specific feature is present) by regression, for example. Estimating each feature may also include performing some sort of approval such as detection or determination, based on a result of the grouping or regression. Also, estimating each feature may also include predicting.

The model generation apparatus 1 according to the present embodiment uses the acquired plurality of learning data sets 120 to execute machine learning of the learning model 5. The learning model 5 according to the present embodiment includes a coder 51, a first estimator 52, and a second estimator 53. The coder 51 is configured to convert received image data into feature amounts, in other words, the coder 51 is configured to accept input of input data, and output an output value that corresponds to a result of the conversion of the accepted input data into feature amounts. The first estimator 52 is configured to estimate, upon input of the output value (that is, the feature amounts) of the coder 51, a first feature included in the input data based on the feature amounts. The second estimator 53 is configured to estimate, upon input of the output value of the coder 51, a second feature included in the input data based on the feature amounts.

The data format of the feature amounts is not particularly limited, and may be selected as appropriate depending on the embodiment. Also, the formats of the output values of the estimators (52, 53) are also not particularly limited, and may be selected as appropriate according to the respective formats of estimation tasks relating to the features. Each of the coder 51, the first estimator 52, and the second estimator 53 may be configured by a machine learning model including computation parameters. The type of the machine learning model constituting each of the model coder 51, the first estimator 52, and the second estimator 53 is not particularly limited, and may be selected as appropriate depending on the embodiment. In the present embodiment, a neural network is used as each of the machine learning models constituting the coder 51, the first estimator 52, and the second estimator 53. Details thereof will be described later.

Executing machine learning according to the present embodiment includes first to third training steps. In the first training step, the model generation apparatus 1 according to the present embodiment trains the second estimator 53 so that, with respect to each of the learning data sets 120, a result of estimation of the second feature obtained from the second estimator 53 by giving the training data 121 to the coder 51 conforms to the second correct answer data 123. In the second training step, the model generation apparatus 1 according to the present embodiment trains the coder 51 so that, with respect to each of the learning data sets 120, a result of estimation of the second feature obtained from the second estimator 53 by giving the training data 121 to the coder 51 does not conform to the second correct answer data 123. That is to say, in the second training step, the coder 51 is trained to convert the training data 121 into feature amounts such that the estimation performance of the second estimator 53 is reduced. In the third training step, the model generation apparatus 1 according to the present embodiment trains the coder 51 and the first estimator 52 so that, with respect to each of the learning data sets 120, a result of estimation of the first feature obtained from the first estimator 52 by giving the training data 121 to the coder 51 conforms to the first correct answer data 122. The model generation apparatus 1 according to the present embodiment executes the first training step and the second training step alternately and repeatedly. With this, the model generation apparatus 1 according to the present embodiment can generate a trained coder 51 and a trained first estimator 52 that can be used to execute an estimation task relating to the first feature. Note that the model generation apparatus 1 according to the present embodiment may be replaced simply by "generation apparatus", "learning apparatus", or the like. "Trained" may be replaced by "learned".

On the other hand, the estimation apparatus 2 according to the present embodiment is a computer configured to execute an estimation task relating to a first feature of a predetermined type of data, using the trained coder 51 and first estimator 52 generated by the model generation apparatus 1. Specifically, the estimation apparatus 2 according to the present embodiment acquires object data to be subjected to the estimation task. The estimation apparatus 2 according to the present embodiment estimates the first feature included in the acquired object data, using the trained coder 51 and first estimator 52 generated by the model generation apparatus 1. The estimation apparatus 2 according to the present embodiment outputs information relating to a result of estimating the first feature.

As described above, in the present embodiment, by the first training step, the second estimator 53 is trained to have the capability of executing the estimation task relating to the second feature based on the component corresponding to the second feature that is included in the feature amount obtained by the coder 51. On the other hand, by the second training step, the coder 51 is trained to have the capability of converting the input data (training data 121) into feature amounts such that the estimation task relating to the second feature by the second estimator 53 fails depending on the estimation performance of the second estimator 53.

In the present embodiment, by alternately and repeatedly executing the first training step and the second training step, adversarial learning of the coder 51 and the second estimator 53 is executed. As a result, while the estimation performance of the second estimator 53 is improved, it is possible to make the feature amounts obtained by the coder 51 unlikely to include components corresponding to the second feature, so that the estimation task by the second estimator 53 fails.

In addition, in the third training step, the first estimator 52 is trained to have the capability of executing an estimation task relating to the first feature based on the feature amount obtained by the coder 51. At the same time, the coder 51 is trained to have the capability of converting the input data (training data 121) into a feature amount including a component corresponding to the first feature, so that the first estimator 52 can appropriately execute the estimation task relating to the first feature.

Thus, machine learning according to the present embodiment can make the feature amounts obtained by the trained coder 51 likely to include components corresponding to the first feature and unlikely to include components corresponding to the second feature. Accordingly, it is possible to make it difficult for information relating to the second feature to be taken into consideration in executing an estimation task relating to the first feature by the first estimator 52.

Accordingly, the model generation apparatus 1 according to the present embodiment can generate a trained coder 51 and a trained first estimator 52 that can execute an estimation task relating to the first feature in a way that is robust against differences in the second feature.

Note that, in the example shown in FIG. 1, the model generation apparatus 1 and the estimation apparatus 2 are connected to each other via a network. The type of the network may be selected as appropriate from, for example, the Internet, a wireless communication network, a mobile communication network, a telephone network, a dedicated network, and the like. Note, however, that the method for exchanging data between the model generation apparatus 1 and the estimation apparatus 2 is not limited to this example, and may be selected as appropriate depending on the embodiment. For example, data may be exchanged between the model generation apparatus 1 and the estimation apparatus 2, using a storage medium.

Also, in the example shown in FIG. 1, the model generation apparatus 1 and the estimation apparatus 2 are constituted by separate computers. However, the configuration of the estimation system 100 according to the present embodiment is not limited to this example, and may be selected as appropriate depending on the embodiment. For example, the model generation apparatus 1 and the estimation apparatus 2 may be constituted by a single computer. Also, for example, at least one of the model generation apparatus 1 and the estimation apparatus 2 may also be constituted by a plurality of computers.

2 Configuration Example

[Hardware Configuration]
<Model Generation Apparatus>

Figure 2:
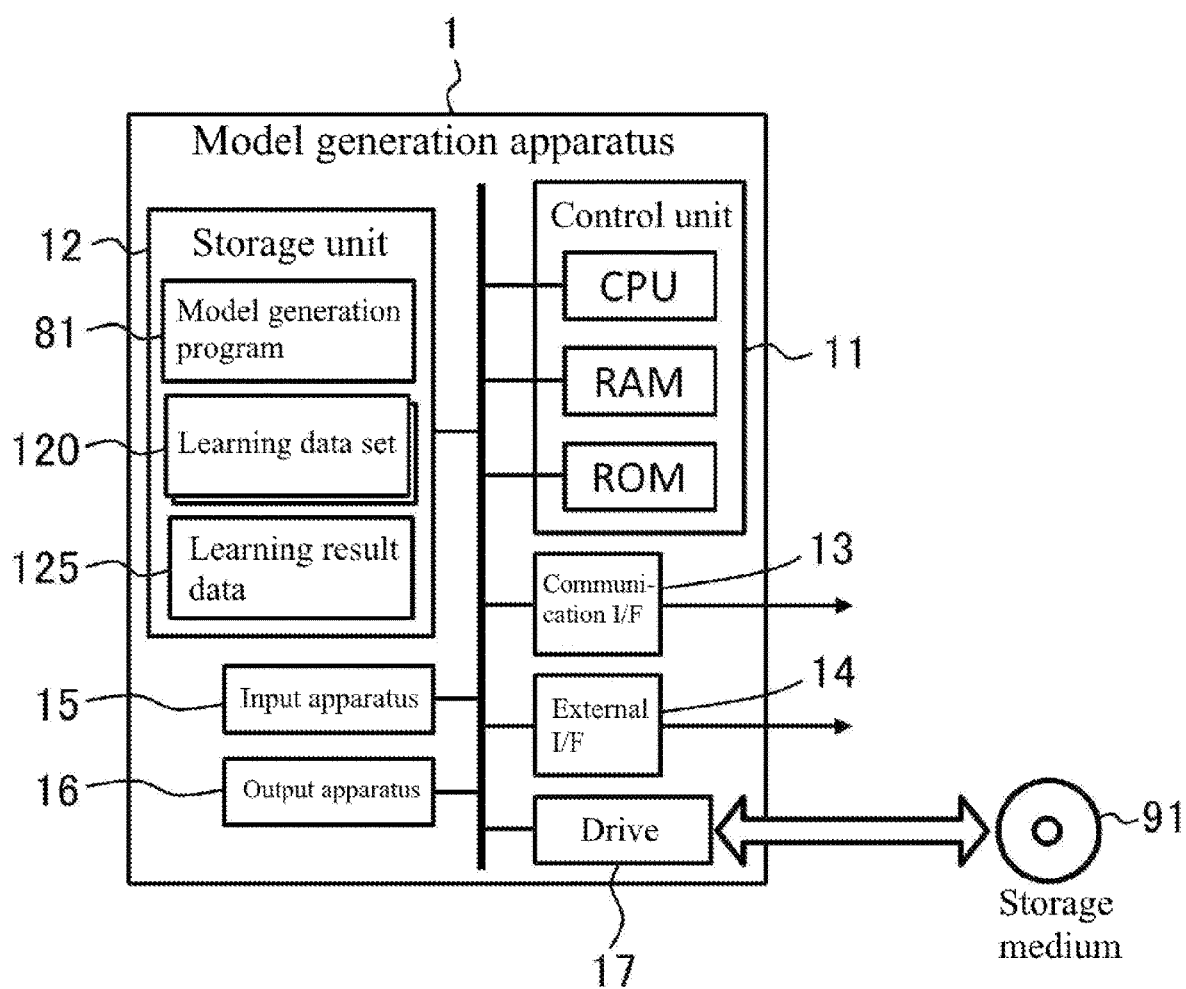
FIG. 2 is a schematic diagram illustrating an example of a hardware configuration of a model generation apparatus according to one or more embodiments.

The following will describe an example of a hardware configuration of the model generation apparatus 1 according to the present embodiment with reference to FIG. 2. FIG. 2 schematically illustrates an example of the hardware configuration of the model generation apparatus 1 according to the present embodiment.

As shown in FIG. 2, the model generation apparatus 1 according to the present embodiment is a computer in which a control unit 11, a storage unit 12, a communication interface 13, an external interface 14, an input apparatus 15, an output apparatus 16, and a drive 17 are electrically connected to each other. Note that in FIG. 2, the communication interface and the external interface are respectively denoted as "communication I/F" and "external I/F".

The control unit 11 includes a CPU (Central Processing Unit), which is a hardware processor, a RAM (Random Access Memory), a ROM (Read Only Memory), and the like, and is configured to execute information processing based on a program and various types of data. The storage unit 12 is an example of a memory, and is constituted by a hard disk drive, a solid-state drive, or the like. In the present embodiment, the storage unit 12 stores various types of information such as a model generation program 81, a plurality of learning data sets 120, and learning result data 125.

The model generation program 81 is a program for the model generation apparatus 1 to execute later-described information processing (FIGS. 7 and 8) relating to machine learning of the learning model 5. The model generation program 81 includes a series of commands for this information processing. The model generation program 81 may also be referred to simply as "generation program", "learning program", or the like. The plurality of learning data sets 120 are used for machine learning of the learning model 5. The learning result data 125 indicates information relating to a trained coder 51 and a trained first estimator 52 generated by the machine learning. In the present embodiment, the learning result data 125 are generated as a result of execution of the model generation program 81. Details thereof will be described later.

The communication interface 13 is a wired LAN (Local Area Network) module, a wireless LAN module, or the like, and is an interface for performing wired or wireless communication via a network. The model generation apparatus 1 may use this communication interface 13 to perform data communication with another information processing apparatus (e.g., the estimation apparatus 2) via a network.

The external interface 14 is, for example, a USB (Universal Serial Bus) port, a dedicated port, or the like, and is an interface for connecting to an external apparatus. The type and the number of external interfaces 14 may be selected as appropriate depending on the type and the number of external apparatuses to be connected. The model generation apparatus 1 may also be connected to a sensor for acquiring the training data 121 via the external interface 14.

The input apparatus 15 is an apparatus for performing input, such as a mouse or a keyboard. Also, the output apparatus 16 is an apparatus for performing output, such as a display or a speaker. An operator such as a user can operate the model generation apparatus 1 by using the input apparatus 15 and the output apparatus 16.

The drive 17 is, for example, a CD drive, a DVD drive, or the like, and is a drive apparatus for reading various types of information such as programs stored in a storage medium 91. The type of the drive 17 may be selected as appropriate according to the type of the storage medium 91. At least one of the model generation program 81 and the plurality of learning data sets 120 may be stored in this storage medium 91.

The storage medium 91 is a medium that stores various types of information such as programs via an electrical, magnetic, optical, mechanical, or chemical effect such that the stored information such as the programs can be read by an apparatus or a machine such as a computer. The model generation apparatus 1 may acquire at least one of the model generation program 81, and the plurality of learning data sets 120 from the storage medium 91.

Here, in FIG. 2, a disk-type storage medium such as a CD or a DVD is illustrated as an example of the storage medium 91. However, the type of the storage medium 91 is not limited to the disk type, and the storage medium 91 may be a medium other than a disk-type medium. Storage media other than disk-type media include a semiconductor memory such as a flash memory, for example. The type of the drive 17 may be selected as appropriate depending on the type of the storage medium 91.

Note that constituent elements of the specific hardware configuration of the model generation apparatus 1 can be omitted, replaced, and added as appropriate depending on the embodiment. For example, the control unit 11 may also include a plurality of hardware processors. The hardware processors may also be constituted by a microprocessor, an FPGA (field-programmable gate array), a DSP (digital signal processor), and the like. The storage unit 12 may be constituted by the RAM and ROM included in the control unit 11. At least one of the communication interface 13, the external interface 14, the input apparatus 15, the output apparatus 16, and the drive 17 may be omitted. The model generation apparatus 1 may also be constituted by a plurality of computers. In this case, the hardware configuration of the computers may be the same, or may not be the same. Also, the model generation apparatus 1 may be a general-purpose server apparatus, a PC (Personal Computer), or the like, instead of an information processing apparatus that is specifically designed for the service to be provided.

<Estimation Apparatus>

Figure 3:
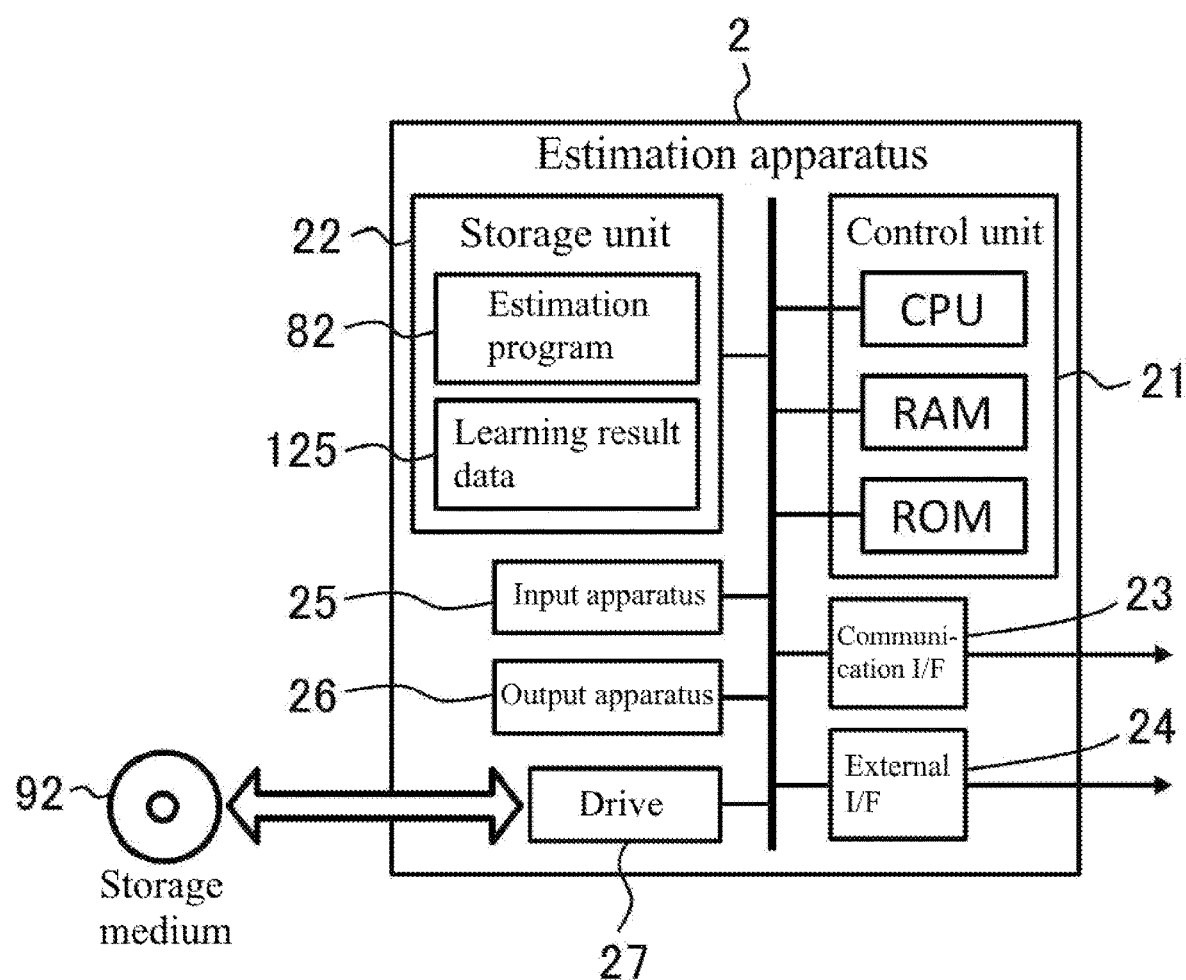
FIG. 3 is a schematic diagram illustrating an example of a hardware configuration of an estimation apparatus according to one or more embodiments.

The following will describe an example of a hardware configuration of the estimation apparatus 2 according to the present embodiment with reference to FIG. 3. FIG. 3 schematically illustrates an example of the hardware configuration of the estimation apparatus 2 according to the present embodiment.

As shown in FIG. 3, the estimation apparatus 2 according to the present embodiment is a computer in which a control unit 21, a storage unit 22, a communication interface 23, an external interface 24, an input apparatus 25, an output apparatus 26, and a drive 27 are electrically connected to each other. Note that in FIG. 3, similarly to FIG. 2, the communication interface and the external interface are respectively denoted as "communication I/F" and "external I/F".

The control unit 21 to the drive 27 of the estimation apparatus 2 may be configured similarly to the control unit 11 to the drive 17 of the model generation apparatus 1. That is to say, the control unit 21 includes a CPU, which is a hardware processor, a RAM, a ROM, and the like, and is configured to execute various types of information processing based on a program and data. The storage unit 22 is constituted by a hard disk drive, a solid-state drive, or the like. The storage unit 22 stores various types of information such as an estimation program 81, the learning result data 125, and the like.

An estimation program 82 is a program for the estimation apparatus 2 to execute later-described information processing (FIG. 9) for executing an estimation task relating to the first feature in a predetermined type of data, using a trained coder 51 and first estimator 52. The estimation program 82 includes a series of commands for this information processing. Details thereof will be described later.

The communication interface 23 is a wired LAN module, a wireless LAN module, or the like, and is an interface for performing wired or wireless communication via a network. The estimation apparatus 2 may use the communication interface 23 to perform data communication with another information processing apparatus (e.g., model generation apparatus 1) via a network.

The external interface 24 is, for example, a USB port, a dedicated port, or the like, and is an interface for connecting to an external apparatus. The type and the number of external interfaces 24 may be selected as appropriate according to the type and the number of external apparatuses to be connected. The estimation apparatus 2 may also be connected to a sensor for acquiring object data, via the external interface 24.

The input apparatus 25 is an apparatus for performing input, such as a mouse or a keyboard. Also, the output apparatus 26 is an apparatus for performing output, such as a display or a speaker. An operator such as a user can operate estimation apparatus 2 by using the input apparatus 25 and the output apparatus 26.

The drive 27 is, for example, a CD drive, a DVD drive, or the like, and is a drive apparatus for reading various types of information such as programs stored in a storage medium 92. The type of the storage medium 92 may be a disk type or a type other than the disk type. The type of the drive 27 may be selected as appropriate depending on the type of the storage medium 92. At least one of the estimation program 82 and the learning result data 125 may be stored in the storage medium 92. Also, the estimation apparatus 2 may acquire at least one of the estimation program 82 and the learning result data 125 from the storage medium 92.

Note that constituent elements of the specific hardware configuration of the estimation apparatus 2 can be omitted, replaced, and added as appropriate depending on the embodiment. For example, the control unit 21 may also include a plurality of hardware processors. The hardware processors may also be constituted by a microprocessor, an FPGA, a DSP, and the like. The storage unit 22 may be constituted by the RAM and the ROM included in the control unit 21. At least one of the communication interface 23, the external interface 24, the input apparatus 25, the output apparatus 26, and the drive 27 may be omitted. The estimation apparatus 2 may also be constituted by a plurality of computers. In this case, the hardware configuration of the computers may be the same, or may not be the same. Also, the estimation apparatus 2 may be a general-purpose server apparatus, a general-purpose PC, or the like, instead of an information processing apparatus that is specifically designed for the service to be provided.

[Software Configuration]
<Model Generation Apparatus>

Figure 4:
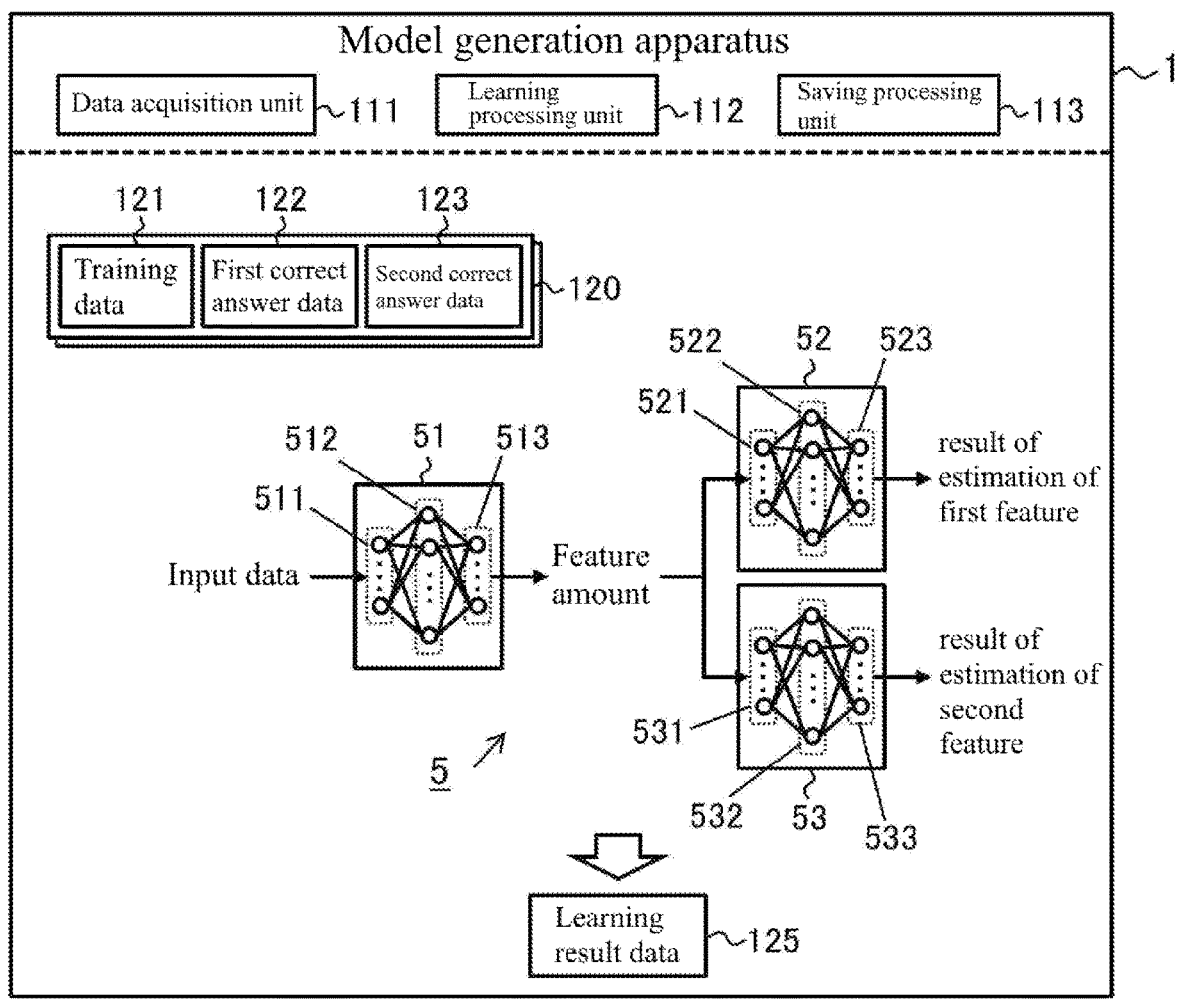
FIG. 4 is a schematic diagram illustrating an example of a software configuration of a model generation apparatus according to one or more embodiments.
Figure 5:
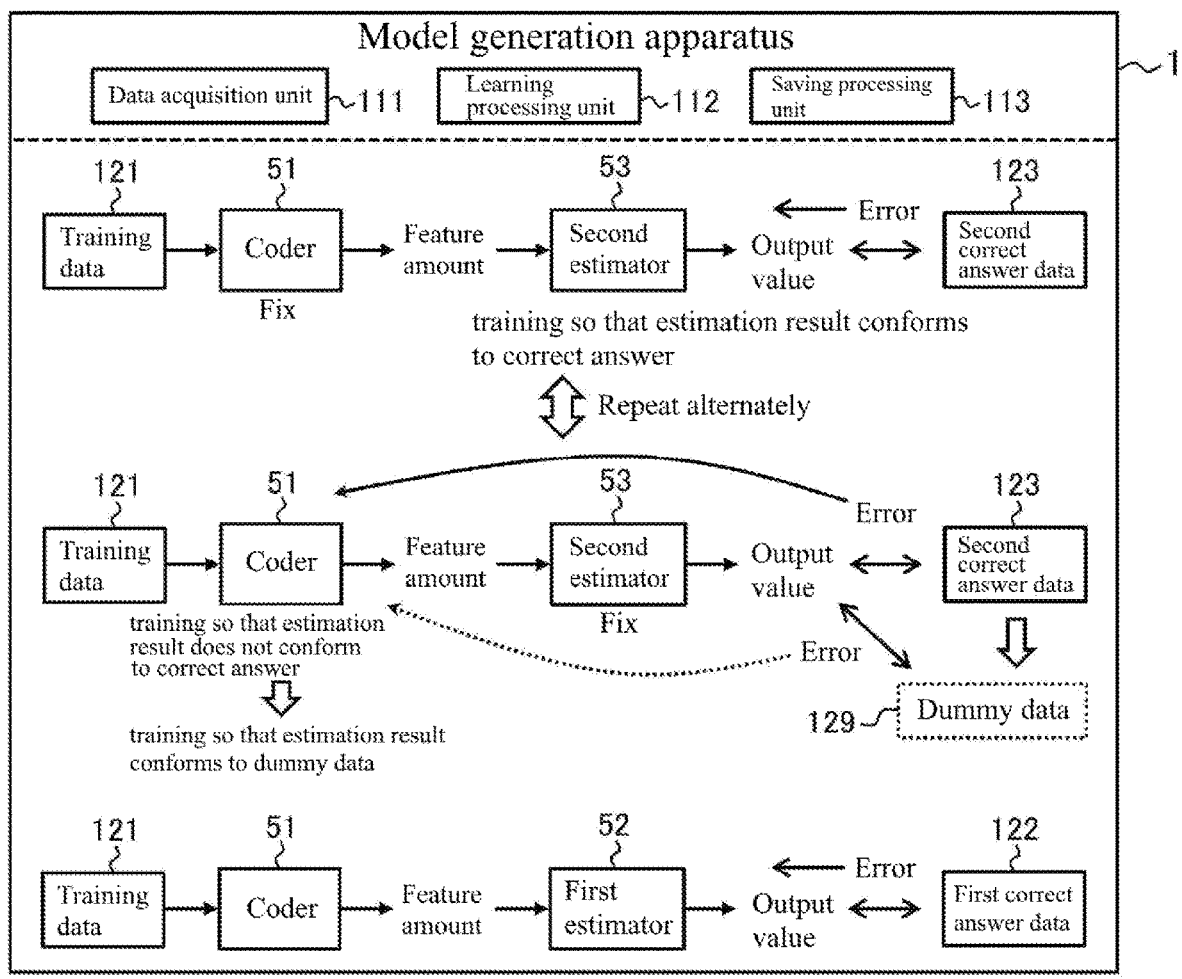
FIG. 5 is a schematic diagram illustrating an example of a processing procedure of machine learning using a model generation apparatus according to one or more embodiments.

The following will describe an example of a software configuration of the model generation apparatus 1 according to the present embodiment with reference to FIGS. 4 and 5. FIG. 4 schematically illustrates an example of the software configuration of the model generation apparatus 1 according to the present embodiment. FIG. 5 schematically illustrates an example of a processing procedure of machine learning by the model generation apparatus 1 according to the present embodiment.

The control unit 11 of the model generation apparatus 1 deploys the model generation program 81 stored in the storage unit 12 in the RAM. Then, the control unit 11 controls each constituent element by the CPU interpreting and executing the commands included in the model generation program 81 deployed in the RAM. With this, as shown in FIG. 4, the model generation apparatus 1 according to the present embodiment operates as a computer including a first data acquisition unit 111, a learning processing unit 112, and a saving processing unit 113, as software modules. That is to say, in the present embodiment, each software module of the model generation apparatus 1 is realized by the control unit 11 (CPU).

The data acquisition unit 111 acquires the plurality of learning data sets 120 each constituted by a combination of training data 121, first correct answer data 122 indicating a first feature included in the training data 121, and second correct answer data 123 indicating a second feature included in the training data 121 and is different from the first feature. The learning processing unit 112 executes machine learning of the learning model 5 using the acquired plurality of learning data sets 120.

The learning model 5 according to the present embodiment includes the coder 51, the first estimator 52, and the second estimator 53. The coder 51 is arranged on the input side. The coder 51 is configured to output, in response to input of a predetermined type of data, an output value that corresponds to a feature amount obtained by converting the input data. In contrast, the first estimator 52 and the second estimator 53 are arranged in parallel to each other on the output side. The output of the coder 51 is connected to the inputs of the estimators (52, 53). Accordingly, the output value of the coder 51, that is, the feature amount obtained by converting the input data is input to the estimators (52, 53). The first estimator 52 is configured to output, in response to the input of the feature amount, the output value that corresponds to a result of estimating the first feature included in the input data based on the feature amount. The second estimator 53 is configured to output, in response to the input of the feature amount, an output value that corresponds to a result of estimating the second feature included in the input data based on the feature amount.

As shown in FIG. 5, machine learning according to the present embodiment includes the first to third training steps. In the first training step, the learning processing unit 112 trains the second estimator 53 so that, with respect to each of the learning data sets 120, a result of estimating the second feature obtained from the second estimator 53 by giving the training data 121 to the coder 51 conforms to the second correct answer data 123. In the second training step, the learning processing unit 112 trains the coder 51 so that, with respect to each of the learning data sets 120, a result of estimating the second feature obtained from the second estimator 53 by giving the training data 121 to the coder 51 does not conform to the second correct answer data 123. The learning processing unit 112 executes the first training step and the second training step alternately and repeatedly. In the third training step, the learning processing unit 112 trains the coder 51 and the first estimator 52 so that, with respect to each of the learning data sets 120, a result of estimating the first feature obtained from the first estimator 52 by giving the training data 121 to the coder 51 corresponds to the first correct answer data 122.

Note that the method for training the coder 51 so that the estimation result does not conform to the second correct answer data 123 is not particularly limited, and may be determined as appropriate depending on the embodiment. As an example, the learning processing unit 112 may acquire, with respect to each of the learning data sets 120, dummy data 129 that corresponds to the second correct answer data 123 and is constituted by values different from those of the corresponding second correct answer data 123. In this case, training the coder 51 so that the estimation result does not conform to the second correct answer data 123 may be constituted by training the coder 51 so that a result of estimating the second feature obtained from the second estimator 53 by giving the training data 121 to the coder 51 conforms to the dummy data 129.

With the execution of the above-described training steps, the trained learning model 5 is generated. As shown in FIG. 4, the saving processing unit 113 generates information relating to the trained coder 51 and first estimator 52 as the learning result data 125. Then, the saving processing unit 113 saves the generated learning result data 125 in a predetermined storage area. Note that the trained second estimator 53 may be dealt with as appropriate. The learning result data 125 may or may not include information relating to the trained second estimator 53.

[Configuration of Machine Learning Model]

The following will describe configurations of the coder 51, the first estimator 52, and the second estimator 53. An appropriate model that can execute machine learning may be used as the coder 51, the first estimator 52, and the second estimator 53. As shown in FIG. 4, in the present embodiment, each of the coder 51, the first estimator 52, and the second estimator 53 is constituted by a multilayer fully connected neural network. Each of the coder 51, the first estimator 52, and the second estimator 53 includes an input layer (511, 521, 531), an intermediate (hidden) layer (512, 522, 532), and an output layer (513, 523, 533).

Note, however, that the structure of each of the coder 51, the first estimator 52, and the second estimator 53 is not limited to this example, and may be determined as appropriate depending on the embodiment. For example, the number of intermediate layers (512, 522, 532) is not limited to one, and may be two or more. Alternatively, the intermediate layer (512, 522, 532) may be omitted. The number of layers constituting each neural network is not particularly limited, and may be selected as appropriate. In at least one combination of the coder 51, the first estimator 52, and the second estimator 53, the structures thereof may be at least partially the same, or may be different from each other. Also, in the example of FIG. 4, the neural networks of the coder 51, the first estimator 52, and the second estimator 53 are separate from each other, but at least one combination of the coder 51, the first estimator 52, and the second estimator 53 may be constituted by a single neural network.

Each layer (511 to 513, 521 to 523, 531 to 533) includes at least one neurons (nodes). The number of neurons (nodes) included in each layer (511 to 513, 521 to 523, 531 to 533) is not particularly limited, and may be selected as appropriate depending on the embodiment. Neurons in the adjacent layers are appropriately connected to each other. In the example of FIG. 4, each neuron in one layer is connected to all neurons in the adjacent layer. However, the connections of neurons are not limited to this example, and may be set as appropriate depending on the embodiment.

A weight (connection load) is set for each connection. A threshold value is set for each neuron, and basically, the output of each neuron is determined based on whether or not the sum of products of respective inputs and respective weights exceeds the threshold value. The threshold values may be expressed as activating functions. In this case, the output of each neuron is determined by inputting the sum of products of respective inputs and respective weights to the activating function and executing calculation of the activating function. The type of the activating function is not particularly limited, and may be selected as appropriate depending on the embodiment. The weights of connections between neurons included in the layers (511 to 513, 521 to 523, 531 to 533) and the threshold values of the neurons are examples of the computation parameters of the coder 51, the first estimator 52, and the second estimator 53 that are to be used in their computation processing.

Values of the computation parameters of the coder 51, the first estimator 52, and the second estimator 53 are adjusted in the training steps of the machine learning. Specifically, in the first training step, the learning processing unit 112 inputs the training data 121 of each of the learning data sets 120 to the input layer 511 of the coder 51, and acquires an output value that corresponds to an estimation result of the second feature from the output layer 533 of the second estimator 53. The learning processing unit 112 fixes the values of the computation parameters of the coder 51, and adjusts the values of the computation parameters of the second estimator 53 so that an error between the acquired output value and the second correct answer data 123 is small.

In the second training step, the learning processing unit 112 inputs the training data 121 of each of the learning data sets 120 to the input layer 511 of the coder 51, and acquires the output value that corresponds to the estimation result of the second feature from the output layer 533 of the second estimator 53. The learning processing unit 112 fixes the values of the computation parameters of the second estimator 53, and adjusts the values of the computation parameters of the coder 51 so that an error between the acquired output value and the second correct answer data 123 is large. As an example, the learning processing unit 112 adjusts the computation parameters of the coder 51 so that an error between the acquired output value and the dummy data 129 is small.

In the third training step, the learning processing unit 112 inputs the training data 121 of each of the learning data sets 120 to the input layer 511 of the coder 51, and acquires an output value that corresponds to an estimation result of the first feature from the output layer 523 of the first estimator 52. The learning processing unit 112 adjusts the values of the computation parameters of the coder 51 and the first estimator 52 so that an error between the acquired output value and the first correct answer data 122 is small.

The saving processing unit 113 generates information indicating the structures of the trained coder 51 and first estimator 52 constructed by the machine learning, and the values of the computation parameters thereof, as the learning result data 125. The structures may be specified by, for example, the number of layers from the input layer to the output layer in the corresponding neural network, the types of the layers, the number of neurons included in each layer, the connection relationship of neurons of adjacent layers, or the like. If models in a system have a common structure, information relating to this structure may be omitted from the learning result data 125. The saving processing unit 113 saves the generated learning result data 125 in a predetermined storage area.

<Estimation Apparatus>

Figure 6:
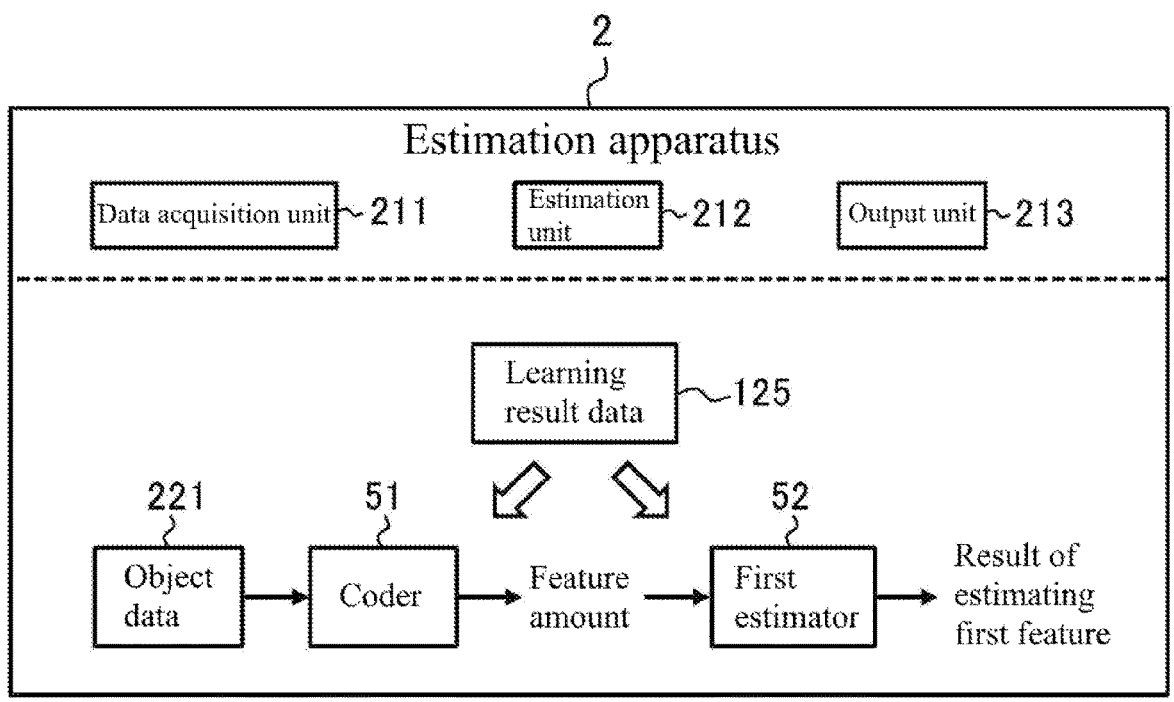
FIG. 6 is a schematic diagram illustrating an example of a software configuration of an estimation apparatus according to one or more embodiments.

The following will describe an example of a software configuration of the estimation apparatus 2 according to the present embodiment with reference to FIG. 6. FIG. 6 schematically illustrates an example of the software configuration of the estimation apparatus 2 according to the present embodiment.

The control unit 21 of the estimation apparatus 2 deploys the estimation program 82 stored in the storage unit 22 in the RAM. Then, the control unit 21 controls each constituent element by the CPU interpreting and executing the commands included in the estimation program 82 deployed in the RAM. With this, as shown in FIG. 6, the estimation apparatus 2 according to the present embodiment operates as a computer including a data acquisition unit 211, an estimation unit 212, and an output unit 213, as software modules. That is to say, in the present embodiment, similarly to the model generation apparatus 1, each software module of the estimation apparatus 2 is realized by the control unit 21 (CPU).

The data acquisition unit 211 acquires object data 221 to be subjected to an estimation task. The estimation unit 212 includes the trained coder 51 and first estimator 52 generated by the model generation apparatus 1, by storing the learning result data 125. The estimation unit 212 estimates the first feature included in the acquired object data 221, using the trained coder 51 and first estimator 52. The output unit 213 outputs information relating to a result of estimating the first feature.

<Other Considerations>

The software modules of the model generation apparatus 1 and the estimation apparatus 2 will be described in detail in a later-described operation example. Note that the present embodiment describes an example in which the software modules of the model generation apparatus 1 and the estimation apparatus 2 are realized by a general-purpose CPU. However, some or all of the software modules described above may be realized by at least one dedicated processor. Also, regarding the software configurations of the model generation apparatus 1 and the estimation apparatus 2, software modules may also be omitted, replaced, and added as appropriate depending on the embodiment.

3. Operation Example

[Model Generation Apparatus]

Figure 7:
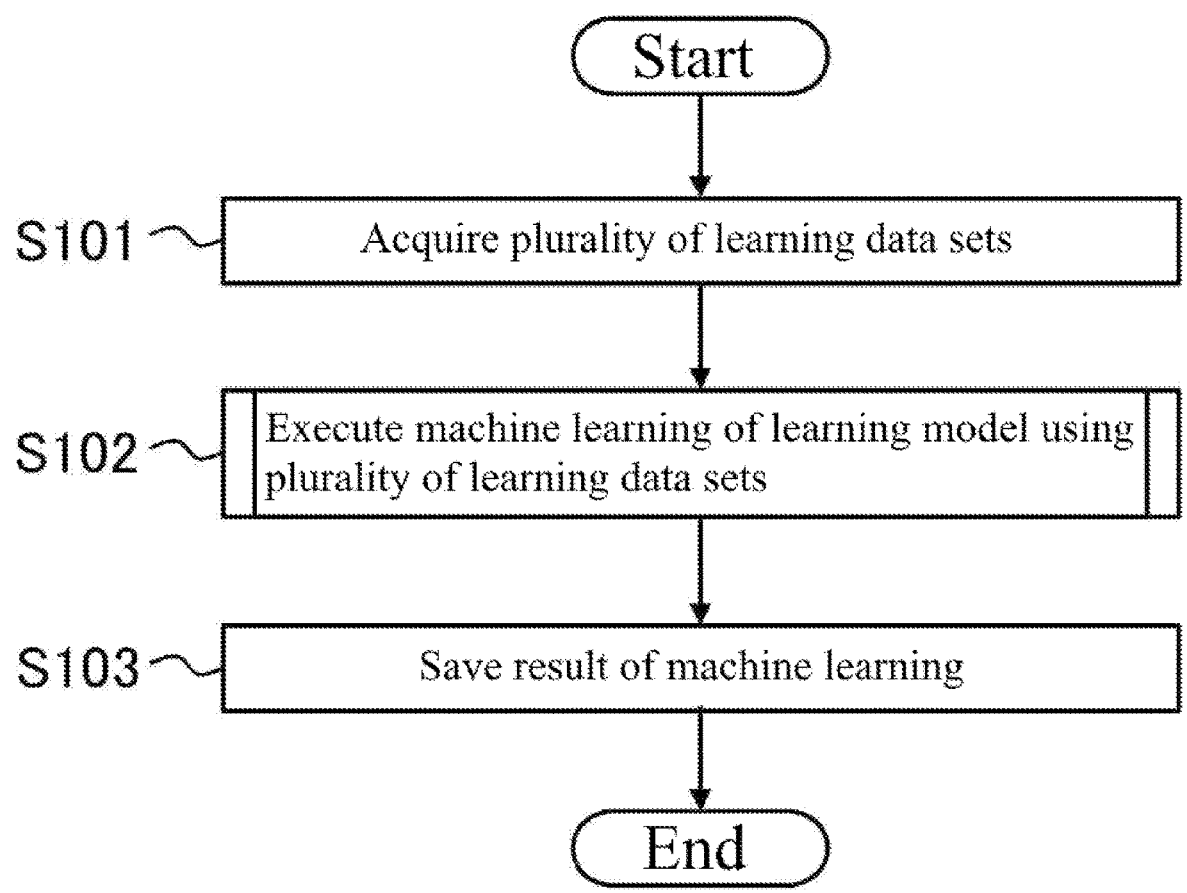
FIG. 7 is a diagram illustrating an example of a processing procedure of a model generation apparatus according one or more embodiments.

The following will describe an operation example of the model generation apparatus 1 with reference to FIG. 7. FIG. 7 is a flowchart illustrating an example of a processing procedure of the model generation apparatus 1 according to the present embodiment. The processing procedures to be described below is an example of the "model generation method" of the present invention. Note, however, that the processing procedures to be described below are merely examples, and each step may be changed to the extent possible. Moreover, in the processing procedure to be described below, steps may also be omitted, replaced, or added as appropriate depending on the embodiment.

[Step S101]

In step S101, the control unit 11 operates as the data acquisition unit 111, and acquires a plurality of learning data sets 120. In the present embodiment, each of the learning data sets 120 is constituted by a combination of training data 121, first correct answer data 122, and second correct answer data 123.

Each of the learning data sets 120 may be generated as appropriate. For example, in a real space or a virtual space, samples of a predetermined type of data including a first feature and a second feature can be acquired as the training data 121. The method for acquiring samples may be selected as appropriate. If the predetermined type of data is sensing data, the training data 121 may be acquired by observing an object using a sensor under various conditions. An object to be observed may be selected according to the estimation task for training the learning model 5. Then, information indicating a result (correct answer) of estimating the first feature and the second feature included in the acquired training data 121 is associated, as the first correct answer data 122 and the second correct answer data 123, with the acquired training data 121. The method for estimating the features may be selected as appropriate. For example, estimation of the features may be performed by an operator. With this, each of the learning data sets 120 can be generated.

Each of the learning data sets 120 may be generated automatically by operation of a computer, or may be generated manually such that an operation of an operator is included at least partially. Also, the generation of each of the learning data sets 120 may be performed by the model generation apparatus 1 or a computer other than the model generation apparatus 1. When each of the learning data sets 120 is generated by the model generation apparatus 1, the control unit 11 executes the above-described series of generation processing automatically or manually by an operation of an operator via the input apparatus 15, and acquires the plurality of learning data sets 120. On the other hand, when each of the learning data sets 120 is generated by another computer, the control unit 11 acquires the plurality of learning data sets 120 generated by the other computer via, for example, a network, the storage medium 91, or the like. Some of the learning data sets 120 may be generated by the model generation apparatus 1, and the remaining learning data sets 120 may be generated by one or more other computers.

The number of learning data sets 120 to be acquired may be selected as appropriate. Upon acquisition of the plurality of learning data sets 120, the control unit 11 moves the processing to the next step S102.

[Step S102]

In step S102, the control unit 11 operates as the learning processing unit 112, and executes machine learning of the learning model 5 using the acquired plurality of learning data sets 120.

Figure 8:
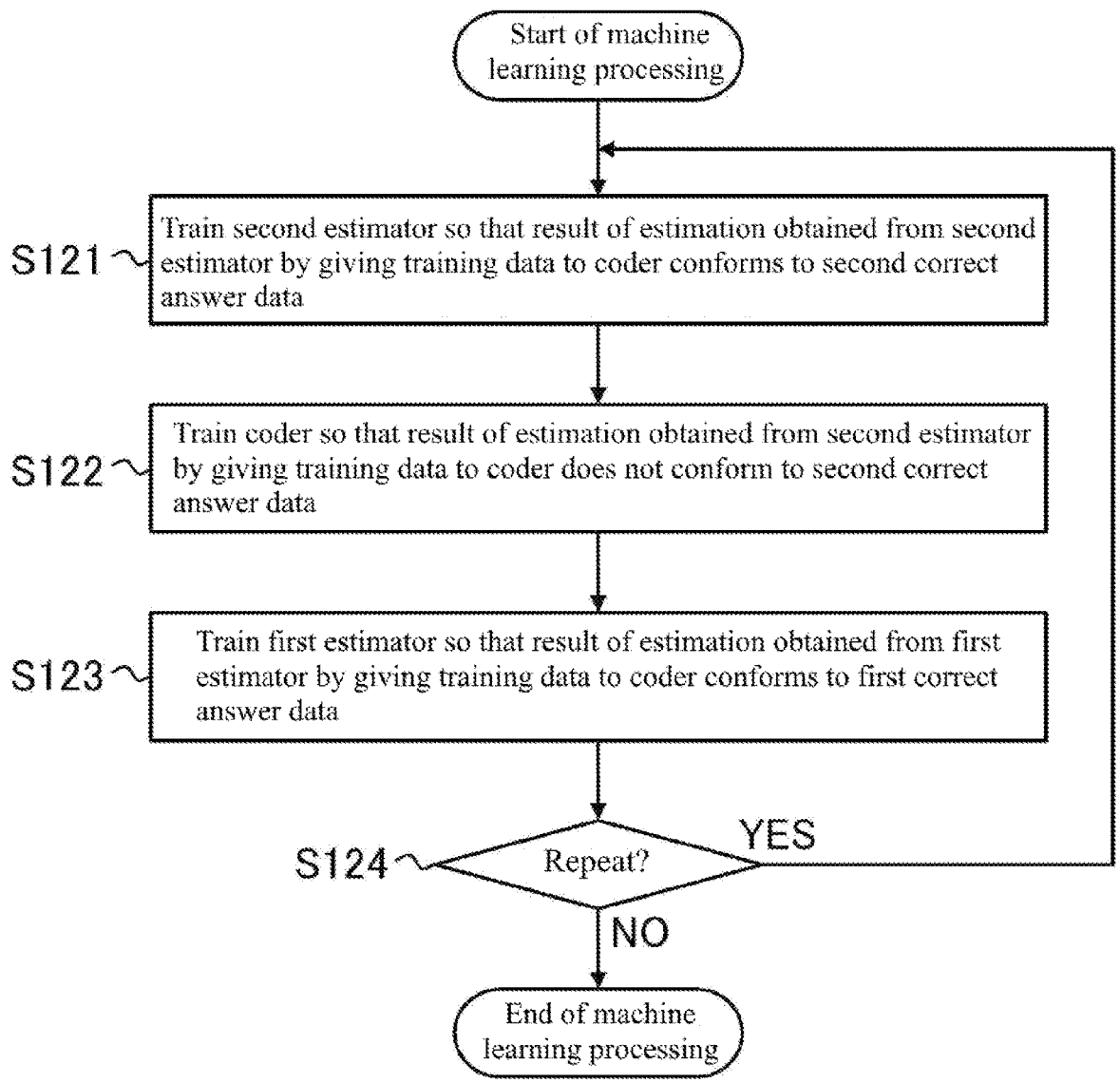
FIG. 8 is a diagram illustrating an example of a processing procedure of machine learning of a model generation apparatus according to one or more embodiments.

FIG. 8 is a flowchart illustrating an example of a processing procedure of a sub routine relating to the machine learning of the learning model 5 according to the present embodiment in step S102. The processing in step S102 according to the present embodiment includes the following processing in steps S121 to S124. Note, however, that the processing procedure to be described below is merely an example, and each piece of processing may be changed to the extent possible. Also, with respect to the processing procedure to be described below, steps may also be omitted, replaced, or added as appropriate depending on the embodiment.

Note that appropriate neural networks may be prepared that respectively constitute the coder 51, the first estimator 52, and the second estimator 53 that are to be subjected to machine learning. With respect to the coder 51, the first estimator 52, and the second estimator 53 that are to be prepared, the structure (such as the number of layers, the number of neurons included in each layer, and connection relationship between neurons of adjacent layers), default values of weights of connections between neurons, and default values of threshold values of neurons may be given by template, or may be given by input of an operator. Also, when relearning is performed, the control unit 11 may prepare the coder 51, the first estimator 52, and the second estimator 53 based on past learning result data obtained by performing machine learning.

[Step S121]

In step S121, the control unit 11 trains the second estimator 53 so that, with respect to each of the learning data sets 120, a result of estimating the second feature obtained from the second estimator 53 by giving the training data 121 to the coder 51 conforms to the second correct answer data 123. Step S121 is an example of the first training step. A stochastic gradient descent method, a mini batch gradient descent method, or the like may be used for the training processing of the machine learning. The same will apply to the later-described training processing in steps S122 and S123.

As an example, first, the control unit 11 gives, with respect to each of the learning data sets 120, the training data 121 to the coder 51, and executes computation processing of the coder 51. In other words, the control unit 11 inputs the training data 121 to the input layer 511 of the coder 51, and performs determination of firing of neurons included in each of the layers 511 to 513 in this order from the input side (that is to say, performs computation of forward propagation). With this computation processing, the control unit 11 obtains an output value that corresponds to a feature amount obtained by converting the training data 121, from the output layer 513 of the coder 51. Then, the control unit 11 inputs the obtained feature amount to the input layer 531 of the second estimator 53, and performs determination of firing of neurons included in each of the layers 531 to 533 in this order from the input side. With this computation processing, the control unit 11 obtains an output value that corresponds to a result of estimating the second feature included in the training data 121 based on the feature amount, from the output layer 533 of the second estimator 53.

The control unit 11 calculates, with respect to each of the learning data sets 120, an error between the output value obtained from the output layer 533 of the second estimator 53 in the above-described computation processing, and the second correct answer data 123. A loss function may be used for the calculation of an error (loss). The loss function is a function that evaluates a difference (that is, a degree of difference) between an output of a machine learning model and a correct answer, and the larger the difference value between the output value obtained from the output layer 533 and this correct answer is, the larger the value of the error calculated using the loss function. The type of loss function that is used for error calculation is not particularly limited, and may be selected as appropriate depending on the embodiment. The loss function may be, for example, a well-known loss function such as a mean squared error or a cross entropy error.

The control unit 11 uses the gradient of the calculated errors of the output values using a back propagation method, and calculates errors of values of the computation parameters (such as the weights of connections of the neurons or threshold values of the neurons) of the second estimator 53. The control unit 11 updates the values of the computation parameters of the second estimator 53 based on the calculated errors. The degree of update of the values of the computation parameters may be adjusted based on a learning rate. The learning rate may be given by designation of an operator or may be given as a set value in a program.

The control unit 11 fixes the values of the computation parameters of the coder 51, and adjusts, by the above-described series of update processing, the values of the computation parameters of the second estimator 53 so that the sum of the calculated errors is small. For example, the control unit 11 may repeatedly adjust the values of the computation parameters using the above-described series of processing, until a predetermined condition is satisfied such as execution being made a predetermined number of times, or the sum of the calculated errors being reduced to a threshold value or less. With this, the control unit 11 can train the second estimator 53 so that, with respect to each of the learning data sets 120, a result of estimating the second feature obtained from the second estimator 53 by giving the training data 121 to the coder 51 conforms to the second correct answer data 123. Upon completion of the training processing of the second estimator 53, the control unit 11 moves the processing to the next step S122.

[Step S122]

In step S122, the control unit 11 trains the coder 51 so that, with respect to each of the learning data sets 120, a result of estimating the second feature obtained from the second estimator 53 by giving the training data 121 to the coder 51 does not conform to the second correct answer data 123. Step S122 is an example of the second training step.

In the present embodiment, to train the coder 51 in the above-described manner, it is possible to use the dummy data 129 constituted by values different from those of the second correct answer data 123. In this case, the control unit 11 may train the coder 51 so that, with respect to each of the learning data sets 120, a result of estimating the second feature obtained from the second estimator 53 by giving the training data 121 to the coder 51 conforms to the dummy data 129.

The dummy data 129 may be acquired as appropriate according to the second correct answer data 123 of each of the learning data sets 120. For example, the dummy data 129 may also be constituted by the second correct answer data 123 of another learning data set 120 different from the corresponding learning data set 120. That is to say, the control unit 11 may select a learning data set 120 other than the learning data set 120 for which the object dummy data 129 is to be acquired, and may use the second correct answer data 123 of the selected other learning data set 120 as the dummy data 129 for the object learning data set 120.

The method for selecting another learning data set 120 is not particularly limited, and may be determined as appropriate depending on the embodiment. For example, another learning data set 120 may be selected from the plurality of learning data sets 120 by a mechanical method such as a random method. Also, for example, by shifting the correspondence relationship between the second correct answer data 123 and the training data 121 of each of the learning data sets 120 in an appropriate direction, the second correct answer data 123 of another learning data set 120 assigned to the object learning data set 120 may be used as the dummy data 129. Also, for example, one learning data set 120 is selected from the plurality of learning data sets 120 by an appropriate method, and the second correct answer data 123 of the selected learning data set 120 may be used as the dummy data 129 for all of the learning data sets 120. According to this method, it is possible to suppress the calculation amount for generating the dummy data 129, and reduce the processing cost of step S122.

Note that the method for generating the dummy data 129 is not limited to this example, and may be determined as appropriate depending on the embodiment. In addition, for example, the control unit 11 may also generate the dummy data 129 by turning over the values of the second correct answer data 123. Also, for example, the control unit 11 may generate data constituted by values obtained by a mechanical method such as a random (such as random digits) method so that they differ from the values of the second correct answer data 123, and may acquire the generated data as the dummy data 129. The plurality of learning data sets 120 may include a learning data set 120 in which the dummy data 129 and the second correct answer data 123 are identical. In this case, this learning data set 120 may be used directly for training, or the dummy data 129 of this learning data set 120 may be changed as appropriate.

The training processing using the dummy data 129 may be executed in the following manner, for example. First, similarly to step S121, the control unit 11 executes, with respect to each of the learning data sets 120, computation processing of forward propagation of the coder 51 and the second estimator 53. With this, the control unit 11 acquires an output value that corresponds to a result of estimation of the second feature included in the training data 121 based on the feature amount, from the output layer 533 of the second estimator 53. Then, the control unit 11 calculates, with respect to each of the learning data sets 120, an error between the output value obtained in the above-described computation processing from the output layer 533 of the second estimator 53, and the dummy data 129. Similarly to step S121, a loss function may be used for the calculation of an error. The control unit 11 back propagates, using the back propagation method, the gradient of the calculated errors of the output values to the computation parameters of the coder 51 via the second estimator 53, and calculates errors of the values of the computation parameters of the coder 51. Then, the control unit 11 updates the values of the computation parameters of the coder 51 based on the calculated errors. The degree of update of the values of the computation parameters may be adjusted based on a learning rate.

The control unit 11 fixes the values of the computation parameters of the second estimator 53, and adjusts, by the above-described series of update processing, the values of the computation parameters of the coder 51 so that the sum of the calculated errors is small. Similarly to step S121, the control unit 11 may repeatedly adjust the values of the computation parameters of the coder 51 using the above-described series of processing, until a predetermined condition is satisfied. With this, the control unit 11 can train the coder 51 so that, with respect to each of the learning data sets 120, a result of estimating the second feature obtained from the second estimator 53 by giving the training data 121 to the coder 51 does not conform to the second correct answer data 123. Upon completion of the training processing of the coder 51, the control unit 11 moves the processing to the next step S123.

Note that the method for training the coder 51 so that a result of estimating the second feature obtained from the second estimator 53 does not conform to the second correct answer data 123 is not limited to the method using dummy data 129. For example, in the training processing, the control unit 11 may also calculate, with respect to each of the learning data sets 120, an error between the output value obtained from the output layer 533 of the second estimator 53 and the second correct answer data 123. The control unit 11 may also calculate a gradient of the errors in a direction in which the calculated error increases, and back propagates, using the back propagation method, the calculated gradient to the input layer 511 of the coder 51. In this process, the control unit 11 may calculate errors of the values of the computation parameters of the coder 51. Then, the control unit 11 may update the values of the computation parameters of the coder 51 based on the calculated errors. By this method as well, the control unit 11 can train the coder 51 so that, with respect to each of the learning data sets 120, a result of estimating the second feature obtained from the second estimator 53 by giving the training data 121 to the coder 51 does not conform to the second correct answer data 123.

[Step S123]

In step S123, the control unit 11 trains the coder 51 and the first estimator 52 so that, with respect to each of the learning data sets 120, a result of estimating the first feature obtained from the first estimator 52 by giving the training data 121 to the coder 51 conforms to the first correct answer data 122. Step S123 is an example of the third training step.

As an example of the training processing, first, the control unit 11 inputs, with respect to each of the learning data sets 120, the training data 121 to the input layer 511 of the coder 51, and performs a determination of firing of neurons included in each of the layers 511 to 513 in this order from the input side. With this computation processing, the control unit 11 obtains an output value that corresponds to a feature amount obtained by converting the training data 121, from the output layer 513 of the coder 51. Then, the control unit 11 inputs the obtained feature amount to the input layer 521 of the first estimator 52, and performs a determination of firing of neurons included in each of the layers 521 to 523 in this order from the input side. With this computation processing, the control unit 11 obtains an output value that corresponds to a result of estimating the first feature included in the training data 121, from the output layer 523 of the first estimator 52.

The control unit 11 calculates, with respect to each of the learning data sets 120, an error between the output value obtained from the output layer 523 of the first estimator 52 in the above-described computation processing, and the first correct answer data 122. A loss function may be used for the calculation of an error. The control unit 11 uses the gradient of the calculated errors of the output values with the back propagation method, and calculates errors of values of the computation parameters of the coder 51 and the first estimator 52. The control unit 11 updates the values of the computation parameters of the coder 51 and the first estimator 52 based on the calculated errors. The degree of update of the values of the computation parameters may be adjusted based on a learning rate.

The control unit 11 adjusts, by the above-described series of update processing, the values of the computation parameters of the coder 51 and the first estimator 52 so that the sum of the calculated errors is small. Similarly to step S121 and the like, the control unit 11 may repeatedly adjust the values of the computation parameters of the coder 51 and the first estimator 52 using the above-described series of processing, until a predetermined condition is satisfied. With this, the control unit 11 can train the coder 51 and the first estimator 52 so that, with respect to each of the learning data sets 120, a result of estimating the first feature obtained from the first estimator 52 by giving the training data 121 to the coder 51 conforms to the first correct answer data 122. Upon completion of the training processing of the coder 51 and the first estimator 52, the control unit 11 moves the processing to the next step S124.

[Step S124]

In step S124, the control unit 11 determines whether or not to repeat the processing in steps S121 to step S123. The control unit 11 may determine whether or not to repeat the processing, based on a predetermined standard. The predetermined standard may be determined as appropriate depending on the embodiment. For example, a predetermined number of times may be set for which the processing is repeated. The predetermined number of times may be given by designation of an operator or may be given as a set value in a program, for example. In this case, the control unit 11 determines whether or not the number of times the processing of steps S121 to S123 has been executed has reached the predetermined number of times. If it is determined that the number of times of the execution has not reached the predetermined number of times, the control unit 11 returns to the processing in step S121, and executes again the processing in steps S121 to S123. With this, steps S121 and S122 are executed alternately and repeatedly. Also, in the present embodiment, step S123 is also included in a loop, step S123 is also executed repeatedly together with steps S121 and S122. On the other hand, if it is determined that the number of times of the execution has reached the predetermined number of times, the control unit 11 completes the processing of machine learning of the learning model 5, and moves the processing to the next step S103.

Note that the order of the training processing in steps S121 to S123 by machine learning of the learning model 5 is not limited to the above-described example, and may be defined as appropriate. For example, step S123 may be executed in parallel to step S122. In this case, in the computation processing of forward propagation in steps S122 and S123, common computation processing of the coder 51 may be executed. Also, for example, in a loop, the processing in step S123 may be executed, and then the processing in steps S121 and S122 may be executed. The processing order of steps S121 and S122 may be switched.

Also, for example, before executing the training in steps S121 and S122 alternately and repeatedly, the control unit 11 may execute at least the training of the coder 51 included in step S123. In this case, when alternately repeating the training in steps S121 and S122 in the same manner as described above, or after having alternately repeated the training in steps S121 and S122, the control unit 11 may execute at least the training of the first estimator 52 included in step S123. Furthermore, before executing the above-described training, the control unit 11 may execute at least the training of coder 51, of the coder 51 and second estimator 53, so that, with respect to each of the learning data sets 120, a result of estimating the second feature obtained from the second estimator 53 by giving, as pre-learning, the training data 121 to the coder 51 conforms to the second correct answer data 123.

[Step S103]

Returning to FIG. 7, in step S103, the control unit 11 operates as the saving processing unit 113, and generates information indicating the structures of the trained coder 51 and first estimator 52 constructed by machine learning and the values of the computation parameters thereof, as the learning result data 125. Then, the control unit 11 saves the generated learning result data 125 in a predetermined storage area.

A predetermined storage area may be, for example, the RAM of the control unit 11, the storage unit 12, an external storage device, a storage medium, or a combination thereof. The storage medium may be, for example, a CD, a DVD, or the like, and the control unit 11 may store the learning result data 125 in the storage medium via the drive 17. The external storage device may be a data server such as a NAS (Network Attached Storage), for example. In this case, the control unit 11 may use the communication interface 13 to store the learning result data 125 in the data server via a network. Also, the external storage device may be an externally-attached storage device connected to the model generation apparatus 1 via the external interface 14, for example. Upon completion of the saving of the learning result data 125, the control unit 11 ends the processing procedure according to the present operation example.

Note that the generated learning result data 125 may be provided to the estimation apparatus 2 at an appropriate timing. For example, the control unit 11 may transfer the learning result data 125 as the processing in step S103, or as processing separate from the processing in step S103. By receiving this transfer, the estimation apparatus 2 may acquire the learning result data 125. Also, the estimation apparatus 2 may use the communication interface 23 to access the model generation apparatus 1 or the data server via a network, and acquire the learning result data 125. Also, for example, the estimation apparatus 2 may acquire the learning result data 125 via the storage medium 92. Also, for example, the learning result data 125 may be incorporated in advance into the estimation apparatus 2.

Furthermore, the control unit 11 may update or newly generate the learning result data 125, by regularly or irregularly repeating the processing in steps S101 to S103. During the repetition, at least some of the plurality of learning data sets 120 may be, for example, changed, modified, added, or deleted as appropriate. Then, the control unit 11 may provide the updated or newly generated learning result data 125 to the estimation apparatus 2 by an appropriate method, and may update the learning result data 125 held by the estimation apparatus 2.

[Estimation Apparatus]

Figure 9:
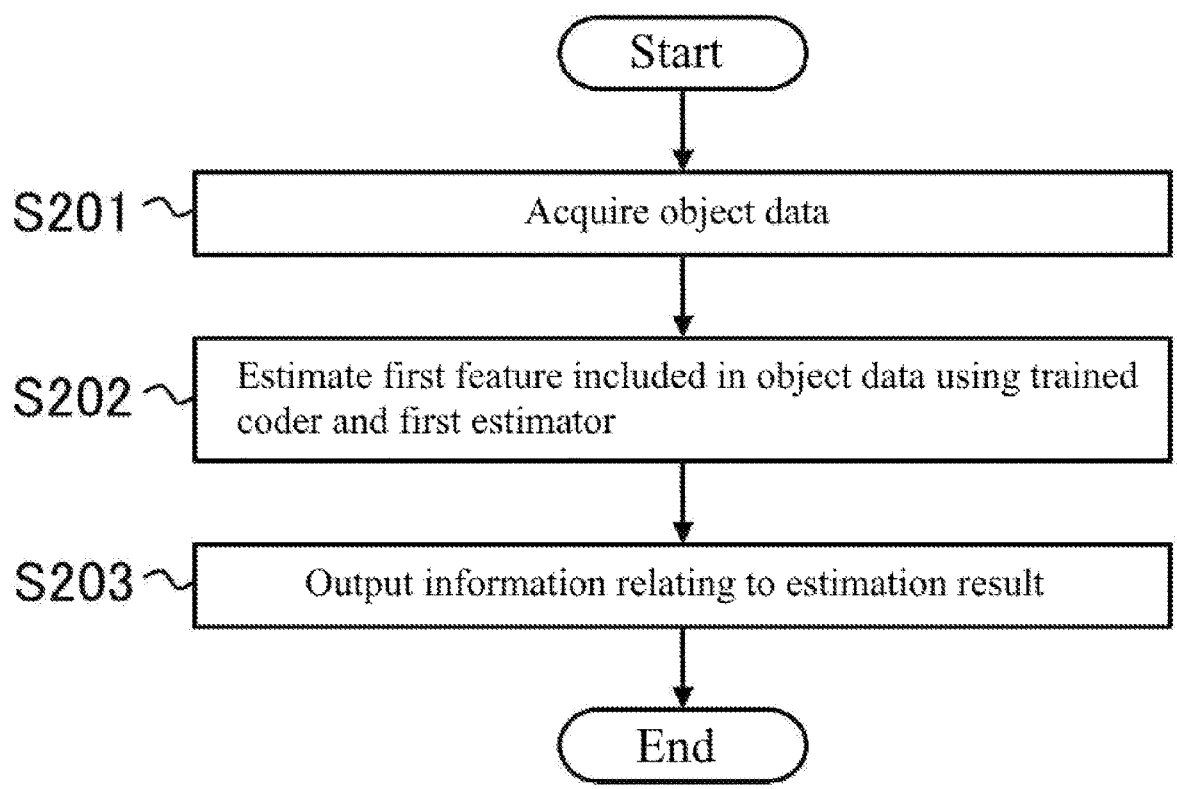
FIG. 9 is a diagram illustrating an example of a processing procedure of an estimation apparatus according to one or more embodiments.

The following will describe an operation example of the estimation apparatus 2 with reference to FIG. 9. FIG. 9 is a flowchart showing an example of the processing procedure of the estimation apparatus 2 according to the present embodiment. The processing procedure to be described below is an example of the estimation method. Note, however, that the processing procedures to be described below are merely examples, and each step may be changed to the extent possible. Moreover, in the processing procedure to be described below, steps may also be omitted, replaced, or added as appropriate depending on the embodiment.

[Step S201]

In step S201, the control unit 21 operates as the data acquisition unit 211, and acquires the object data 221. The object data 221 is a sample of a predetermined type of data to be subjected to an estimation task. The method for acquiring the object data 221 may be determined as appropriate according to the type of data. If the object data 221 is sensing data, it is possible to acquire the object data 221 by observing an object of estimation relating to the first feature using a sensor. Upon acquisition of the object data 221, the control unit 21 moves the processing to the next step S202.

[Step S202]

In step S202, the control unit 21 operates as the estimation unit 212, and configures setting of the trained coder 51 and first estimator 52 with reference to the learning result data 125. The control unit 21 inputs the acquired object data 221 to the input layer 511 of the trained coder 51, and executes computation processing of forward propagation of the trained coder 51 and first estimator 52. With this, the control unit 11 can acquire an output value that corresponds to a result of estimating a first feature included in the object data 221, from the output layer 523 of the trained first estimator 52. That is to say, in the present embodiment, estimating a first feature included in the object data 221 is realized by giving the object data 221 to the trained coder 51 and executing the computation processing of forward propagation of the trained coder 51 and first estimator 52. Upon completion of the processing for estimating a first feature, the control unit 21 moves the processing to the next step S203.

[Step S203]

In step S203, the control unit 21 operates as the output unit 213, and outputs information relating to a result of estimating the first feature.

The content of destination and information to be output may be determined as appropriate depending on the embodiment. For example, the control unit 21 may directly output the result of estimating the first feature for the object data 221 in step S202 to the output apparatus 26. Also, for example, the control unit 21 may execute some sort of information processing based on the result of estimating the first feature. Then, the control unit 21 may output a result obtained by executing the information processing, as information relating to a result of estimation. Outputting a result obtained by executing the information processing may include outputting a specific message according to an estimation result, controlling the operation of an apparatus to be controlled based on an estimation result, and the like. The destination may be, for example, the output apparatus 26, an output apparatus of another computer, an apparatus to be controlled, or the like.

Upon completion of the output of information relating to an estimation result, the control unit 21 ends the processing procedure of the present operation example. Note that during a predetermined period in time, the control unit 21 may execute continuously and repeatedly the series of information processing in steps S201 to S203. The timing of the repetition may be set as appropriate. With this, the estimation apparatus 2 may continuously execute the estimation task relating to the first feature.

[Feature]

As described above, in the present embodiment, in step S121, the second estimator 53 is trained to have the capability of executing an estimation task relating to the second feature based on a component that corresponds to the second feature included in a feature amount obtained by the coder 51. On the other hand, in step S122, the coder 51 is trained to have the capability of converting input data into feature amounts such that the estimation task relating to the second feature performed by the second estimator 53 fails depending on the estimation performance of the second estimator 53. By alternately and repeatedly executing the training processing in steps S121 and S122, it is possible to make the feature amounts obtained by the coder 51 unlikely to include components that correspond to the second feature so that the estimation task performed by the second estimator 53 fails the more the estimation performance of the second estimator 53 improves. In addition, in step S123, the first estimator 52 is trained to have the capability of executing an estimation task relating to the first feature based on the feature amount obtained by the coder 51. With this, the coder 51 is trained to have the capability of converting input data into feature amounts that contain a component corresponding to the first feature so that the first estimator 52 can appropriately execute the estimation task relating to the first feature.

Therefore, the machine learning in step S102 can make the feature amounts obtained by the trained coder 51 likely to include components corresponding to the first feature, and unlikely to include components corresponding to the second feature. With this, it is possible for information relating to the second feature not to be taken into consideration in executing an estimation task relating to the first feature by the first estimator 52. Therefore, with the model generation apparatus 1 according to the present embodiment, it is possible to generate a trained coder 51 and a trained first estimator 52 that can execute an estimation task relating to a first feature in a way that is robust against differences in a second feature. In the estimation apparatus 2 according to the present embodiment, by using the trained coder 51 and first estimator 52 in step S202, it is possible to expect that an accurate estimation task relating to the first feature is executed.

Also, in the present embodiment, the processing in step S123 is repeatedly executed together with steps S121 and S122. Accordingly, in response to values of the computation parameters of the coder 51 being adjusted by the processing in step S122, values of computation parameters of the coder 51 and the first estimator 52 can be adjusted by the processing in step S123, so that they acquire the capability of estimating the first feature based on a feature amount obtained by the coder 51. With this, it is possible to obtain the trained coder 51 and first estimator 52 that can accurately execute an estimation task relating to the first feature.

4. Modifications

Although the embodiment of the present invention has been described above in detail, the above descriptions are merely examples of the present invention in all aspects. Needless to say, various improvements or modifications can be made without departing from the scope of the present invention. For example, the following modifications are possible. Note that, in the following description, the same constituent elements as the constituent elements described in the above embodiment are assigned the same reference numerals, and descriptions of the same points as the points described in the above embodiment are omitted as appropriate. The following modifications may be combined as appropriate.

<4.1>

The estimation system 100 according to the above-described embodiment may be applied to any scenario of executing an estimation task relating to a feature of an object on a predetermined type of data. For example, the estimation system 100 according to the above-described embodiment is applicable to a scenario of estimating a foreground included in image data. Estimating a foreground may include, for example, estimating an attribute of an object appearing in image data. Also, for example, the estimation system 100 according to the above-described embodiment is applicable to a scenario of estimating an attribute of an object based on sensing data obtained by observing the object using a sensor. In the following, modifications in which the application scenario is limited will be illustrated.

(A) Scenario of Visual Inspection

Figure 10:
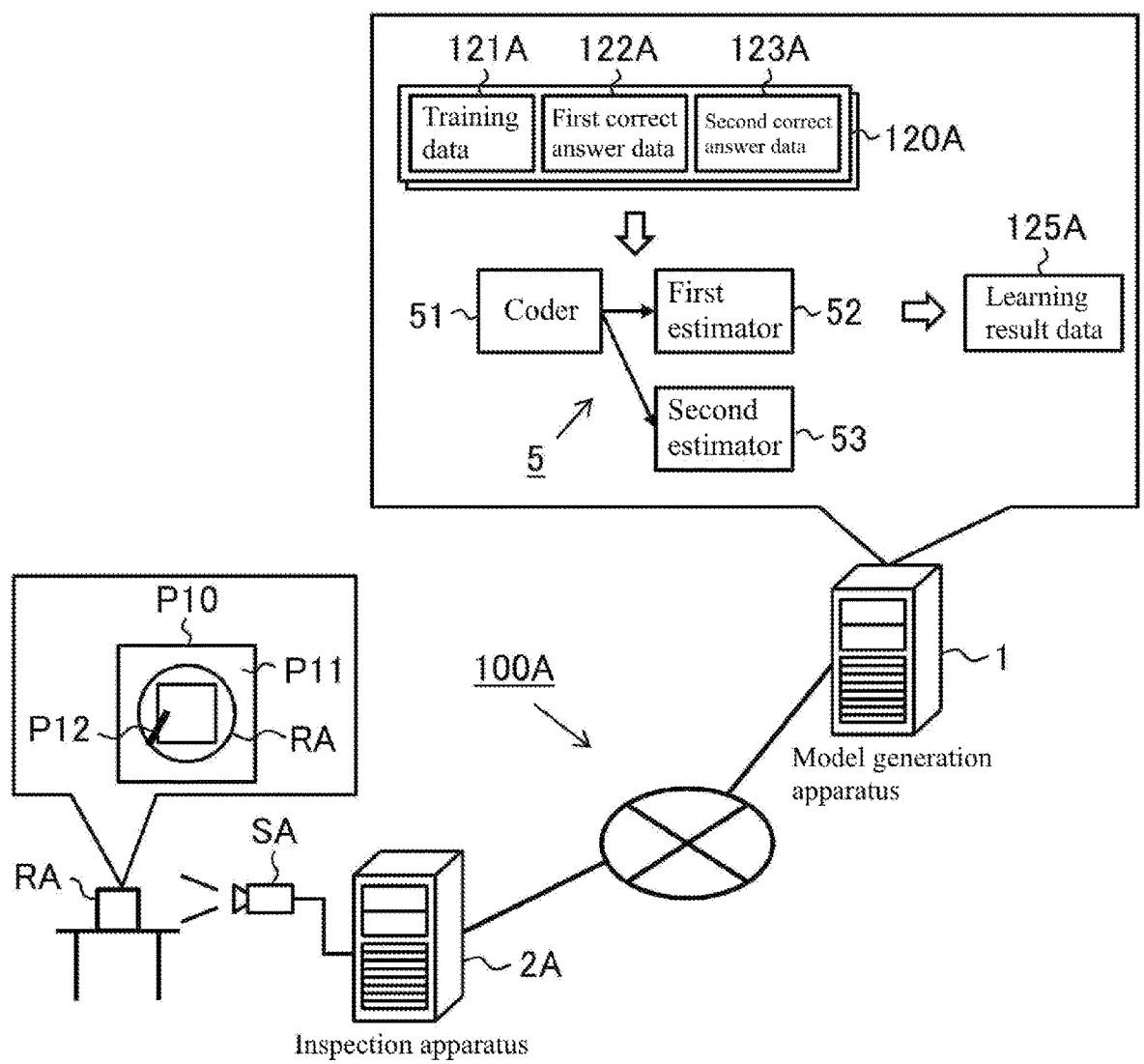
FIG. 10 is a schematic diagram illustrating an example of another scenario to which one or more embodiments is applied.

FIG. 10 schematically illustrates an example of a scenario to which an inspection system 100A according to a first modification is applied. This modification is an example in which the above-described embodiment is applied to a scenario of executing visual inspection of products using image data including images of products. The inspection system 100A according to the present modification includes the model generation apparatus 1 and an inspection apparatus 2A. Similarly to the above-described embodiment, the model generation apparatus 1 and the inspection apparatus 2A may be connected to each other via a network.

The predetermined type of data (that is, later-described training data 121A and object image data 221A) used in this modification is image data of images of products RA. A sample P10 of image data may be obtained by shooting the product RA with a camera SA. The first feature relates to a defect P12 of the product RA. On the other hand, the second feature may be selected as appropriate from features that are other than the defect P12 and can appear in the image data of images of the product RA. For example, the second feature may relate to a background P11 that includes the outer package of the product RA, the sheet of a conveyor, and the like. The second feature may be, for example, an attribute of the background P11 such as the type of the product RA, the identifier of a manufacturing factory, or the type of a production line. Except for these limitations, the inspection apparatus 100A according to the present modification may be configured similarly to the estimation system 100 according to the above-described embodiment.

Note that the product RA may be a product conveyed by a production line, such as an electronic device, an electronic component, an automobile component, a drug, or food, for example. The electronic component may be, for example, a substrate, a chip capacitor, a liquid crystal, a winding of a relay, or the like. The automobile component may be, for example, a con rod, a shaft, an engine block, a power window switch, a panel, or the like. The drug may be, for example, a packed pill, an unplaced pill, or the like. The product RA may be a final product generated after the completion of a production process, an intermediate product generated during the production process, or an initial product prepared before the production process. The defect P12 may be, for example, a blemish, an impurity, a crack, a dent, a burr, color irregularity, a contamination, or the like. Estimating relating to the defect P12 may be expressed by, for example, determining whether or not the product RA includes the defect P12, determining the probability that the product RA includes the defect P12, identifying the type of the defect P12 included in the product RA, specifying the range of the defect P12 included in the product RA, or a combination thereof.

[Model Generation Apparatus]

In the present modification, the model generation apparatus 1 acquires, in step S101, a plurality of learning data sets 120A. Training data 121A of each of the learning data sets 120A is image data in which the product RA appears. First correct answer data 122A indicates information (correct answer) relating to a defect P12 of the product RA appearing in the training data 121A, such as, for example, whether or not there is the defect P12, the type of the defect P12, and the range of the defect P12. The information relating to the defect P12 may be determined as appropriate depending on the content of estimation relating to the defect P12. Second correct answer data 123A indicates information (correct answer) relating to another feature different from the defect P12, such as, for example, an attribute of the background P11.

The model generation apparatus 1 executes, by the processing in step S102, machine learning of the learning model 5 using the acquired plurality of learning data sets 120A. As a result, it is possible to construct the trained coder 51 and first estimator 52 that have acquired the capability of outputting a result of estimation relating to the defect P12, in response to input of image data in which the product RA appears. The model generation apparatus 1 appropriately saves, by the processing in step S103, information relating to the trained coder 51 and first estimator 52 as learning result data 125A in a predetermined storage area. The generated learning result data 125A may be provided to the inspection apparatus 2A at an appropriate timing.

[Inspection Apparatus]

Figure 11A:
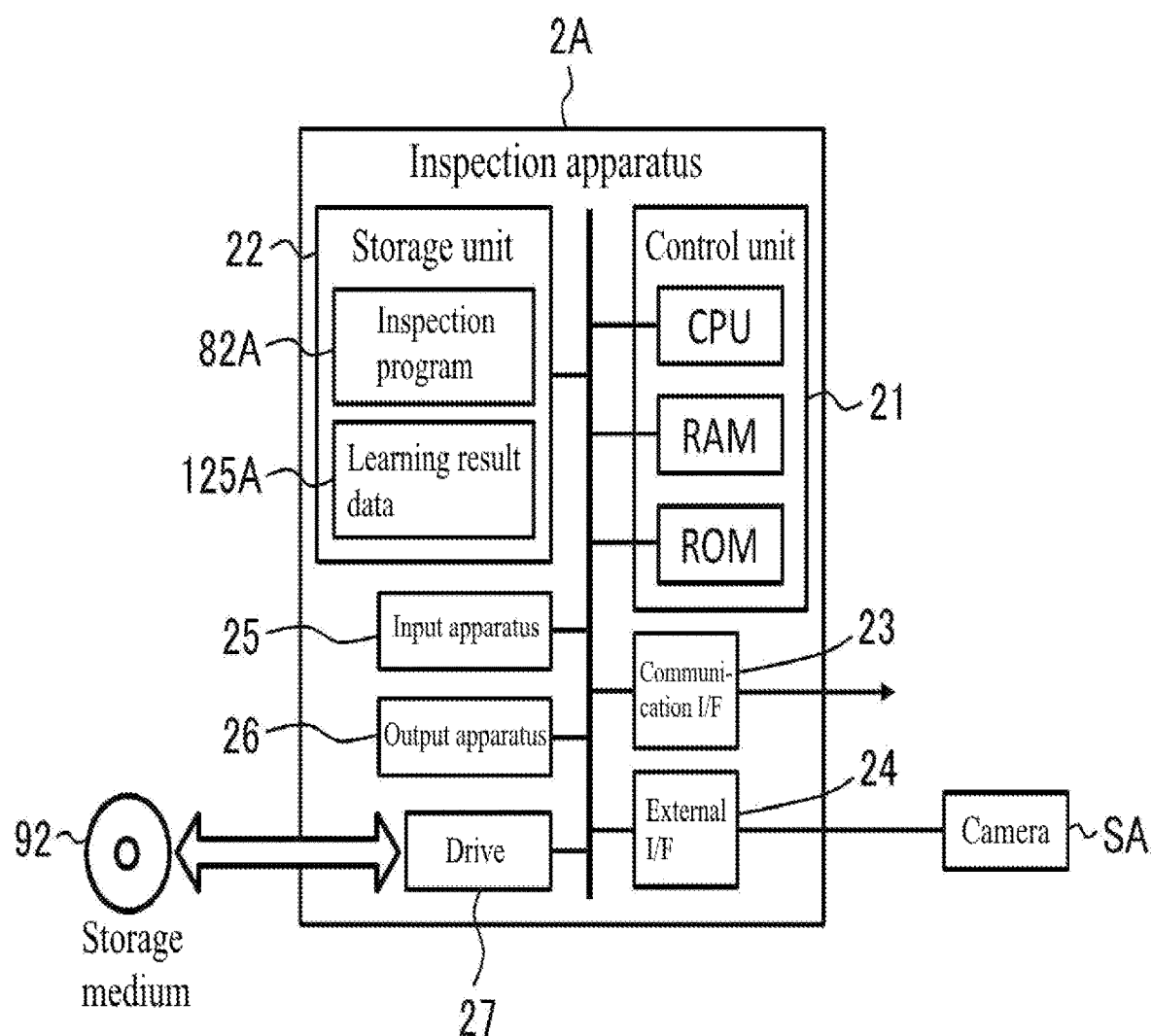
FIG. 11A is a schematic diagram illustrating an example of a hardware configuration of an inspection apparatus according to another embodiment or embodiments.

FIG. 11A schematically illustrates an example of a hardware configuration of the inspection apparatus 2A according to the present modification. As shown in FIG. 11A, the inspection apparatus 2A according to the present modification, similar to the above-described estimation apparatus 2, may be constituted by a computer in which the control unit 21, the storage unit 22, the communication interface 23, the external interface 24, the input apparatus 25, the output apparatus 26, and the drive 27 are electrically connected to each other.

In the present modification, the storage unit 22 stores various types of information such as an inspection program 82A and the learning result data 125A. The inspection program 82A corresponds to the estimation program 82 according to the above-described embodiment. Also, in the present modification, the inspection apparatus 2A is connected to the camera SA via the external interface 24. The camera SA may be a commonly-used RGB camera, a depth camera, an infrared camera, or the like. The camera SA may be placed appropriately at a position at which it can shoot the product RA. For example, the camera SA may be placed in the surrounding area of a conveyor apparatus that conveys the products RA.

Note that the hardware configuration of the inspection apparatus 2A is not limited to this example. Constituent elements of the specific hardware configuration of the inspection apparatus 2A can be omitted, replaced, and added as appropriate depending on the embodiment. The inspection apparatus 2A may also be a general-purpose server apparatus, a general-purpose PC, a PLC, or the like, instead of an information processing apparatus that is specifically designed for the service to be provided.

Figure 11B:
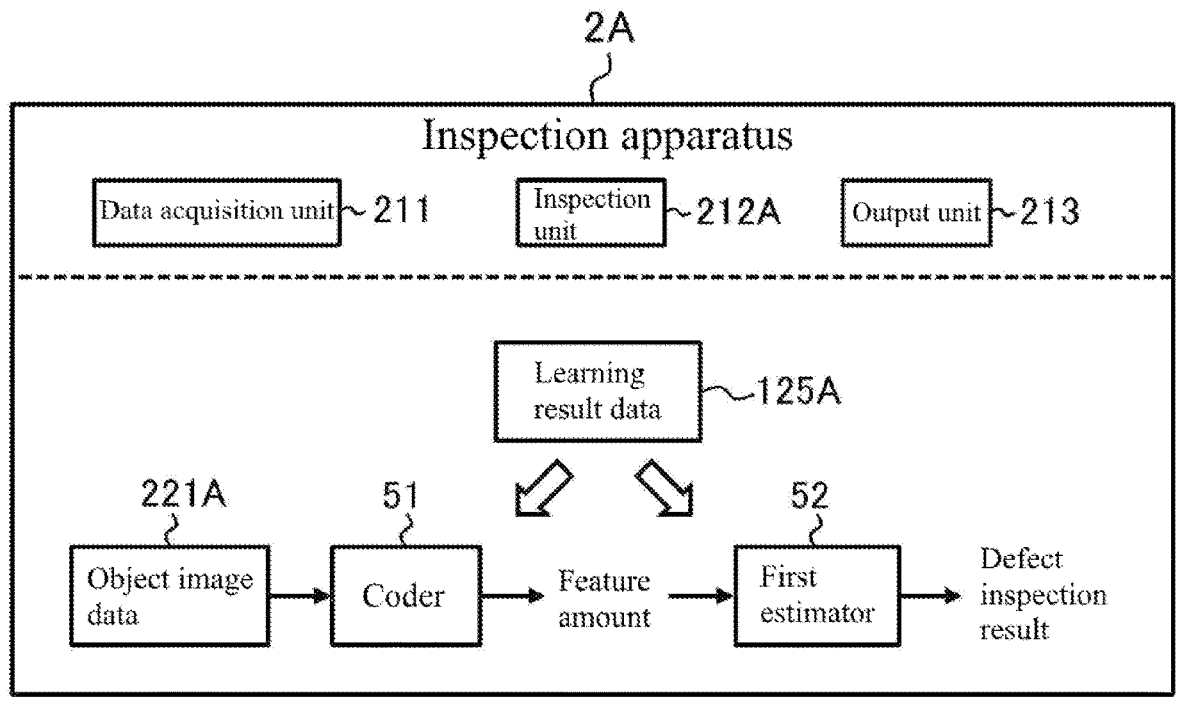
FIG. 11B is a schematic diagram illustrating an example of a software configuration of an inspection apparatus according to another embodiment or embodiments.

FIG. 11B schematically illustrates an example of a software configuration of the inspection apparatus 2A according to the present modification. Similarly to the above-described embodiment, the software configuration of the inspection apparatus 2A is realized by the control unit 21 executing the inspection program 82A. The software configuration of the inspection apparatus 2A is the same as that of the estimation apparatus 2 except for the configuration in which data to be dealt with is limited as described above. An inspection unit 212A includes the trained coder 51 and the first estimator 52, by storing the learning result data 125A. The inspection unit 212A corresponds to the above-described estimation unit 212. With this, the inspection apparatus 2A can execute a series of information processing relating to visual inspection, similarly to the estimation processing of the estimation apparatus 2.

That is to say, in step S201, the control unit 21 acquires object image data 221A in which the product RA to be inspected appears, from the camera SA. In step S202, the control unit 21 operates as the inspection unit 212A, and configures settings of the trained coder 51 and first estimator 52 with reference to the learning result data 125A. The control unit 21 gives the acquired object image data 221A to the trained coder 51, and executes computation processing of forward propagation of the trained coder 51 and first estimator 52. With this, the control unit 11 acquires an output value that corresponds to a result of estimating the defect P12 of the product RA appearing in the object image data 221A, from the trained first estimator 52.

In step S203, the control unit 21 outputs information relating to a result of estimating the defect P12 of the product RA. For example, the control unit 21 may directly output a result of estimating the defect P12 of the product RA to the output apparatus 26. Alternatively, for example, if it is determined that the product RA includes a defect P12, the control unit may output a warning for notifying this fact to the output apparatus 26. Also, when the inspection apparatus 2A is connected to a conveyor apparatus for conveying the products RA, the control unit 21 may control the conveyor apparatus such that products RA including a defect P12 and products RA including no defect P12 are conveyed on different lines based on the result of estimating the defect P12, for example.

[Feature]

According to the present modification, by machine learning of the model generation apparatus 1, it is possible to make a feature amount output by the trained coder 51 likely to include a component that corresponds to information relating to the defect P12, and unlikely to include a component that corresponds to a feature other than the defect P12, such as information relating to the background P11. Accordingly, it is possible to generate a trained coder 51 and a trained first estimator 52 that can execute an estimation task relating to the defect P12 in a way that is robust against differences in another feature such as the background P11. It is possible to expect that the inspection apparatus 2A according to this modification accurately executes an estimation task (that is, visual inspection) relating to the defect P12 by using the trained coder 51 and first estimator 52.

[Other Considerations]

In the above-described first modification, the product RA is an example of an object, and information relating to the defect P12 is an example of an attribute of the object. The attribute of the background P11 is an example of a feature other than an attribute of an object. The attribute of an object and another feature is not limited to examples of the defect P12 and the background P11 of the product RA, and may be selected as appropriate depending on the embodiment. That is, the estimation system 100 according to the above-described embodiment may be applied to various scenarios of estimating an attribute of a suitable object appearing in image data. In this case, the predetermined type of data may be image data in which an object appears. Accordingly, the first feature may be an attribute of an object, and the second feature may be another feature different from the attribute of the object. With this, it is possible to generate a trained coder 51 and a trained first estimator 52 that can execute an estimation task relating to an attribute of an object in a way that is robust against differences in feature other than the attribute of the object.

Also, if the portion other than products RA is regarded as the background P11, the portion of images of the products RA is an example of a foreground. Alternatively, if the portion other than defects P12 of products RA is regarded as the background P11, the range in which defects P12 appears is an example of a foreground. The foreground and the background are not limited to such examples, and may be selected as appropriate depending on the embodiment. That is, the estimation system 100 according to the above-described embodiment may be applied to various scenarios of estimating a feature included in a suitable foreground appearing in image data. In this case, a predetermined type of data may be image data including a foreground and a background. Accordingly, the first feature may relate to the foreground, and the second feature may relate to the background. Suitable components that can be extracted from image data may be selected as the foreground. With this, it is possible to generate a trained coder 51 and a trained first estimator 52 that can execute an estimation task relating to the foreground in a way that is robust against differences in backgrounds.

Note that a foreground may be constituted by suitable components that can be extracted from image data, separately from a background. The first feature may be any information that can be directly or indirectly derived from a foreground. Estimating a feature included in a foreground may include, for example, estimating an attribute of an object appearing in the image data. In this case, the components linked to the origin of an attribute of the object is an example of the foreground. The range of the foreground may be determined as appropriate so that the attribute of the object can be derived. For example, the foreground may be a range in which an object appears. Alternatively, the foreground may also be a range that includes an object and the surrounding area of the object. Alternatively, the foreground may also be a partial range of an object in which the attribute of an object to be subjected to estimation appears.

(A-1) Scenario of Identifying Symbols on Number Plate

Figure 12:
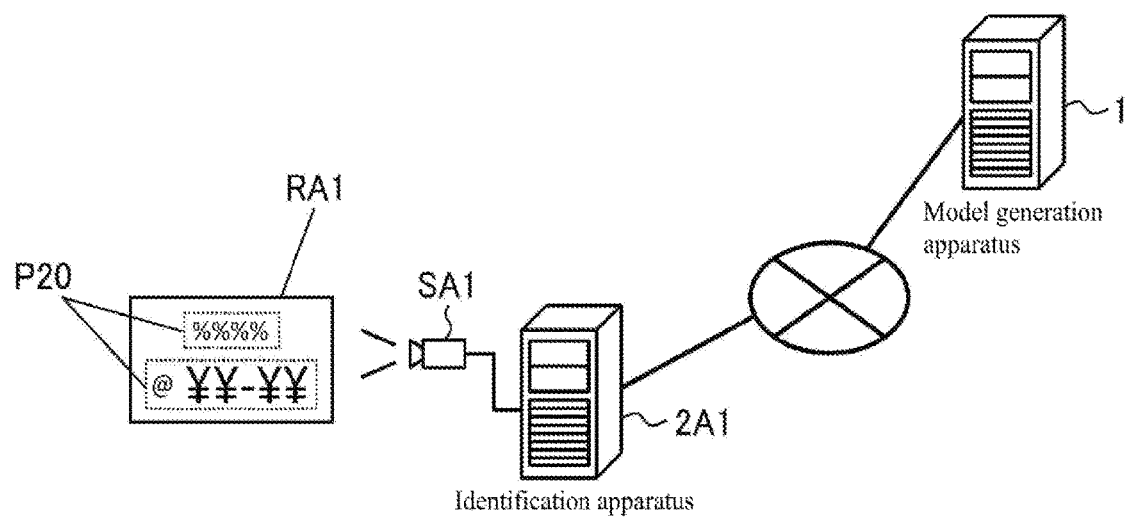
FIG. 12 is a schematic diagram illustrating an example of another scenario to which one or more embodiments is applied.

FIG. 12 schematically illustrates an example of another scenario of estimating an attribute of an object appearing in image data. An identification system exemplified in FIG. 12 includes the model generation apparatus 1 and an identification apparatus 2A1. The identification apparatus 2A1 corresponds to the above-described inspection apparatus 2A. The configuration of the identification apparatus 2A1 may be the same as that of the inspection apparatus 2A. A predetermined type of data that is dealt with in FIG. 12 may be image data in which a number plate RA1 appears. Similarly to the above-described inspection system 100A, a camera SA1 may be used to acquire the image data.

In this case, the first feature may be a feature relating to a symbol P20 added to the number plate RA1. The number plate RA1 is an example of an object, and the range in which the symbol P20 appears is an example of a foreground. The second feature may be a feature relating to a background other than the region to which the symbol P20 is added. The symbol P20 may be constituted by numeric characters, letters, marks, figures, or a combination thereof, for example. The background of the number plate RA1 may include decoration such as designs and drawing patterns. Estimation relating to the first feature may be identifying the symbol P20.

With this, the model generation apparatus 1 can generate a trained coder 51 and a trained first estimator 52 that can identify the symbol P20 added to the number plate RA1 in a way that is robust against differences in backgrounds. The identification apparatus 2A1 can identify the symbol P20 from the object data in which the number plate RA1 appears by the same procedure as that for the above-described inspection apparatus 2A. The identification system according to the present modification may be used in any scenario of identifying the symbol P20 of the number plate RA1. For example, the identification system according to the present modification may be used to identify automobiles traveling on a road from image data acquired by a monitoring camera for monitoring automobiles traveling on the road.

Note that in a scenario of monitoring automobiles traveling on a road, the identification apparatus 2A1 may identify the symbol P20 of the number plate RA1 with respect to image data obtained as a time series (chronologically), by the processing in steps S201 and S202. Then, the identification apparatus 2A1 may generate history information indicating chronological results of identifying automobiles traveling on a road, which are objects, based on the symbols P20 by the processing in step S203.

(A-2) Scenario of Identifying Symbol Added to Package of Product

Figure 13:
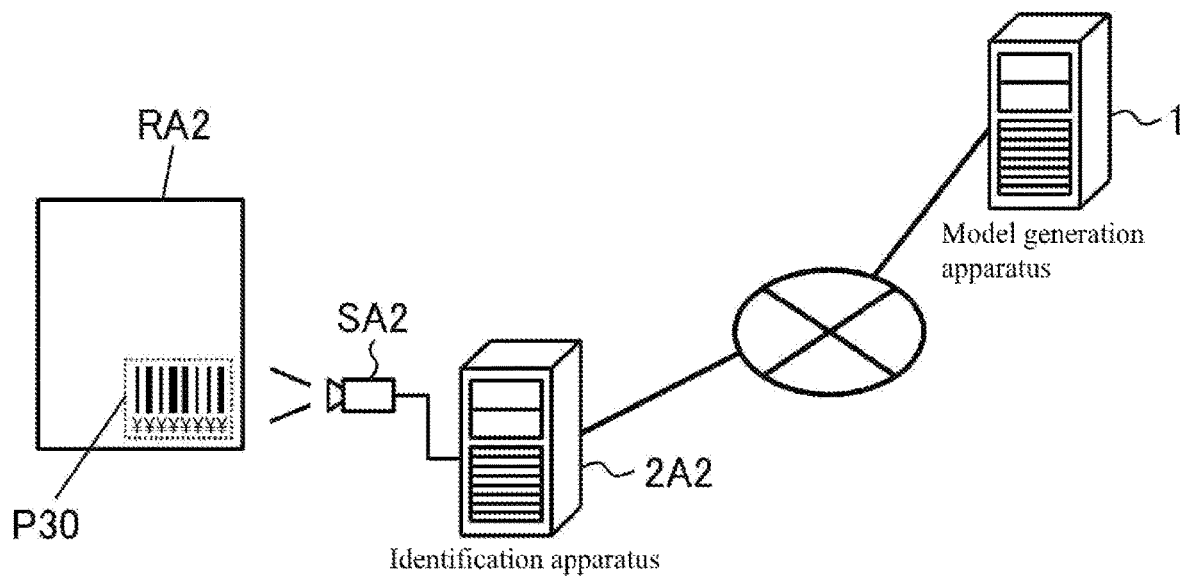
FIG. 13 is a schematic diagram illustrating an example of another scenario to which one or more embodiments is applied.

FIG. 13 schematically illustrates an example of another scenario of estimating an attribute of an object appearing in image data. An identification system exemplified in FIG. 13 includes the model generation apparatus 1 and an identification apparatus 2A2. The identification apparatus 2A2 corresponds to the inspection apparatus 2A. The configuration of the identification apparatus 2A2 may be the same as that of the inspection apparatus 2A. A predetermined type of data that is dealt with in the example of FIG. 13 may be image data in which a package RA2 of a product appears. Similarly to the above-described inspection system 100A, a camera SA2 may be used to acquire the image data.

In this case, the first feature may be a feature relating to a symbol P30 added to the package RA2. The package RA2 is an example of an object, and a region in which the symbol P30 appears is an example of a foreground. The second feature may be a feature relating to a background other than the region to which the symbol P30 is added. The symbol P30 constituted by numeric characters, letters, marks, figures, codes, or a combination thereof, for example. Codes may be, for example, one-dimensional codes, two-dimensional codes, or the like. The background of the package RA2 may include decoration such as designs and drawing patterns. Estimating the first feature may be identifying the symbol P30.

With this, the model generation apparatus 1 can generate a trained coder 51 and a trained first estimator 52 that can identify the symbol P30 added to the package RA2 in a way that is robust against differences in backgrounds. The identification apparatus 2A2 can identify the symbol P30 added to the package RA2 with the same procedure as that for the above-described inspection apparatus 2A. The identification system according to the present modification may be used in any scenario of identifying the symbol P30 added to the package RA2. For example, the identification system according to the present modification may be used to identify a product conveyed in a production line.

(A-3) Scenario of Estimating Attribute of Moving Object

Figure 14:
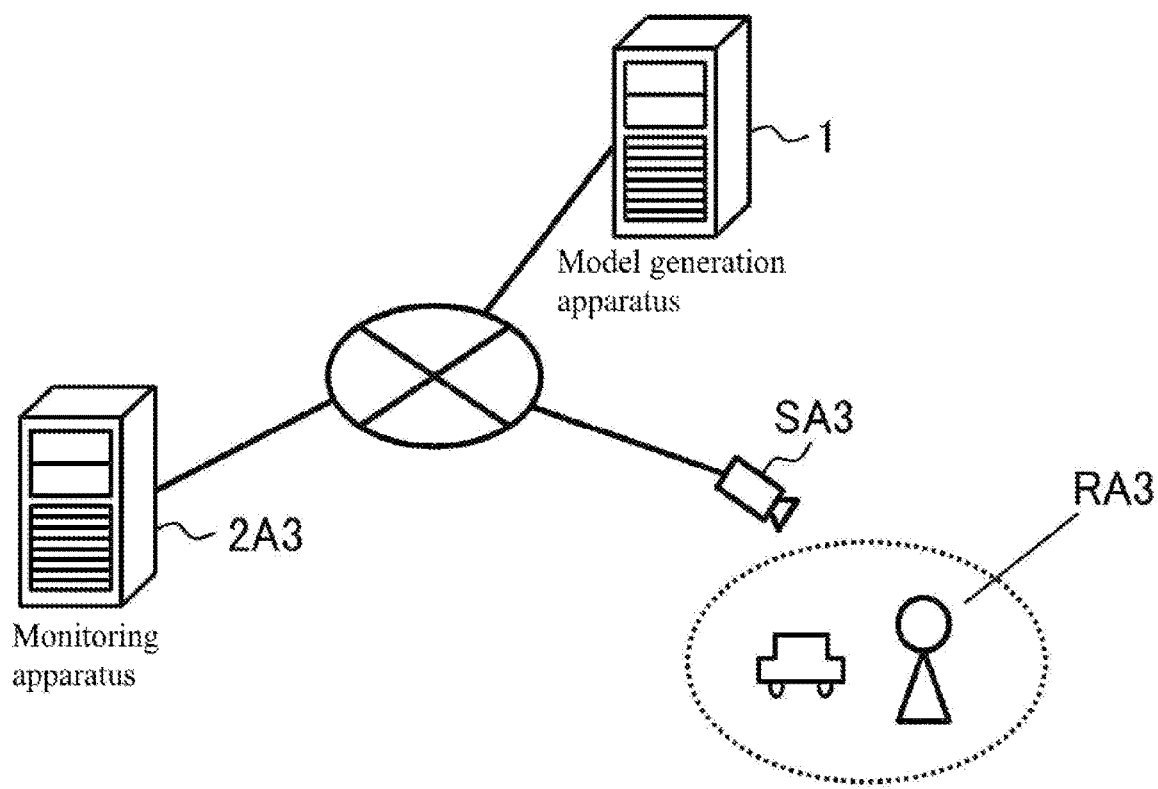
FIG. 14 is a schematic diagram illustrating an example of another scenario to which one or more embodiments is applied.

FIG. 14 schematically illustrates an example of another scenario of estimating an attribute of an object appearing in image data. A monitoring system exemplified in FIG. 14 includes the model generation apparatus 1 and a monitoring apparatus 2A3. The monitoring apparatus 2A3 corresponds to the above-described inspection apparatus 2A. The configuration of the monitoring apparatus 2A3 may be the same as that of the inspection apparatus 2A. A predetermined type of data that is dealt with in the example of FIG. 14 may be image data obtained by shooting a range in which a moving object RA3 can be present. The moving object RA3 may be, for example, an automobile, a person, or the like. A camera SA3 arranged so as to shoot a range to be monitored may be used to acquire the image data. A range to be monitored may be determined based on an appropriate place such as a road, or a building, for example. The monitoring apparatus 2A3 may be appropriately connected to the camera SA3 via a network, for example. With this, the monitoring apparatus 2A3 can acquire image data in which a range to be monitored appears.

In this case, the first feature may be a feature relating to an attribute of the moving object RA3, and the second feature may be a feature relating to a background such as a road or a building. The moving object RA3 is an example of an object. The foreground may be a region in which the moving object RA3 appears. Alternatively, the foreground may be a region that includes the moving object RA3 and the surrounding area of the moving object RA3. In this case, the background may be a region outside of the surrounding area of the moving object RA3. The attribute of the moving object RA3 may include, for example, a range (bounding box) in which the moving object RA3 appears, identification information of the moving object RA3, the state of the moving object RA3, and the like. The state of the moving object RA3 may include, for example, the position, the number, the degree of crowd (congestion degree or density), the speed, the acceleration, and the like. In addition, the state of the moving object RA3 may also include, for example, the possibility (degree of danger) that the moving object RD encounters a danger such as an accident or a crime. The type of danger that the moving object RA3 can encounter may be determined as appropriate. Furthermore, if the moving object RA3 is a person, the identification information of the moving object RA3 may include, for example, the identifier of the person, name, sex, age, physical size, and the like. Also, the state of the moving object RA3 may include, for example, movements of a person, posture of the person, and the like.

With this, the model generation apparatus 1 can generate a trained coder 51 and a trained first estimator 52 that can estimate an attribute of the moving object RA3 in a wat that is robust against differences in backgrounds. The monitoring apparatus 2A3 can estimate an attribute of the moving object RA3 in a shooting rage of the camera SA3 by the same procedure as that for the above-described inspection apparatus 2A. The monitoring system according to the present modification may be used in any scenario of monitoring the moving object RA3. For example, the monitoring system according to the present modification may be used, for example, in a scenario of monitoring the congestion degree of moving objects RA3 in a road or a building, a scenario of monitoring a forecast that a person falls from the platform of a station, or a scenario of monitoring a forecast that a person walking on a street encounters a crime. Note that the format of an output of an estimation result may be determined as appropriate. For example, in a scenario of estimating the degree of danger of the moving object RA3, the monitoring apparatus 2A3 may output a warning according to the estimated degree of danger in step S203.

(A-4) Scenario of Monitoring State of Driver

Figure 15:
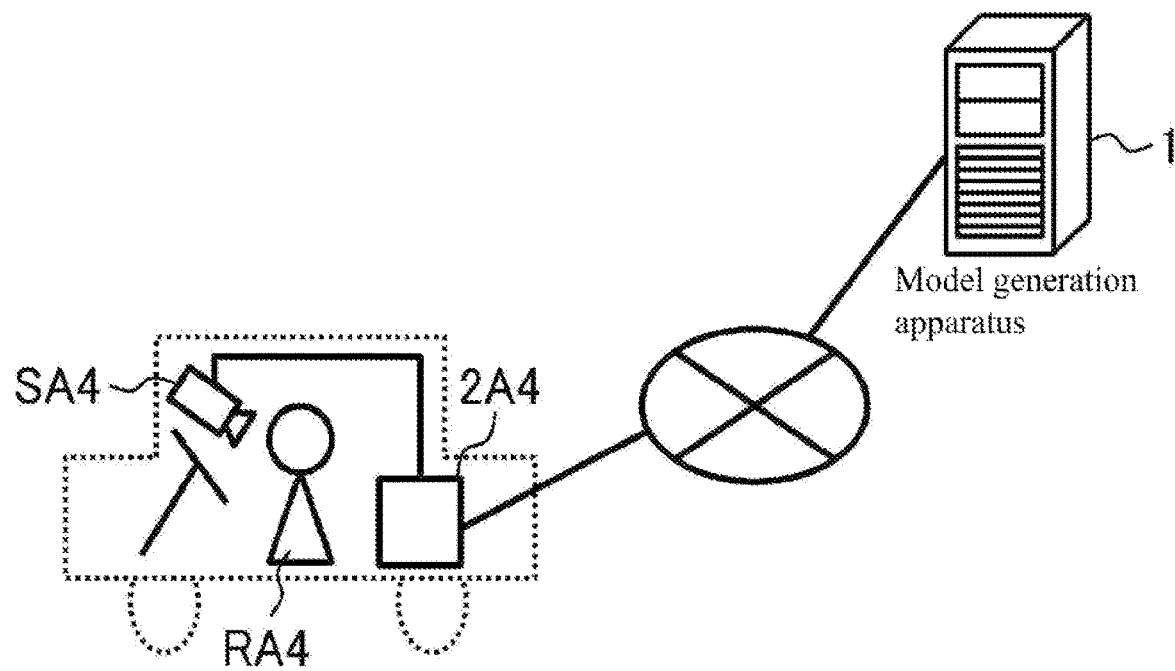
FIG. 15 is a schematic diagram illustrating an example of another scenario to which one or more embodiments is applied.

FIG. 15 schematically illustrates an example of another scenario of estimating an attribute of an object appearing in image data. A monitoring system exemplified in FIG. 15 includes the model generation apparatus 1 and a monitoring apparatus 2A4. The monitoring apparatus 2A4 corresponds to the above-described inspection apparatus 2A. The configuration of the monitoring apparatus 2A4 may be the same as that of the inspection apparatus 2A. A predetermined type of data that is dealt with in the example of FIG. 15 may be image data in which a driver RA4 appears. Similarly to the above-described inspection system 100A, a camera SA4 may be used to acquire the image data. The camera SA4 may be placed appropriately so as to shoot the driver RA4 assumed to be present on the driver's seat.

In this case, the first feature may be a feature relating to a state of the driver RA4, and the second feature may be a feature relating to a background such as a car interior landscape. The driver RA4 is an example of an object. A foreground may be the region involved in the state of the driver RA4. The region involved in the state of the driver RA4 may be, for example, a region in which the driver RA4 appears, a region further including the surrounding area of the driver RA4, a region in which a portion (e.g., a suitable body portion) of the driver RA4 appears, a region in which a tool (e.g., a steering wheel) associated with driving appears, and the like. The state of the driver RA4 may include, for example, health condition, sleepiness degree, fatigue degree, composure degree, and the like. The health condition may be expressed by, for example, the probability that a predetermined disorder occurs, the probability that the physical condition changes, and the like. The sleepiness degree indicates the degree of sleepiness of the driver RA4. The fatigue degree indicates the degree of fatigue of the driver RA4. The composure degree indicates the degree of composure of the driver RA4 to driving.

With this, the model generation apparatus 1 can generate a trained coder 51 and a trained first estimator 52 that can estimate a state of the driver RA4 in a way that is robust against differences in backgrounds. The monitoring apparatus 2A4 can estimate a state of the driver RA4 by the same procedure as that for the above-described inspection apparatus 2A. The monitoring system according to the present modification may be used in any scenario of monitoring the state of the driver RA4. Moreover, the monitoring system according to the present modification may be used for an object person other than the driver RA4. An example of the object person other than the driver RA4 may be an operator operating in an office or a factory.

Note that, in step S203, the format of an output of a result of estimating a state of the driver RA4 may be determined as appropriate. As an example, when at least one of the sleepiness degree and the fatigue degree is estimated, the monitoring apparatus 2A4 may determine whether or not at least one of the estimated sleepiness degree and fatigue degree exceeds a threshold value. If at least one of the sleepiness degree and the fatigue degree exceeds a threshold value, the monitoring apparatus 2A4 may output, to the output apparatus, a warning that prompts the driver RA4 to park the automobile at a parking area and take a rest. In this way, the monitoring apparatus 2A4 may output a specific message such as a warning to the output apparatus, depending on the estimated state of the driver RA4.

As another example, if an automobile is provided with a control device (not shown) that controls automated driving operations, the monitoring apparatus 2A4 may transmit, to the control device, an instruction that instructs automated driving operations of the automobile, based on a result of estimating the state of the driver RA4. As a specific example, a configuration is assumed in which switching is possible between an automated driving mode in which the control device controls traveling of an automobile, and a manual driving mode in which traveling of the automobile is controlled by steering of the driver RA4. In this case, when an automobile is traveling in the automated driving mode, and an instruction to switch from the automated driving mode to the manual driving mode is accepted from the driver RA4 or a system, the monitoring apparatus 2A4 may determine whether or not the estimated composure degree of the driver RA4 exceed a threshold value. If the composure degree of the driver RA4 exceeds the threshold value, the monitoring apparatus 2A4 may transmit, to the control device, an instruction to allow switching from the automated driving mode to the manual driving mode. If the composure degree of the driver RA4 is less than or equal to the threshold value, the monitoring apparatus 2A4 may transmit, to the control device, a notification of not allowing the switching from the automated driving mode to the manual driving mode, and maintain the traveling in the automated driving mode.

Also, when the automobile is traveling in the manual driving mode, the monitoring apparatus 2A4 may determine whether or not at least one of the estimated sleepiness degree and the estimated fatigue degree exceeds a threshold value. If at least one of the sleepiness degree and the fatigue degree exceeds the threshold value, the monitoring apparatus 2A4 may transmit, to the control device, an instruction to switch from the manual driving mode to the automated driving mode, and to park the automobile at a safe place such as a parking area. Otherwise, the monitoring apparatus 2A4 may maintain the traveling of the automobile in the manual driving mode.

Also, when the automobile is traveling in the manual driving mode, the monitoring apparatus 2A4 may determine whether or not the estimated composure degree is less than or equal to the threshold value. If the composure degree is less than or equal to the threshold value, the monitoring apparatus 2A4 may transmit, to the control device, an instruction to reduce the speed. Otherwise, the monitoring apparatus 2A4 may maintain the traveling of the automobile by operations of the driver RA4. Note that the control device of the automobile and the monitoring apparatus 2A4 may be constituted by the same computer.

(B) Scenario of Monitoring State of Automobile

Figure 16:
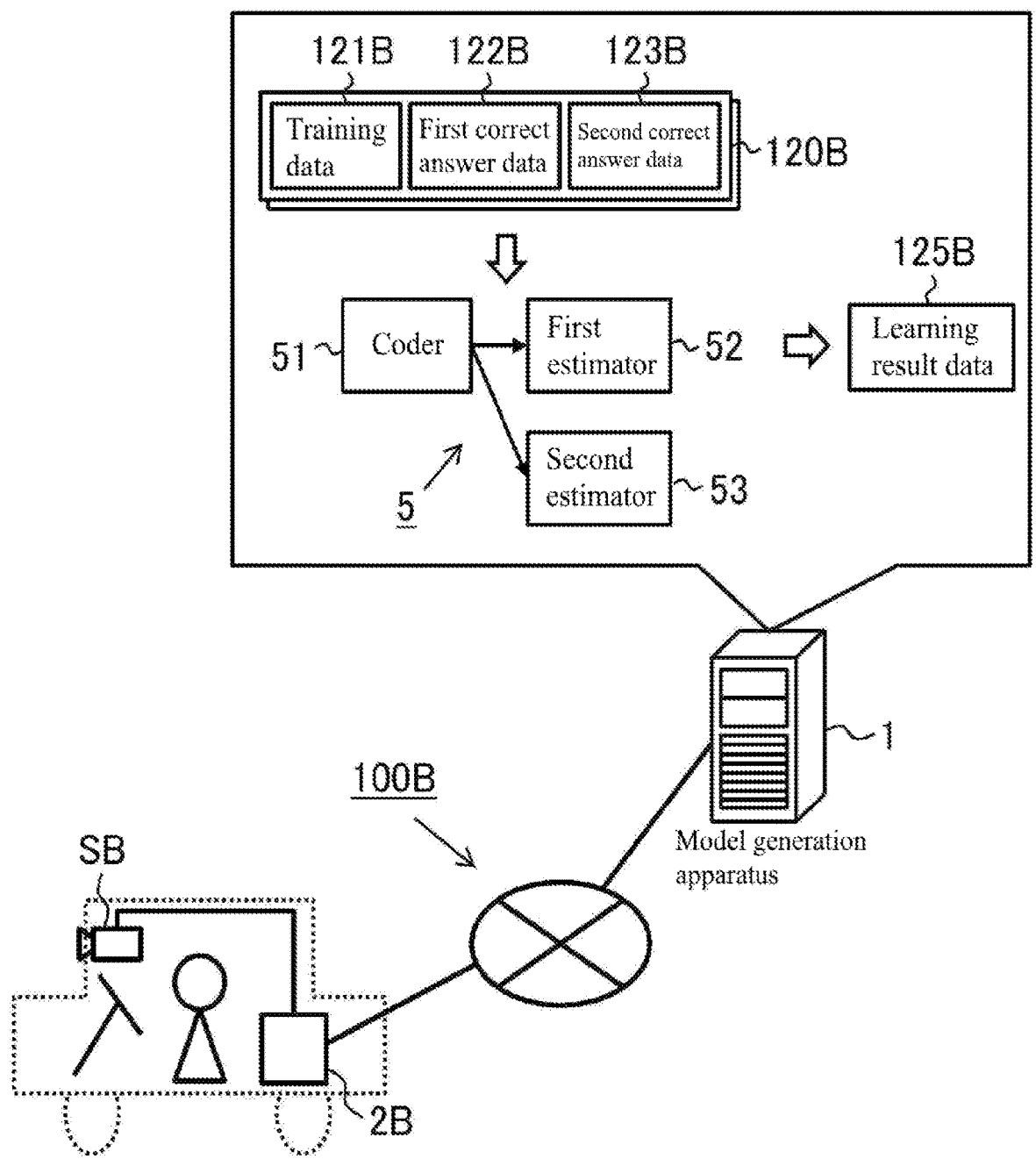
FIG. 16 is a schematic diagram illustrating an example of another scenario to which one or more embodiments is applied.

FIG. 16 schematically illustrates an example of a scenario to which a monitoring system 100B according to a second modification is applied. This modification is an example in which the above-described embodiment is applied to a scenario of monitoring the status of an automobile using sensing data obtained by an on-board sensor SB. The monitoring system 100B according to the present modification includes the model generation apparatus 1 and a monitoring apparatus 2B. Similarly to the above-described embodiment, the model generation apparatus 1 and the monitoring apparatus 2B may be connected to each other via a network.

A predetermined type of data (later-described training data 121B and object sensing data 221B) used in this modification is sensing data obtained by the on-board sensor SB. The type of the on-board sensor SB may be selected as appropriate. The on-board sensor SB may be, for example, an image sensor, a Lidar sensor, a millimeter-wave radar, an ultrasonic sensor, an acceleration sensor, or the like. The first feature relates to a status of the automobile. The status of an automobile may relate to at least one of the outside or inside of the automobile. The state of the outside of the automobile may be expressed by, for example, attributes of objects present in the surroundings of the automobile, the congestion degree, the risk of an accident, or the like. Objects present in the surroundings of the automobile may be, for example, roads, traffic lights, obstructions (persons or objects), or the like. The attribute of a road may include, for example, the type of a driving lane, the type of a road (e.g., a cross-over point and an express highway), the state of a road surface, and the like. The attribute of a traffic light may include, for example, the lighting status of the traffic light, and the like. The attributes of obstructions may include, for example, whether or not there is an obstruction, the type of an obstruction, the size of an obstruction, the speed of an obstruction, an event relating to an obstruction, and the like. An event relating to an obstruction may include, for example, dashing-out of a person or an automobile, sudden acceleration thereof, sudden stop thereof, lane change, and the like. The risk of an accident may be expressed by, for example, the type of an accident and event probability of the accident. The state of the inside of an automobile may be expressed by, for example, the driving status of the automobile, the attribute of a passenger who is on the automobile, or the like. The driving status may be expressed by, for example, transformation of the driving operations such as the speed, the acceleration, and the steering angle. The attribute of a passenger may include, for example, the state of the passenger, the number of passengers, positions, the number, identification information, and the like. Estimation relating to the status of an automobile may include, in addition to simply estimating the status of the automobile, estimating an operation command given to the automobile according to the status of the automobile. An operation command may be defined by, for example, the acceleration amount, the braking amount, the steering handle angle, lighting of lights, use of a honker, or the like. In contrast, the second feature may be selected as appropriate from features other than the status of an automobile to be subjected to an estimation task. For example, the second feature may be selected from examples of states of the automobile that are not selected as an object of an estimation task. Alternatively, the second feature may be selected from, for example, elements other than the status of the automobile, such as monitoring the environment. As a specific example, whether or not there is an obstruction, the attributes of a road, the congestion degree, or a combination thereof may be selected as the first feature, and weather, time, the attribute of a site at which a road is present, or a combination thereof may be selected as the second feature. Time may be expressed by a predetermined period of time. A predetermined period of time may be expressed by an expression method in which a period of time can change with time such as morning, day time, night, or a fixed expression method such as time from 1 o'clock to 2 o'clock. The attribute of a site may include, for example, the type of density of population at this site such as the city or the country. Except for these limitations, the monitoring system 100B according to the present modification may be configured similarly to the estimation system 100 according to the above-described embodiment.

[Model Generation Apparatus]

In the present modification, the model generation apparatus 1 acquires, in step S101, a plurality of learning data sets 120B. Training data 121B of each of the learning data sets 120B is sensing data obtained by the on-board sensor SB. First correct answer data 122B includes information (correct answer) relating to a status of the automobile appearing in the training data 121B, and is to be subjected to an estimation task. If estimation of the status of an automobile is constituted by estimating an operation command for the automobile according to the status of the automobile, the first correct answer data 122B indicates an operation command (correct answer) relating to the automobile according to the status of the automobile appearing in the training data 121B. The second correct answer data 123B indicates information (correct answer) relating to another feature different from the status of the automobile to be subjected to an estimation task.

The model generation apparatus 1 executes machine learning of the learning model 5 by the processing in step S102, by using the acquired plurality of learning data sets 120B. As a result, it is possible to construct a trained coder 51 and a trained first estimator 52 that have acquired the capability of outputting a result of estimation relating to the status of an automobile, in response to input of sensing data obtained by the on-board sensor SB. The model generation apparatus 1 appropriately saves, by the processing in step S103, the information relating to the trained coder 51 and first estimator 52 as learning result data 125B, in a predetermined storage area. The generated learning result data 125B may be provided to the monitoring apparatus 2B at an appropriate timing.

[Monitoring Apparatus]

Figure 17A:
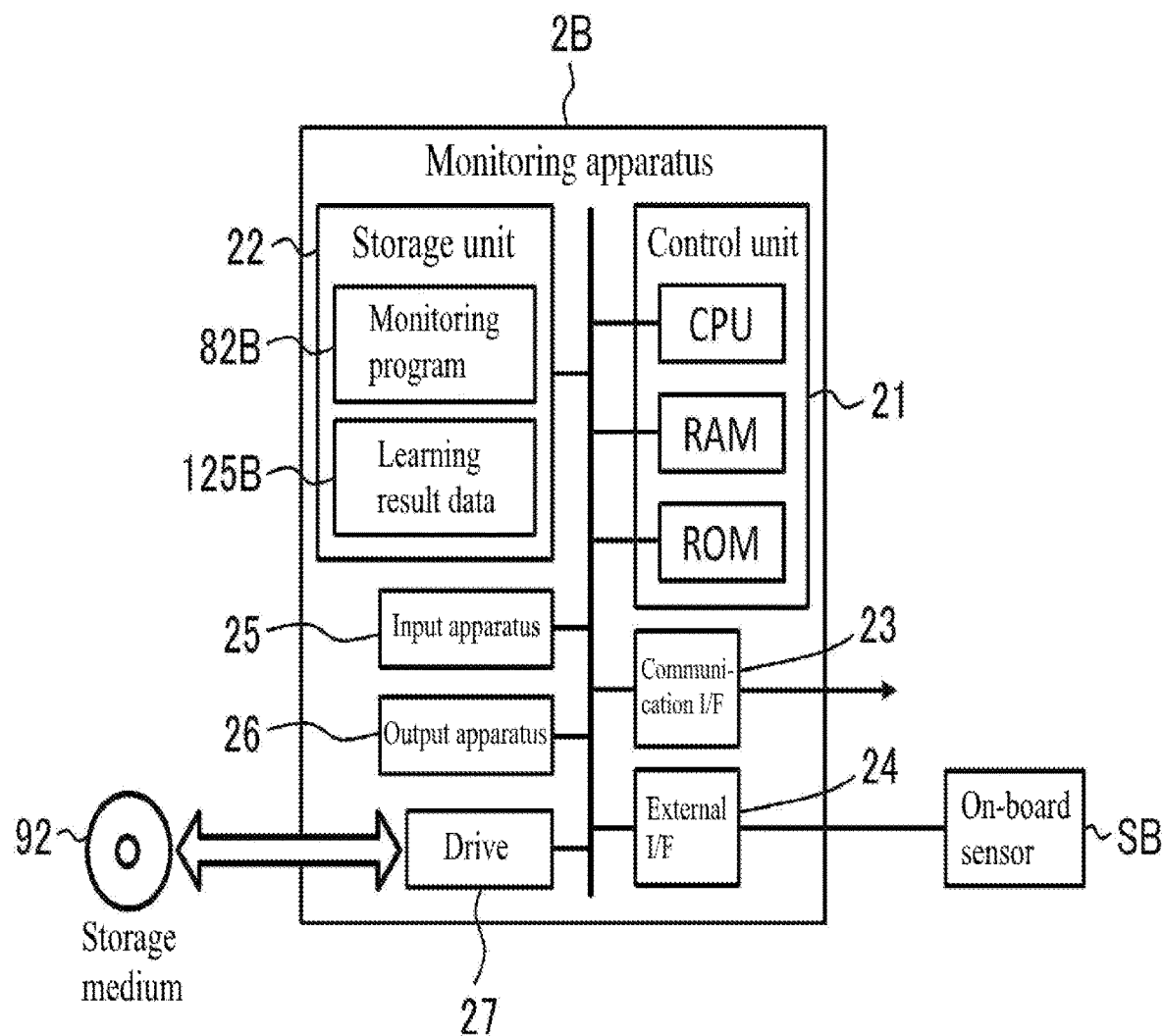
FIG. 17A is a schematic diagram illustrating an example of a hardware configuration of a monitoring apparatus according to another embodiment or embodiments.

FIG. 17A schematically illustrates an example of a hardware configuration of the monitoring apparatus 2B according to the present modification. As shown in FIG. 17A, the monitoring apparatus 2B according to the present modification, similarly to the estimation apparatus 2, may be constituted by a computer in which the control unit 21, the storage unit 22, the communication interface 23, the external interface 24, the input apparatus 25, the output apparatus 26, and the drive 27 are electrically connected to each other.

In the present modification, the storage unit 22 stores various types of information such as a monitoring program 82B and the learning result data 125B. The monitoring program 82B corresponds to the estimation program 82 according to the above-described embodiment. Also, in the present modification, the monitoring apparatus 2B is connected to the on-board sensor SB via the external interface 24. The on-board sensor SB may be arranged as appropriate so as to monitor the status of an automobile to be monitored.

Note that the hardware configuration of the monitoring apparatus 2B is not limited to this example. Constituent elements of the specific hardware configuration of the monitoring apparatus 2B can be omitted, replaced, and added as appropriate depending on the embodiment. The monitoring apparatus 2B may be a mobile phone, an on-board apparatus, or the like that includes a general-purpose PC or a smartphone, instead of an information processing apparatus that is specifically designed for the service to be provided.

Figure 17B:
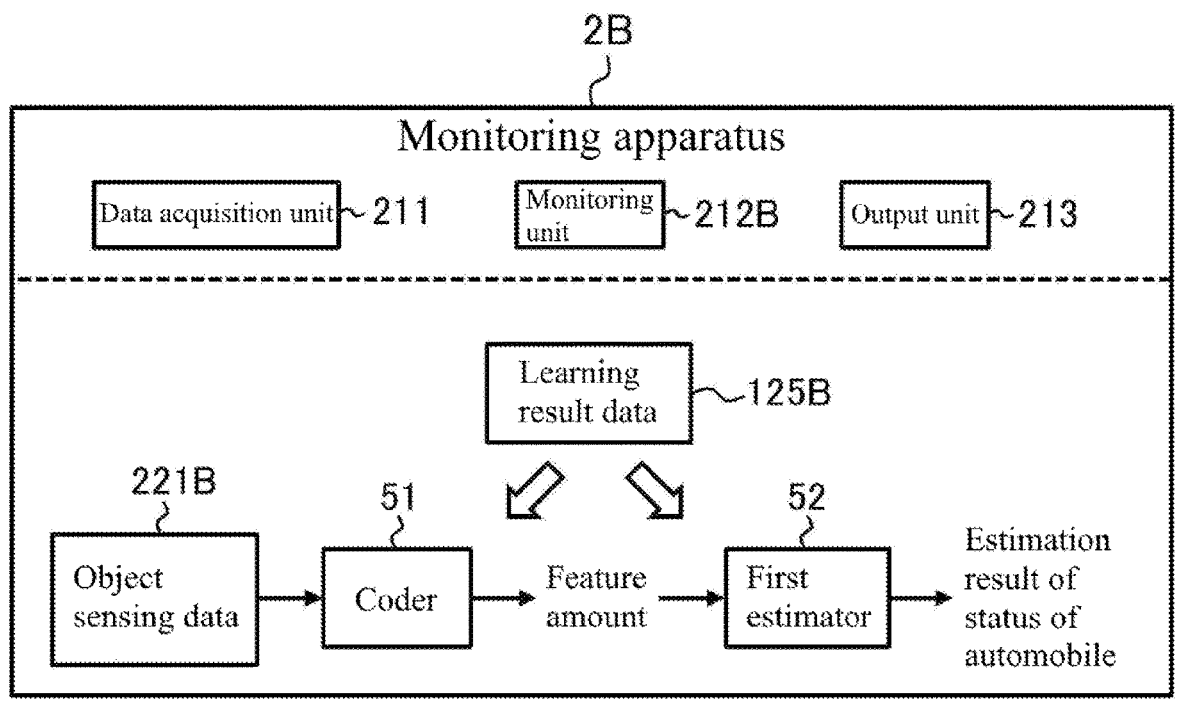
FIG. 17B is a schematic diagram illustrating an example of a software configuration of a monitoring apparatus according to another embodiment or embodiments.

FIG. 17B schematically illustrates an example of a software configuration of the monitoring apparatus 2B according to the present modification. Similarly to the above-described embodiment, the software configuration of the monitoring apparatus 2B is realized by the control unit 21 executing the monitoring program 82B. The software configuration of the monitoring apparatus 2B is the same as that of the estimation apparatus 2 except for the configuration in which data to be dealt with is limited as described above. A monitoring unit 212B includes the trained coder 51 and first estimator 52, by storing the learning result data 125B. The monitoring unit 212B corresponds to the estimation unit 212. With this, the monitoring apparatus 2B can execute, similarly to the estimation processing of the estimation apparatus 2, a series of information processing relating to estimation of the status of an automobile.

That is, in step S201, the control unit 21 acquires object sensing data 221B relating to the status of the automobile to be monitored from the on-board sensor SB. In step S202, the control unit 21 operates as the monitoring unit 212B, and configures settings of the trained coder 51 and first estimator 52 with reference to the learning result data 125B. The control unit 21 gives the acquired object sensing data 221B to the trained coder 51, and executes computation processing of forward propagation of the trained coder 51 and first estimator 52. With this, the control unit 11 acquires the output value that corresponds to a result of estimating the status of the automobile from the trained first estimator 52.

In step S203, the control unit 21 outputs information relating to a result of estimating the status of the automobile. For example, the control unit 21 may directly output a result of estimating the status of the automobile to the output apparatus 26. Also, for example, the control unit 21 may also determine whether or not there is a possibility that a risk occurs in driving of the automobile based on the estimated status of the automobile. The standard for the determination may be determined as appropriate. If it is determined that there is a possibility that a risk occurs in driving of the automobile, the control unit 21 may output a warning for notifying the risk to the output apparatus 26. Also, if, for example, estimation relating to the status of the automobile is constituted by estimating an operation command for the automobile based on the status of the automobile, the control unit 21 can acquire, in step S202, an operation command for the automobile according to the status of the automobile as a result of estimating the status of the automobile, from the trained first estimator 52. In this case, the control unit 21 may control the operation of the automobile based on the acquired operation command.

[Features]

According to the present modification, by machine learning of the model generation apparatus 1, it is possible to make a feature amount output by the trained coder 51 likely to include a component that corresponds to information relating to the status of an automobile to be subjected to an estimation task, and unlikely to include components that correspond to other features. Accordingly, it is possible to generate a trained coder 51 and a trained first estimator 52 that can execute an estimation task relating to the status of an automobile in a way that is robust against differences in features. In the monitoring apparatus 2B according to the present modification, it can be expected that an estimation task relating to the status of an automobile is accurately executed using the trained coder 51 and first estimator 52.

(C) Scenario of Diagnosing Health Condition

Figure 18:
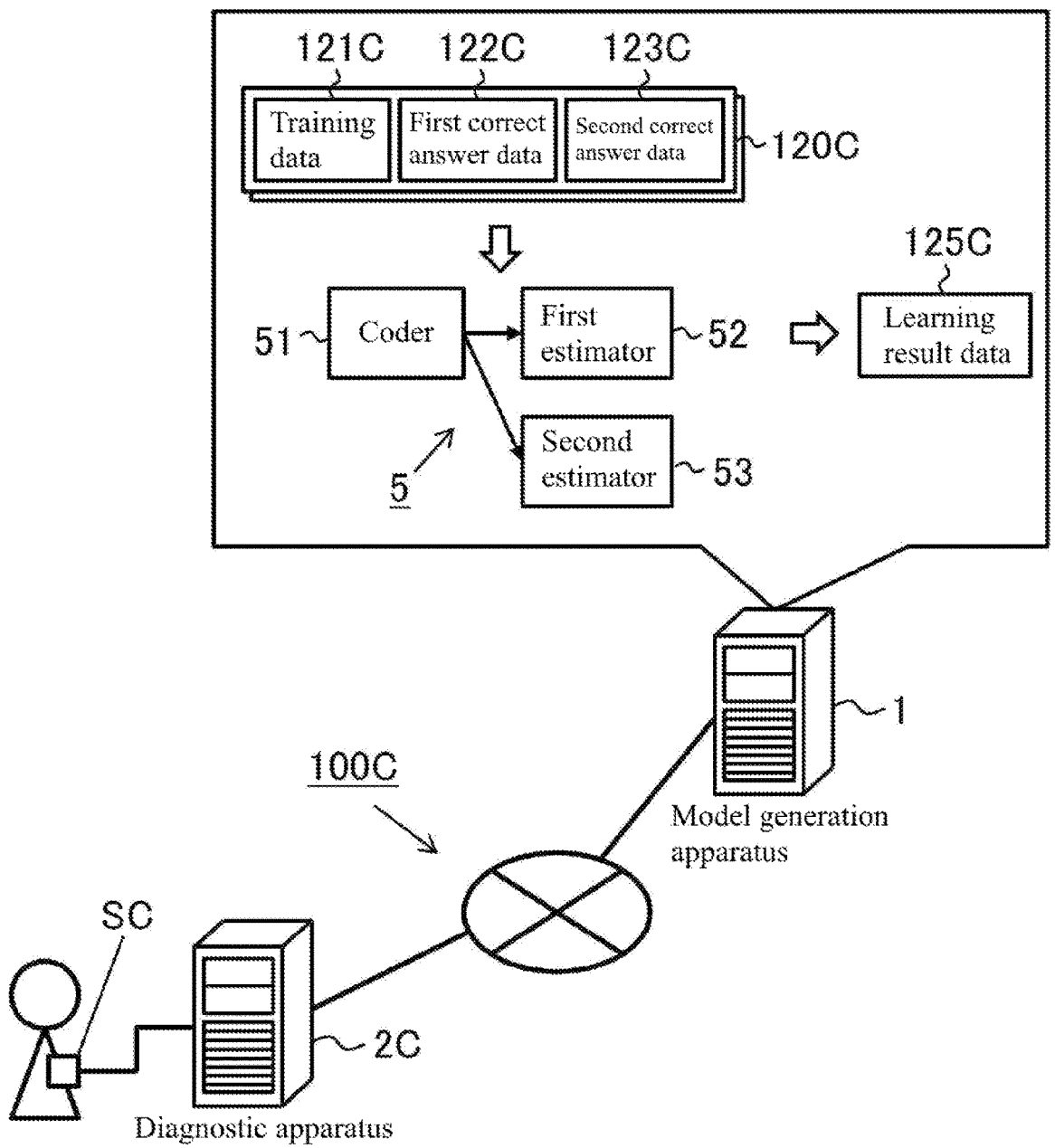
FIG. 18 is a schematic diagram illustrating an example of another scenario to which one or more embodiments is applied.

FIG. 18 schematically illustrates an example of a scenario to which a diagnosis system 100C according to a third modification is applied. The present modification is an example in which the above-described embodiment is applied to a scenario of diagnosing the health condition of an object person using sensing data obtained by a sensor SC. The diagnosis system 100C according to the present modification includes the model generation apparatus 1 and a diagnostic apparatus 2C. Similarly to the above-described embodiment, the model generation apparatus 1 and the diagnostic apparatus 2C may be connected to each other via a network.

A predetermined type of data (later-described training data 121C and object sensing data 221C) that is dealt with in the present modification is sensing data obtained by the sensor SC. The type of the sensor SC is not particularly limited, and may be selected as appropriate depending on the embodiment, as long as the state of the object person can be monitored. The sensor SC may be, for example, a vital sensor, a medical testing apparatus, or the like. The vital sensor may be, for example, a blood-pressure gauge, a pulsimeter, a pulse rate meter, a cardiography equipment, an electromyograph, a thermometer, an electric skin resistance meter, a microwave sensor, an electroencephalograph, a magnetoencephalography, an active mass meter, a blood sugar meter, an electro-oculogram sensor, an ocular motion meter, or the like. The medical testing apparatus may be, for example, a CT apparatus, an MRI apparatus, or the like. The first feature relates to a health condition of an object person. Information relating to the health condition may be expressed by, for example, whether or not the object person enjoys good health, whether or not there is a forecast that the object person may get sick, the type of the health condition, the probability that the object person gets a certain disorder, the vital value (such as, for example, a blood pressure or a body temperature) or the like. The second feature may be selected as appropriate from features other than the health condition to be subjected to an estimation task. For example, information indicating whether or not an object person enjoys good health, a vital value, or a combination thereof is selected as the first feature, and age, sex, race, nationality, occupation, residence of the object person, whether or not the object person has fitness habits, administration history, or a combination thereof may be selected as the second feature. Except for these limitations, the diagnosis system 100C according to the present modification may be configured similarly to the estimation system 100 according to the above-described embodiment.

[Model Generation Apparatus]

In the present modification, the model generation apparatus 1 acquires, in step S101, a plurality of learning data sets 120C. Training data 121C of each of the learning data sets 120C is sensing data obtained by the sensor SC. First correct answer data 122C indicates information (correct answer) relating to a health condition of an object person (subject) appearing in the training data 121C and is to be subjected to an estimation task. Second correct answer data 123C indicates information (correct answer) relating to another feature different from the health condition to be subjected to the estimation task.

The model generation apparatus 1 executes machine learning of the learning model 5 by the processing in step S102, by using the acquired plurality of learning data sets 120C. As a result, it is possible to construct the trained coder 51 and first estimator 52 that have acquired the capability of outputting a result of estimation relating to the health condition of an object person, in response to input of sensing data obtained by the sensor SC. The model generation apparatus 1 appropriately saves, by the processing in step S103, the information relating to the trained coder 51 and first estimator 52 as learning result data 125C in a predetermined storage area. The generated learning result data 125C may be provided to the diagnostic apparatus 2C at an appropriate timing.

[Diagnostic Apparatus]

Figure 19A:
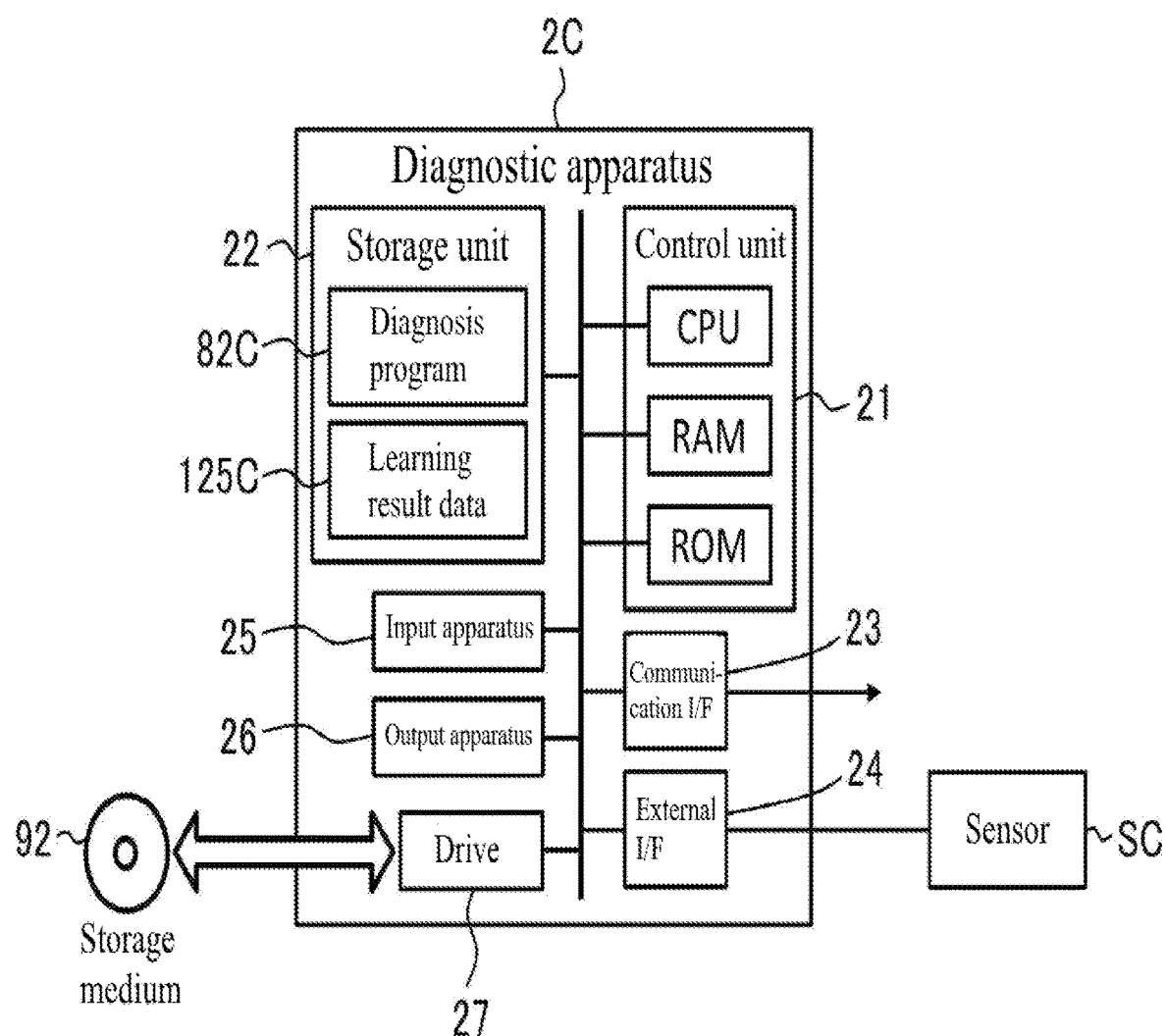
FIG. 19A is a schematic diagram illustrating an example of a hardware configuration of a diagnostic apparatus according to another embodiment or embodiments.

FIG. 19A schematically illustrates an example of a hardware configuration of the diagnostic apparatus 2C according to the present modification. As shown in FIG. 19A, the diagnostic apparatus 2C according to the present modification, similarly to the estimation apparatus 2, may be constituted by a computer in which the control unit 21, the storage unit 22, the communication interface 23, the external interface 24, the input apparatus 25, the output apparatus 26, and the drive 27 are electrically connected to each other.

In the present modification, the storage unit 22 stores various types of information such as a diagnosis program 82C and the learning result data 125C. The diagnosis program 82C corresponds to the estimation program 82 according to the above-described embodiment. Also, in the present modification, the diagnostic apparatus 2C is connected to the sensor SC via the external interface 24.

Note that the hardware configuration of the diagnostic apparatus 2C is not limited to this example. Constituent elements of the specific hardware configuration of the diagnostic apparatus 2C can be omitted, replaced, and added as appropriate depending on the embodiment. The diagnostic apparatus 2C may be a general-purpose server apparatus, a general-purpose PC, or the like, instead of an information processing apparatus that is specifically designed for the service to be provided.

Figure 19B:
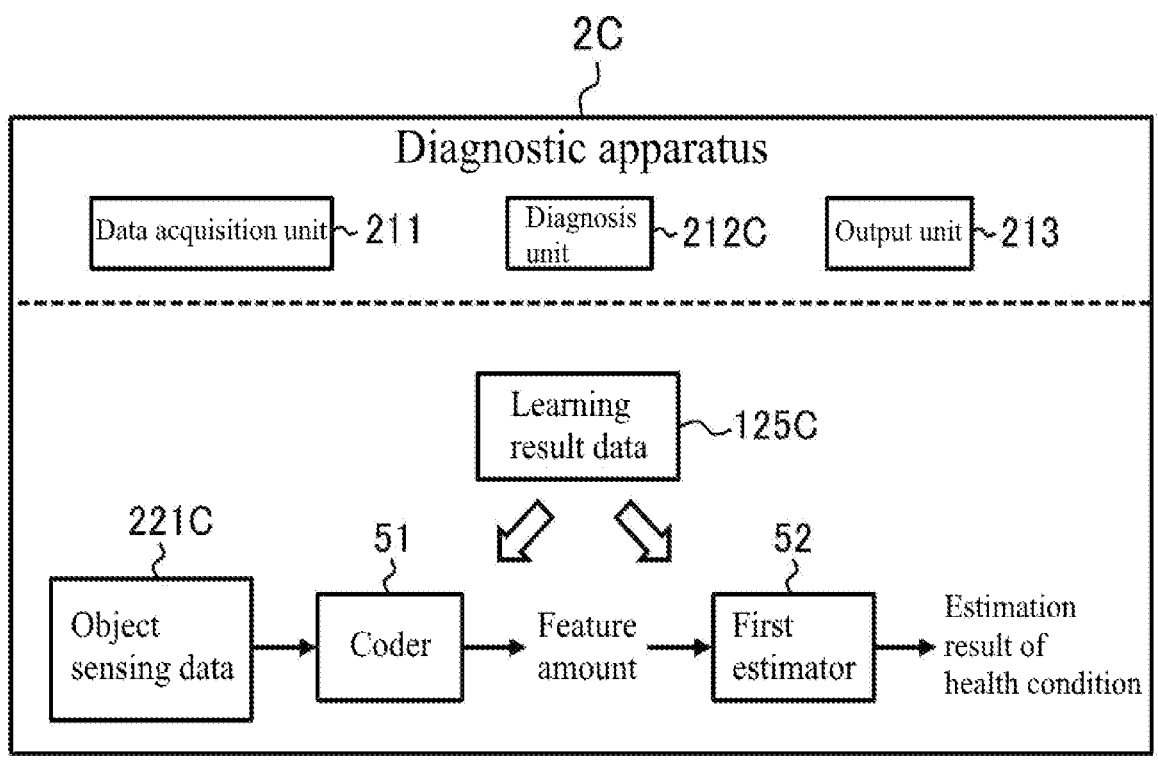
FIG. 19B is a schematic diagram illustrating an example of a software configuration of a diagnostic apparatus according to another embodiment or embodiments.

FIG. 19B schematically illustrates an example of a software configuration of the diagnostic apparatus 2C according to the present modification. Similarly to the above-described embodiment, the software configuration of the diagnostic apparatus 2C is realized by the control unit 21 executing the diagnosis program 82C. The software configuration of the diagnostic apparatus 2C is the same as that of the estimation apparatus 2 except for the configuration in which data to be dealt with is limited as described above. A diagnosis unit 212C includes the trained coder 51 and first estimator 52 by storing the learning result data 125C. The diagnosis unit 212C corresponds to the estimation unit 212. With this, the diagnostic apparatus 2C can execute, similarly to the estimation processing of the estimation apparatus 2, the series of information processing relating to estimation of the health condition of an object person.

That is, in step S201, the control unit 21 acquires the object sensing data 221C relating to an object person to be diagnosed from the sensor SC. In step S202, the control unit 21 operates as the diagnosis unit 212C, and configures settings of the trained coder 51 and first estimator 52 with reference to the learning result data 125C. The control unit 21 gives the acquired object sensing data 221C to the trained coder 51, and executes computation processing of forward propagation of the trained coder 51 and first estimator 52. With this, the control unit 11 acquires an output value that corresponds to a result of estimating the health condition of the object person from the trained first estimator 52.

In step S203, the control unit 21 outputs information relating to a result of estimating the health condition of the object person. For example, the control unit 21 may directly output a result of estimating the health condition of the object person to the output apparatus 26. Also, for example, if the estimated health condition of the object person indicates a forecast of a predetermined disorder, the control unit 21 may output, to the output apparatus 26, a message that prompts the object person to take a medical examination in a hospital. Also, for example, the control unit 21 may transmit, to a terminal of a registered hospital, the result of estimating the health condition of the object person. Note that the information in a terminal serving as a destination may be stored in a predetermined storage area such as a RAM, a ROM, the storage unit 22, the storage medium 92, or an external storage device.

[Features]

According to the present modification, by machine learning of the model generation apparatus 1, it is possible to make a feature amount output by the trained coder 51 likely to include a component that corresponds to information relating to the health condition subjected to an estimation task, and unlikely to include components that correspond to other features. Accordingly, it is possible to generate a trained coder 51 and a trained first estimator 52 that can execute an estimation task relating to the health condition of an object person in a way that is robust against differences in features. In the diagnostic apparatus 2C according to the present modification, it can be expected that an estimation task relating to the health condition is accurately executed using the trained coder 51 and first estimator 52.

(D) Scenario of Monitoring Status of Cultivation

Figure 20:
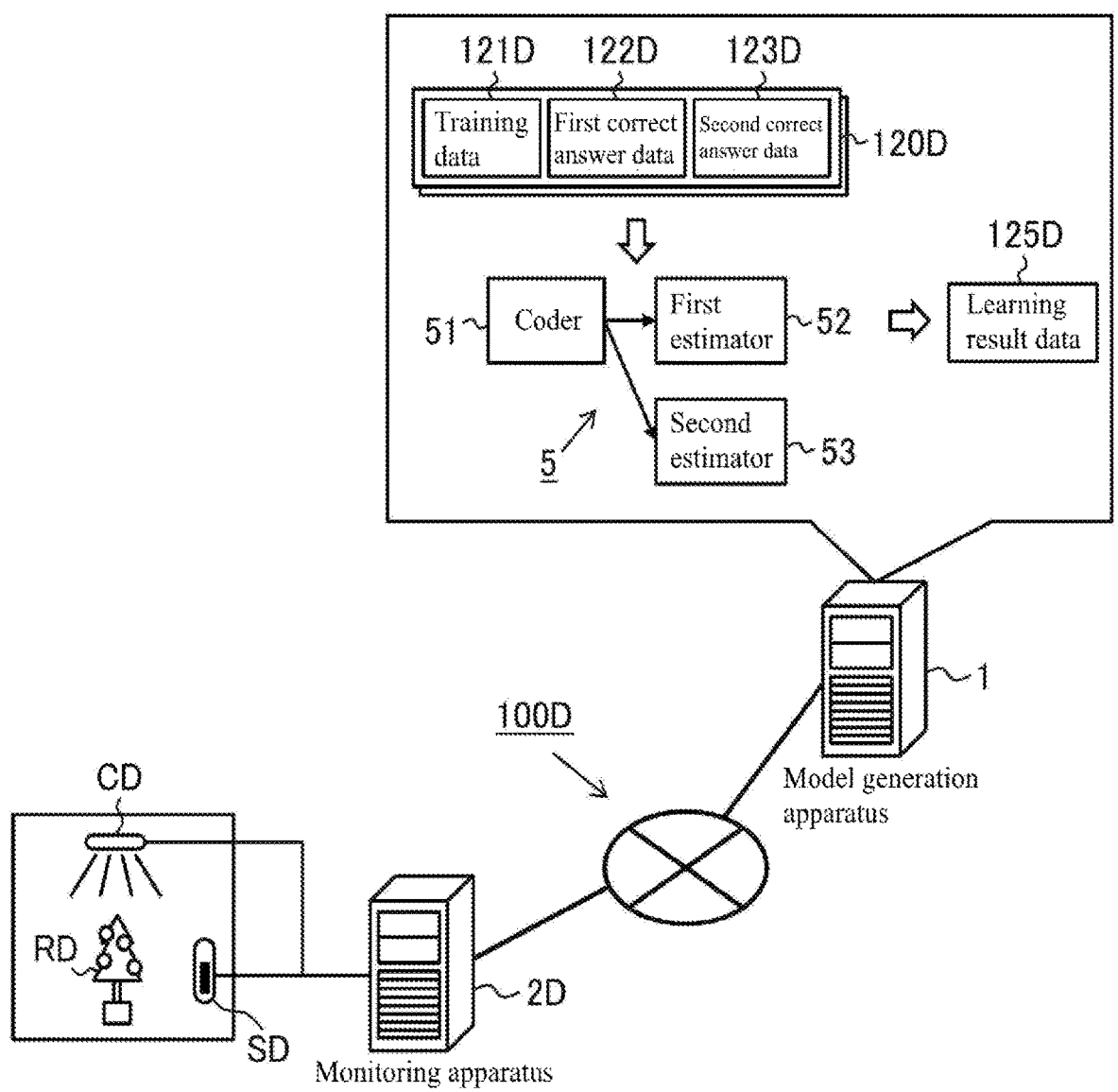
FIG. 20 is a schematic diagram illustrating an example of another scenario to which one or more embodiments is applied.

FIG. 20 schematically illustrates an example of a scenario to which a monitoring system 100D according to a fourth modification is applied. The present modification is an example in which the above-described embodiment is applied to a scenario of monitoring the status of cultivation of a plant RD using sensing data obtained by an environmental sensor SD. The monitoring system 100D according to the present modification includes the model generation apparatus 1 and a monitoring apparatus 2D. Similarly to the above-described embodiment, the model generation apparatus 1 and the monitoring apparatus 2D may be connected to each other via a network.

A predetermined type of data (later-described training data 121D and object sensing data 221D) that is dealt with in the present modification is sensing data obtained by the environmental sensor SD. The type of the environmental sensor SD is not particularly limited, and may be selected as appropriate depending on the embodiment, as long as the status of cultivation of the plant RD can be monitored. The environmental sensor SD may be, for example, a barometer, a thermometer, a hygrometer, a sound pressure meter, an audio sensor, an ultraviolet sensor, an illuminometer, an ombrometer, a gas sensor, or the like. The type of the plant RD may be selected as appropriate. The first feature relates to a status of cultivation of the plant RD. The status of cultivation may relate to an appropriate element for cultivating the plant RD. The status of cultivation may be specified by, for example, the growing environment to a point in time in cultivation, the growing state, or the like. The growing environment relates to a status of growing the plant RD, and may be defined by, for example, a period of time for irradiating the plant RD with light, the temperature in the surroundings of the plant RD, the amount of water to be given to the plant RD, or the like. The growing state may be defined by, for example, the degree of development of the plant RD, or the like. The second feature may be selected as appropriate from features other than the status of cultivation to be subjected to an estimation task. For example, the growing place, the type of the environmental sensor SD, the place where the environmental sensor SD is installed, the installation angle of the environmental sensor SD, the time when sensing data is acquired, the season, the weather, or a combination thereof may be selected as the second feature.

Also, in the present modification, the monitoring apparatus 2D may be connected to a cultivation apparatus CD. The cultivation apparatus CD is configured to control the growing environments of plant RD. The type of the cultivation apparatus CD is not particularly limited, and may be selected as appropriate depending on the embodiment, as long as the growing environments of plant RD can be controlled. The cultivation apparatus CD may be, for example, a curtain apparatus, a lighting apparatus, air-conditioning equipment, a sprinkler apparatus, or the like. The curtain apparatus is configured to open and close curtains attached to windows of a building. The lighting apparatus is, for example, a LED (light emitting diode) lamp, a fluorescent bulb, or the like. The air-conditioning equipment is, for example, an air-conditioner, or the like. The sprinkler apparatus is, for example, a sprinkler, or the like. The curtain apparatus and the lighting apparatus are used to control time for irradiating the plants RD with light. The air-conditioning equipment is used to control the temperature in the surroundings of the plant RD. The sprinkler apparatus is used to control the amount of water to be given to the plant RD. Except for these limitations, the monitoring system 100D according to the present modification may be configured similarly to the estimation system 100 according to the above-described embodiment.

[Model Generation Apparatus]

In the present modification, the model generation apparatus 1 acquires, in step S101, a plurality of learning data sets 120D. Training data 121D of each of the learning data sets 120D is sensing data obtained by the environmental sensor SD. First correct answer data 122D indicates information (correct answer) relating to a status of cultivation of the plant RD appearing in the training data 121D, and relating to a status of cultivation of the plant RD to be subjected to an estimation task. Second correct answer data 123D indicates information (correct answer) relating to another feature different from the status of cultivation of the plant RD to be subjected to the estimation task.

The model generation apparatus 1 executes machine learning of the learning model 5 by the processing in step S102, by using the acquired plurality of learning data sets 120D. As a result, it is possible to construct the trained coder 51 and first estimator 52 that have acquired the capability of outputting a result of estimation relating to a status of cultivation of the plant RD, in response to input of sensing data obtained by the environmental sensor SD. The model generation apparatus 1 appropriately saves, by the processing in step S103, the information relating to the trained coder 51 and first estimator 52 as learning result data 125D, in a predetermined storage area. The generated learning result data 125D may be provided to the monitoring apparatus 2D at an appropriate timing.

[Monitoring Apparatus]

Figure 21A:
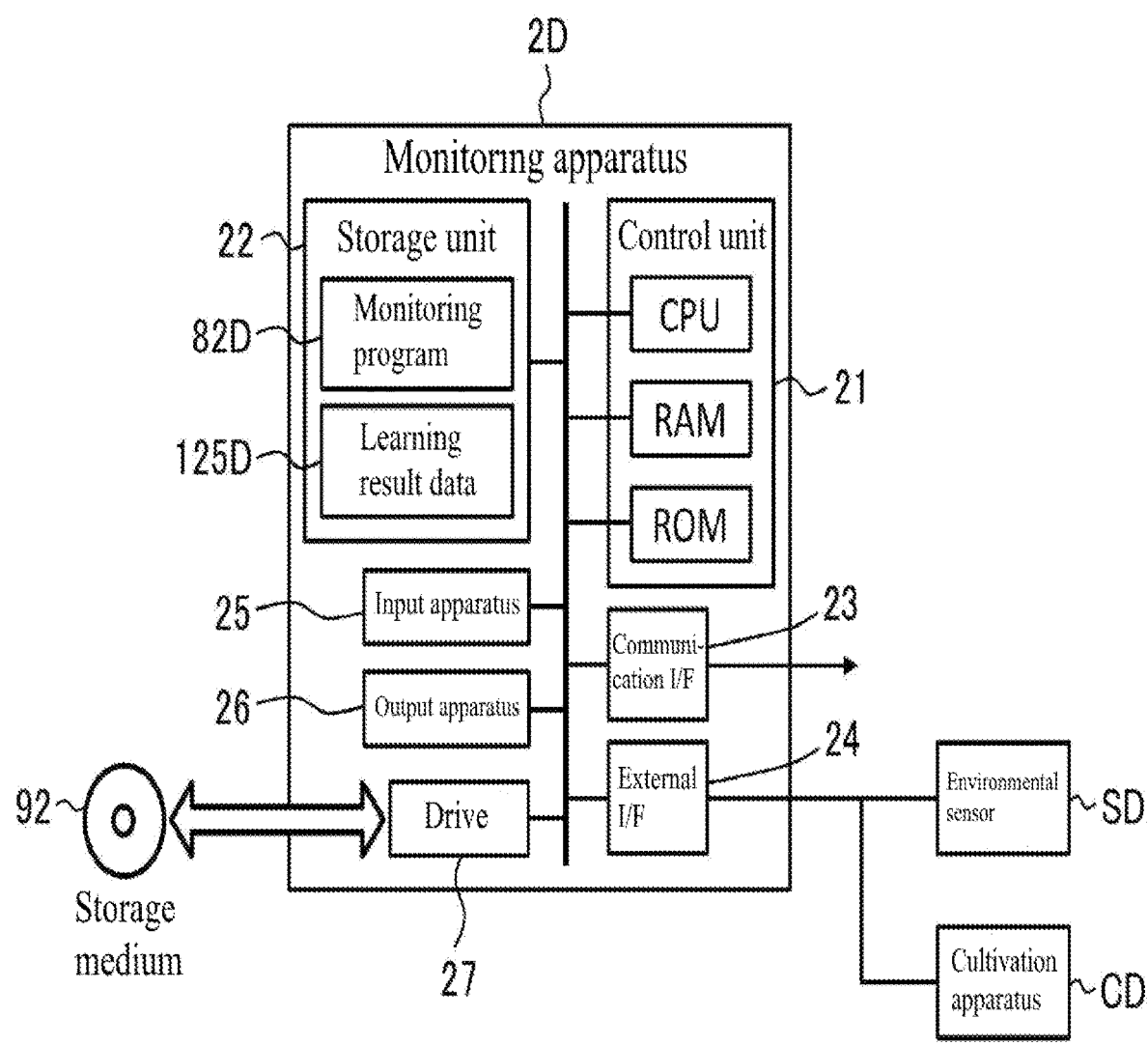
FIG. 21A is a schematic diagram illustrating an example of a hardware configuration of a monitoring apparatus according to another embodiment or embodiments.

FIG. 21A schematically illustrates an example of a hardware configuration of the monitoring apparatus 2D according to the present modification. As shown in FIG. 21A, the monitoring apparatus 2D according to the present modification, similarly to the above-described estimation apparatus 2, may be constituted by a computer in which the control unit 21, the storage unit 22, the communication interface 23, the external interface 24, the input apparatus 25, the output apparatus 26, and the drive 27 are electrically connected to each other.

In the present modification, the storage unit 22 stores various types of information such as a monitoring program 82D and the learning result data 125D. The monitoring program 82D corresponds to the estimation program 82 according to the above-described embodiment. Also, in the present modification, the monitoring apparatus 2D is connected to an environmental sensor SD and the cultivation apparatus CD via the external interface 24.

Note that the hardware configuration of the monitoring apparatus 2D is not limited to this example. Constituent elements of the specific hardware configuration of the monitoring apparatus 2D can be omitted, replaced, and added as appropriate depending on the embodiment. The monitoring apparatus 2D may be a general-purpose server apparatus, a general-purpose PC, a PLC, or the like, instead of an information processing apparatus that is specifically designed for the service to be provided.

Figure 21B:
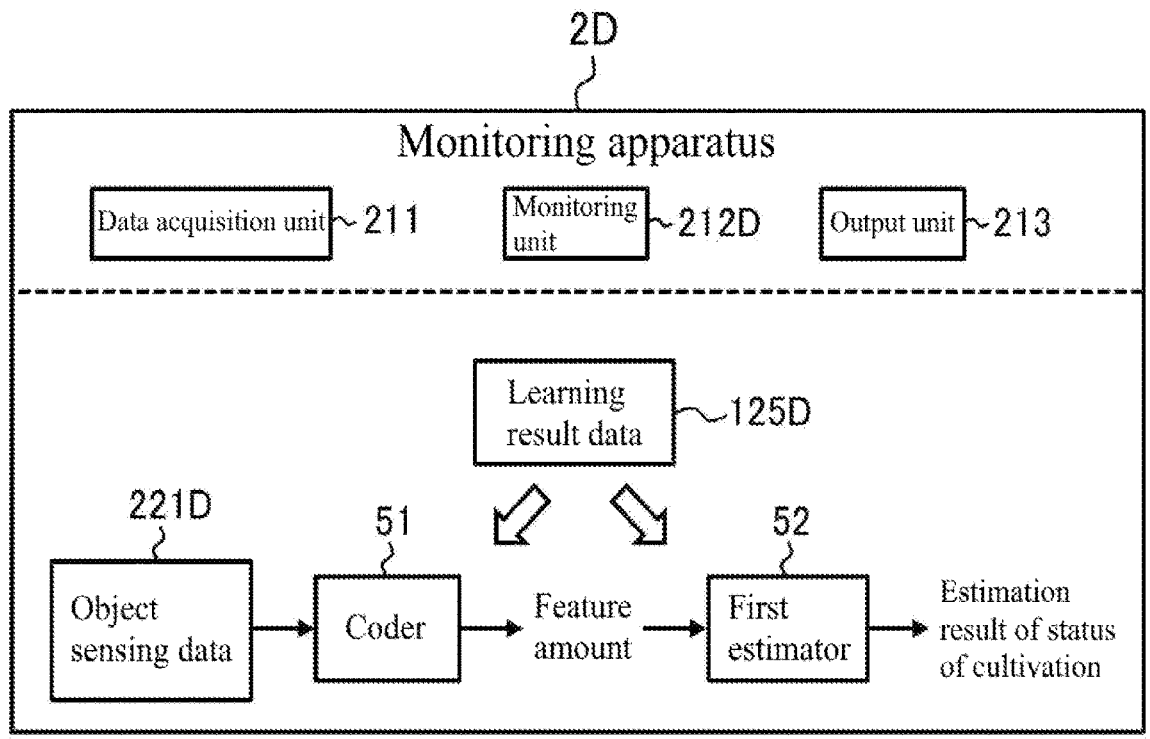
FIG. 21B is a schematic diagram illustrating an example of a software configuration of a monitoring apparatus according to another embodiment or embodiments.

FIG. 21B schematically illustrates an example of a software configuration of the monitoring apparatus 2D according to the present modification. Similarly to the above-described embodiment, the software configuration of the monitoring apparatus 2D is realized by the control unit 21 executing the monitoring program 82D. The software configuration of the monitoring apparatus 2D is the same as that of the estimation apparatus 2 except for the configuration in which data to be dealt with is limited as described above. A monitoring unit 212D includes the trained coder 51 and first estimator 52 by storing the learning result data 125D. The monitoring unit 212D corresponds to the estimation unit 212. With this, the monitoring apparatus 2D can execute, similarly to the estimation processing of the estimation apparatus 2, the series of information processing relating to estimation of the status of cultivation of plant RD.

That is, in step S201, the control unit 21 acquires object sensing data 221D of plants RD to be monitored. In step S202, the control unit 21 operates as the monitoring unit 212D, and configures settings of the trained coder 51 and first estimator 52 with reference to the learning result data 125D. The control unit 21 gives the acquired object sensing data 221D to the trained coder 51, and executes computation processing of forward propagation of trained coder 51 and first estimator 52. With this, the control unit 11 acquires an output value that corresponds to a result of estimating the status of cultivation of the plant RD from the trained first estimator 52. Note that estimating the status of cultivation may include estimating at least one of the growing environment and the operation content so that the yield amount is the maximum, estimating the optimal operation content in the current growing environment to be monitored, and the like.

In step S203, the control unit 21 outputs information relating to a result of estimating the status of cultivation of the plant RD. For example, the control unit 21 may directly output a result of estimating the status of cultivation of the plant RD to the output apparatus 26. In this case, the control unit 21 may prompt an operator to improve the status of cultivation of the plant RD by outputting, to the output apparatus, an estimation result such as at least one of the growing environment and the operation content so that the yield amount is the maximum, optimal operation content in the current growing environment to be monitored. Also, for example, the control unit 21 may determine, based on the estimated status of cultivation, a control command to be given to the cultivation apparatus CD. The correspondence relationship between statuses of cultivation and control commands may be given by reference information of a table format or the like. This reference information may be stored in a predetermined storage area such as a RAM, a ROM, the storage unit 22, the storage medium 92, or an external storage device, and the control unit 21 may determine a control command according to an estimated status of cultivation, with reference to this reference information. Also, the control unit 21 may give the determined control command to the cultivation apparatus CD to control the operation of the cultivation apparatus CD. Also, for example, the control unit 21 may output information indicating the determined control command to the output apparatus 26, and prompts an administrator of the plant RD to control the operation of the cultivation apparatus CD.

[Features]

According to the present modification, by machine learning of the model generation apparatus 1, it is possible to make a feature amount output by the trained coder 51 likely to include a component that corresponds to information relating to the status of cultivation of a plant RD to be subjected to an estimation task, and unlikely to include components that correspond to other features. Accordingly, it is possible to generate the trained coder 51 and first estimator 52 that can execute an estimation task relating to the status of cultivation of a plant RD in a way that is robust against differences in features. In the monitoring apparatus 2D according to the present modification, it can be expected that an estimation task relating to a status of cultivation is accurately executed using the trained coder 51 and first estimator 52.

Note that sensing data obtained by monitoring the state of a plant RD using the environmental sensor SD is an example of observation data that can be used to monitor the status of cultivation of the plant RD. Observation data relating to the plant RD is not limited to the example of the sensing data. Observation data relating to the plant RD may be, for example, sensing data obtained by the environmental sensor SD, observation data of the plant RD obtained by input of an operator, or a combination thereof. The observation data may be constituted by, for example, work record data, environment record data, or a combination thereof. The work record data may be constituted by, for example, information indicating whether or not works of flower picking, leaf picking, spear picking, and the like were done, date of the execution, the amount thereof, and the like. Also, the environment record data may be constituted by, for example, information indicating a result of an operator monitoring the environment of the surroundings of the plant RD (such as, e.g., weather, temperature, and humidity). In the fourth modification, such observation data may be dealt with as a predetermined type of data.

(E) Other Considerations

Each of the above-described modifications is an example of a scenario of estimating an attribute of an object to be observed based on sensing data obtained by a sensor. The sensor and the object to be observed are not limited to the above-described examples, and may be selected as appropriate depending on the embodiment. That is, the estimation system 100 according to the above-described embodiment may be applied to various scenarios of performing estimation relating to an attribute of an appropriate object appearing in sensing data. In this case, the first feature may be an attribute of an object to be observed by a sensor, and the second feature may be a feature other than the attribute of the object that can appear in the sensing data. With this, it is possible to generate a trained coder 51 and a trained first estimator 52 that can execute an estimation task relating to an attribute of an object to be observed in a way that is robust against differences in features.

Figure 22:
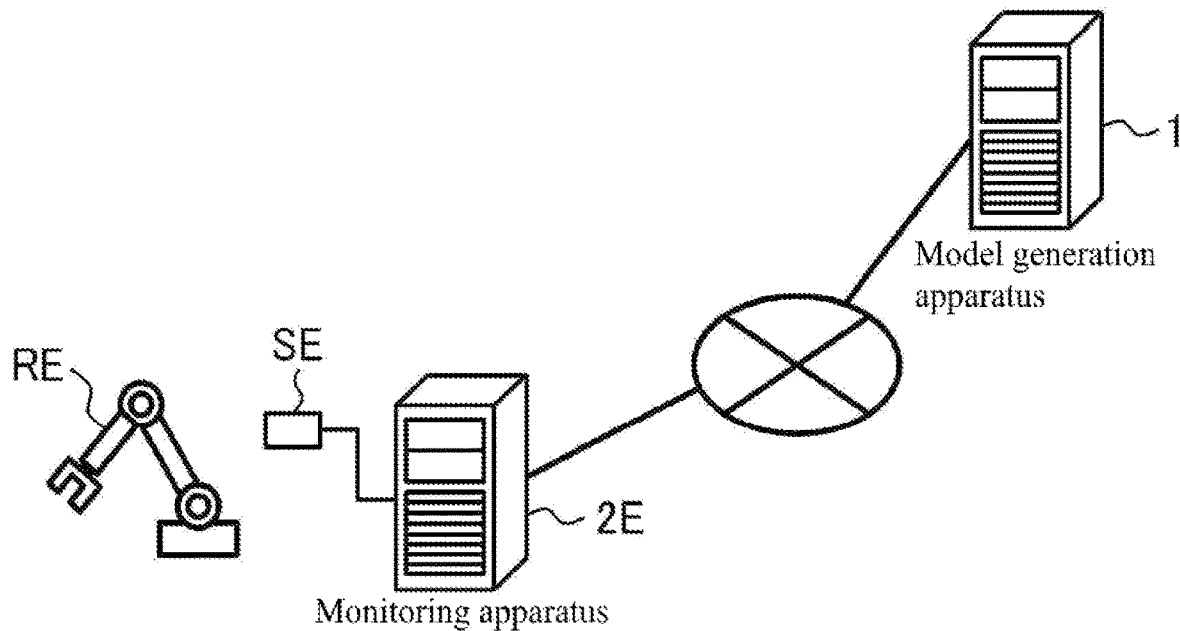
FIG. 22 is a schematic diagram illustrating an example of another scenario to which one or more embodiments is applied.

FIG. 22 schematically illustrates an example of another scenario of estimating an attribute of an object appearing in sensing data. A monitoring system exemplified in FIG. 22 includes the model generation apparatus 1 and a monitoring apparatus 2E. The configuration of the monitoring apparatus 2E may be the same as that of the inspection apparatus 2A or the like. A predetermined type of data that is dealt with in the example of FIG. 22 may be sensing data obtained by a sensor SE for monitoring the state of a machine RE. The sensor SE may be, for example, a microphone, an acceleration sensor, an oscillation sensor, or the like. Accordingly, sensing data to be obtained may relate to oscillation (including sound) of the machine RE.

In this case, the first feature may be a feature relating to anomaly of the machine RE such as aging degradation, defect, or malfunction of the machine RE, or the like. On the other hand, the second feature may be a feature other than anomaly of the machine RE, and may relate to, for example, oscillation that normally occurs in operational environment, such as oscillation that occurs during normal operation of the machine RE, or oscillation that occurs in the surroundings of the machine RE. The types of the machine RE and anomaly are not particularly limited, and may be selected as appropriate depending on the embodiment. The machine RE may be an apparatus constituting a production line, such as, e.g., a conveyor apparatus, an industrial robot, a molding apparatus, a semiconductor apparatus, or a substrate mounting machine. The production line may include an assembling line. The machine RE may be the entire apparatus, or a portion of the apparatus, such as a switch or a motor. If a machine RE is an apparatus constituting a production line, an anomaly of the machine RE may be a malfunction of the apparatus such as, for example, a position shift, deficiency or excess of a pressure, stuck of a member or product, occurrence of crimp, an anomaly in line speed, or occurrence of a defect in a member or product. If the machine RE is a motor, an anomaly may be a malfunction of the motor relating to the torque, the number of rotations, or the like. Estimation relating to the first feature may be expressed by, for example, determining whether or not the machine RE has an anomaly, determining the probability that the machine RE has an anomaly, identifying the type of anomaly that has occurred in the machine RE or is to be forecasted, specifying the position at which an anomaly has occurred, or a combination thereof.

Accordingly, the model generation apparatus 1 can generate a trained coder 51 and first estimator 52 that can execute an estimation task relating to an anomaly of the machine RE in a way that is robust against differences in features such as oscillation that normally occurs in operation environment. The monitoring apparatus 2E can execute an estimation task relating to an anomaly of a machine RE with the same procedure as that for the above-described inspection apparatus 2A. The monitoring system according to the present modification may be used in any scenario of monitoring the state of the machine RE.

As another example, a predetermined type of data may be sensing data obtained by a home security sensor. The home security sensor may be, for example, an image sensor, an infrared sensor, an activation level (audio) sensor, a gas (such as $CO_2$) sensor, a current sensor, a smart meter (sensor for measuring the energy consumption of home electrical appliance, lighting, and the like). In this case, the first feature may relate to a security state of a range to be monitored, such as whether or not there is an invader. The second feature may relate to a feature other than the security state, and may be a component that normally occurs in an operation environment, for example.

<4.2>

In the above-described embodiment, each of the coder 51, the first estimator 52, and the second estimator 53 is constituted by a multilayer fully connected neural network. However, the type of the neural network constituting each component is not limited to this example. For example, a convolution neural network, a recurrent neural network, or the like may be used as the coder 51, the first estimator 52, and/or the second estimator 53.

Also, in the above-described embodiment, the types of the machine learning models constituting the coder 51, the first estimator 52, and the second estimator 53 are not limited to a neural network. For example, instead of a neural network, for example, a support vector machine, a regression model, a decision tree model, or the like may be used as the coder 51, the first estimator 52, and/or the second estimator 53. The method of machine learning may be selected as appropriate according to the type of each machine learning model.

Also, in the above-described embodiment, the formats of inputs and outputs of the coder 51, the first estimator 52, and the second estimator 53 are not particularly limited, and may be determined as appropriate depending on the embodiment. For example, the first estimator 52 may be configured to further accept an input of information other than a feature amount. Also, an output of the first estimator 52 may be configured to directly indicate a result of estimating the first feature. Alternatively, an output of the first estimator 52 may be configured to indirectly indicate a result of estimating the first feature, such as, for example, indicating the probability that the first feature is in an object state to determine whether or not the first feature is in the object state. The same applies to others.

<4.3>

In the above-described embodiment, the processing in step S123 is repeatedly executed together with the processing in steps S121 and S122. However, the processing procedure of the machine learning of the learning model 5 is not limited to this example. The processing in step S123 may be executed at least either before or after the processing in steps S121 and S122 is executed alternately and repeatedly.

INDEX TO THE REFERENCE NUMERALS

1 Model generation apparatus
11 Control unit
12 Storage unit
13 Communication interface
14 External interface
15 Input apparatus
16 Output apparatus
17 Drive
111 Data acquisition unit
112 Learning processing unit
113 Saving processing unit
120 Learning data sets
121 Training data
122 First correct answer data
123 Second correct answer data
125 Learning result data
81 Model generation program
91 Storage medium
2 Estimation apparatus
21 Control unit
22 Storage unit
23 Communication interface
24 External interface
25 Input apparatus
26 Output apparatus
27 Drive 211 Data acquisition unit
212 Estimation unit
213 Output unit
221 Object data
5 Learning model
51 Coder
52 First estimator
53 Second estimator

The invention claimed is:

1. A model generation apparatus comprising a processor coupled to a memory storing a program and configured with the program to perform operations comprising:
  acquiring a plurality of learning data sets each constituted by a combination of training data, first correct answer data that indicates a first feature comprised in the training data, and second correct answer data that indicates a second feature comprised in the training data and is different from the first feature, the training data comprises image data; and
  executing machine learning of a learning model that comprises a coder, a first estimator, and a second estimator, wherein the coder is configured to convert received input data into a feature amount, the first estimator is configured to accept input of an output value of the coder, and estimate a first feature comprised in the input data from the feature amount, and the second estimator is configured to accept input of the output value of the coder, and estimate a second feature comprised in the input data from the feature amount, wherein
  the processor is configured with the program to perform operations such that executing the machine learning of a learning model comprises:
    training the second estimator so that, with respect to each of the learning data sets, an estimation result obtained from the second estimator by giving the training data to the coder conforms to the second correct answer data;
    training the coder so that, with respect to each of the learning data sets, an estimation result obtained from the second estimator by giving the training data to the coder does not conform to the second correct answer data by converting the training data into the feature amounts such that estimation performance of the second estimator is deliberately reduced;
    training the coder and the first estimator so that, with respect to each of the learning data sets, an estimation result obtained from the first estimator by giving the training data to the coder conforms to the first correct answer data, and
    executing adversarial learning in the coder and the second estimator by executing training in the second estimator, and executing training in the coder that has been trained such that the estimation result obtained from the second estimator does not conform to the second correct answer data and estimation performance of the second estimator is deliberately reduced, alternately and repeatedly, and
  training the coder so that, with respect to each of the learning data sets, the estimation result obtained from the second estimator by giving the training data to the coder does not conform to the second correct answer data such that estimation performance of the second estimator is deliberately reduced comprises:
    training the coder using dummy data that corresponds to the second correct answer data; or
    training the coder using reverse gradients.

2. The model generation apparatus according to claim 1, wherein the processor is configured with the program to perform operations such that training the coder and the first estimator is repeatedly executed together with training the second estimator and training the coder.

3. The model generation apparatus according to claim 1, wherein the processor is configured with the program to perform operations such that training the coder comprises
  acquiring, with respect to each of the learning data sets, the dummy data that corresponds to the second correct answer data and is constituted by values different from values of the corresponding second correct answer data, and
  training the coder so that the estimation result does not conform to the second correct answer data by training the coder so that the estimation result obtained from the second estimator by giving the training data to the coder conforms to the dummy data.

4. The model generation apparatus according to claim 3, wherein the dummy data comprises the second correct answer data of a learning data set that is different from the corresponding learning data set.

5. The model generation apparatus according to claim 1, wherein the first feature relates to a first component to be subjected to a predetermined estimation, and
  the second feature relates to a second component that is different from the first component, and affects the predetermined estimation regarding the first component.

6. The model generation apparatus according to claim 1, wherein the training data comprises image data comprising a foreground and a background,
  the first feature relates to the foreground, and
  the second feature relates to the background.

7. The model generation apparatus according to claim 1, wherein the training data comprises image data in which an object appears,
  the first feature comprises an attribute of the object, and
  the second feature is another feature different from the attribute of the object.

8. The model generation apparatus according to claim 7, wherein the object comprises a product, and
  the attribute of the object relates to a defect of the product.

9. An estimation apparatus comprising a processor coupled to a memory storing a program and configured with the program to perform operations comprising:
  acquiring object data;
  estimating a first feature comprised in the acquired object data, using the trained coder and the trained first estimator that are generated by the model generation apparatus according to claim 1; and
  outputting information relating to a result of the estimation of the first feature.

10. A model generation method in which a computer performs operations comprising:
  acquiring a plurality of learning data sets each constituted by a combination of training data, first correct answer data that indicates a first feature comprised in the training data, and second correct answer data that indicates a second feature comprised in the training data and is different from the first feature; and
  executing machine learning of a learning model that comprises a coder, a first estimator, and a second estimator, wherein the coder is configured to convert received input data into a feature amount, the first estimator is configured to accept input of an output value of the coder, and estimate a first feature comprised in the input data from the feature amount, and the second estimator is configured to accept input of the output value of the coder, and estimate a second feature comprised in the input data from the feature amount, wherein executing the machine learning comprises:
training the second estimator so that, with respect to each of the learning data sets, an estimation result obtained from the second estimator by giving the training data to the coder conforms to the second correct answer data;
training the coder so that, with respect to each of the learning data sets, an estimation result obtained from the second estimator by giving the training data to the coder does not conform to the second correct answer data by converting the training data into the feature amounts such that estimation performance of the second estimator is deliberately reduced;
training the coder and the first estimator so that, with respect to each of the learning data sets, an estimation result obtained from the first estimator by giving the training data to the coder conforms to the first correct answer data, and
executing adversarial learning in the coder and the second estimator by executing training in the second estimator, and executing training in the coder that has been trained such that the estimation result obtained from the second estimator does not conform to the second correct answer data and estimation performance of the second estimator is deliberately reduced, alternately and repeatedly, and
training the coder so that, with respect to each of the learning data sets, the estimation result obtained from the second estimator by giving the training data to the coder does not conform to the second correct answer data such that estimation performance of the second estimator is deliberately reduced comprises:
training the coder using dummy data that corresponds to the second correct answer data; or
training the coder using reverse gradients.

11. A non-transitory computer-readable storage medium storing a model generation program, which when read and executed, for causing a computer to perform operations comprising:
acquiring a plurality of learning data sets each constituted by a combination of training data, first correct answer data that indicates a first feature comprised in the training data, and second correct answer data that indicates a second feature comprised in the training data and is different from the first feature; and
executing machine learning of a learning model that comprises a coder, a first estimator, and a second estimator, wherein the coder is configured to convert received input data into a feature amount, the first estimator is configured to accept input of an output value of the coder, and estimate a first feature comprised in the input data from the feature amount, and the second estimator is configured to accept input of the output value of the coder, and estimate a second feature comprised in the input data from the feature amount, wherein executing the machine learning comprises:
training the second estimator so that, with respect to each of the learning data sets, an estimation result obtained from the second estimator by giving the training data to the coder conforms to the second correct answer data;
training the coder so that, with respect to each of the learning data sets, an estimation result obtained from the second estimator by giving the training data to the coder does not conform to the second correct answer data by converting the training data into the feature amounts such that estimation performance of the second estimator is deliberately reduced;
training the coder and the first estimator so that, with respect to each of the learning data sets, an estimation result obtained from the first estimator by giving the training data to the coder conforms to the first correct answer data, and
executing adversarial learning in the coder and the second estimator by executing training in the second estimator, and executing training in the coder that has been trained such that the estimation result obtained from the second estimator does not conform to the second correct answer data and estimation performance of the second estimator is deliberately reduced, alternately and repeatedly, and
training the coder so that, with respect to each of the learning data sets, the estimation result obtained from the second estimator by giving the training data to the coder does not conform to the second correct answer data such that estimation performance of the second estimator is deliberately reduced comprises:
training the coder using dummy data that corresponds to the second correct answer data; or
training the coder using reverse gradients.

12. The model generation apparatus according to claim 2, wherein the processor is configured with the program to perform operations such that training the coder comprises
acquiring, with respect to each of the learning data sets, the dummy data that corresponds to the second correct answer data and is constituted by values different from values of the corresponding second correct answer data, and
training the coder so that the estimation result does not conform to the second correct answer data by training the coder so that the estimation result obtained from the second estimator by giving the training data to the coder conforms to the dummy data.

13. The model generation apparatus according to claim 2, wherein the first feature relates to a first component to be subjected to a predetermined estimation, and
the second feature relates to a second component that is different from the first component, and affects the predetermined estimation regarding the first component.

14. The model generation apparatus according to claim 3, wherein the first feature relates to a first component to be subjected to a predetermined estimation, and
the second feature relates to a second component that is different from the first component, and affects the predetermined estimation regarding the first component.

15. The model generation apparatus according to claim 4, wherein the first feature relates to a first component to be subjected to a predetermined estimation, and
the second feature relates to a second component that is different from the first component, and affects the predetermined estimation regarding the first component.

16. The model generation apparatus according to claim 2,
wherein the training data comprises image data comprising a foreground and a background,
the first feature relates to the foreground, and
the second feature relates to the background.

17. The model generation apparatus according to claim 3,
wherein the training data comprises image data comprising a foreground and a background,
the first feature relates to the foreground, and
the second feature relates to the background.

18. The model generation apparatus according to claim 4,
wherein the training data comprises image data comprising a foreground and a background,
the first feature relates to the foreground, and
the second feature relates to the background.

19. The model generation apparatus according to claim 2,
wherein the training data comprises image data in which an object appears,
the first feature comprises an attribute of the object, and
the second feature is another feature different from the attribute of the object.

20. The model generation apparatus according to claim 3,
wherein the training data comprises image data in which an object appears,
the first feature comprises an attribute of the object, and
the second feature is another feature different from the attribute of the object.

\* \* \* \* \*